US011074226B2

(12) United States Patent
He

(10) Patent No.: US 11,074,226 B2
(45) Date of Patent: Jul. 27, 2021

(54) HIERARCHICAL COMPUTING NETWORK AND METHODS THEREOF

(71) Applicant: Xiaopeng He, Gaithersburg, MD (US)

(72) Inventor: Xiaopeng He, Gaithersburg, MD (US)

(73) Assignee: 3S International, LLC, Gaithersburg, MD (US)

( * ) Notice: Subject to any disclaimer, the term of this patent is extended or adjusted under 35 U.S.C. 154(b) by 375 days.

(21) Appl. No.: 15/987,883

(22) Filed: May 23, 2018

(65) Prior Publication Data

US 2018/0341662 A1 Nov. 29, 2018

Related U.S. Application Data

(60) Provisional application No. 62/510,337, filed on May 24, 2017.

(51) Int. Cl.
| | | |
|---|---|---|
| H04L 12/24 | (2006.01) | |
| G06F 16/182 | (2019.01) | |
| G06F 16/23 | (2019.01) | |
| H04L 29/12 | (2006.01) | |
| H04L 29/08 | (2006.01) | |
| H04W 84/04 | (2009.01) | |

(52) U.S. Cl.
CPC ............ *G06F 16/182* (2019.01); *G06F 16/23* (2019.01); *H04L 41/044* (2013.01); *H04L 61/2007* (2013.01); *H04L 67/1002* (2013.01); *H04W 84/04* (2013.01)

(58) Field of Classification Search
None
See application file for complete search history.

(56) References Cited

U.S. PATENT DOCUMENTS

| | | | | |
|---|---|---|---|---|
| 9,065,863 | B1 * | 6/2015 | Tharakan | H04L 63/10 |
| 2012/0284229 | A1 * | 11/2012 | Kim | G06F 16/275 |
| | | | | 707/634 |
| 2013/0128894 | A1 * | 5/2013 | Shah | H04W 4/06 |
| | | | | 370/401 |
| 2015/0207695 | A1 * | 7/2015 | Varney | H04L 41/0823 |
| | | | | 709/223 |
| 2016/0366111 | A1 * | 12/2016 | Smith | H04W 12/04033 |
| 2017/0078922 | A1 * | 3/2017 | Raleigh | H04W 28/10 |
| 2018/0295653 | A1 * | 10/2018 | Ashraf | H04W 72/14 |

* cited by examiner

*Primary Examiner* — Christopher J Raab
(74) *Attorney, Agent, or Firm* — Guosheng Wang; United States Research and Patent Firm

(57) ABSTRACT

The present invention provides a hierarchical computing network with multiple tiers of computing nodes. Also disclosed is a method of organizing, ranking and grading a large number of computing nodes that are owned, maintained and used by a large number of different participants in geographically dispersed areas in an effort to provide computation, control, measurement and data services to a large number of users. One of the embodiments of the present disclosure provides a decentralized, distributed, cost-effective, environmental friendly, secure, reliable and scalable online file management system for a large amount of data from a large number of users and organizations.

20 Claims, 28 Drawing Sheets

HIERARCHICAL COMPUTING NETWORK AND METHODS THEREOF

CROSS-REFERENCE TO RELATED APPLICATIONS

This application claims the benefit of priority to U.S. Provisional Application No. 62/510,337, filed May 24, 2017, which is incorporated by reference herein in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present disclosure relates to the field of distributed computing network technology. More specifically, the present disclosure relates to a hierarchical computing network, methods thereof participant computing devices thereof, and its applications for computation, control, measurement and data services of a large amount of data from a large number of users.

BACKGROUND OF THE INVENTION

Big data and Cloud computing are very hot topics days. Cloud computing is gaining recognitions worldwide in providing outsourcing IT management and data services Imagine, 5 GB of application data for each individual in the world mean 35 EB of storage space for the entire population of 7 billion people in the world today. Microsoft OneDrive promises 5 GB of free storage space for each registered user. Although 5 GB is not a large amount of data, just about 5 short movies of low resolution, putting an online storage service on a public Cloud for 7 billion users means 35 EB of storage space. 35 EB is equivalent to 35 million hard disk drives with each of 1 TB in size.

The demand for data storage is growing fast, both from personal level and organization level. Cloud computing is becoming the de facto solution for online storage. Cloud computing is based on the client-server architecture. Cloud services run on top of the physical network infrastructure that constitutes the Internet and corporate Intranet, Cloud computing aims to reduce the operation and ownership cost on IT. It enables cost reduction by increasing the usage of IT infrastructure through virtualization and sharing of computing resources among applications and organizations, Public Cloud services such as Microsoft OneDrive, Google Drive, Amazon AWS and Dropbox provide online data storage for hundreds of millions of users worldwide. A psychological breakthrough that Cloud computing has achieved is that now putting my data on another person's computer becomes acceptable.

However, some concerns remain existing for cloud computing. Reliability tops many issues of Cloud computing, AWS 5-hour outage in Feb. 28, 2017 is the most recent nightmare of reliability failure. Many business operations were affected. If you search Internet for the news of the reported outage of the Cloud services, the results are disturbingly discouraging. Microsoft and Google are not exceptions. The fundamental problem is that Cloud services took a centralization approach which is against the original objective of the Internet: decentralization. Today's Cloud services are provided from a few large scale data centers that concentrate not only large amount of expensive hardware devices (server machines, storage devices, networking devices, etc.) but also large amount of data and applications. According to publications, Microsoft runs 34 large scale data centers worldwide, Amazon 16, and Google 9. Hundreds of million user accounts and their personal data are stored and managed by a small number of data centers. With such degree of centralization, single point of failure becomes inevitable.

In addition to reliability issues, current Cloud computing has a few other potential issues and concerns, data safety, regional inequality and cost, just to name a few. As we move towards applications of IoT (Internet of Things), latency issue surface, and cannot be avoided. These issues and concerns are intrinsic to the now common practice of centralizing a large amount of computing hardware, application and data into a few number of large scale data centers in a few geographical regions. It is time to rethink about the client-server architecture that supports current Cloud services.

Many efforts have been made in the past to decentralize the computation and data management, and distribute the large amount of data to many hosts. Hadoop is an open-source software framework for distributed computation and storage of very large data sets on clusters of commodity hardware. The core of Apache Hadoop consists of a storage part known as Hadoop Distributed File System (HDFS) which is built on the master/slave architecture HDFS achieves reliability by replicating data on multiple nodes. The fact that HDFS can use commodity computing devices without requiring high end server machines that are equipped with RAID storage is a step forward. However, computing devices that run HDFS nodes are still required to operate in secure, well maintained, well connected data center environment, in the vicinity of other parts of the services that makes use of HDFS. HDFS nodes are categorized by different responsibilities But they are not ranked by reliability and entire Hadoop framework doesn't have the notion of service sensitivity to geographical locations.

More recently, the concept of Fog Computing and Edge Computing have been proposed to solve the latency sensitive computing problems. These applications simply cannot afford to rely on data transmissions from remote data centers. Because data transmission speed and quality are reversely proportional to the distance that data has to travel. It is desirable to process data close to the data source. Fog Computing is a wireless distributed computing platform in which complex latency sensitivity tasks can be processed via a group of sharing resources at IoT gateway level in a locality. Fog/Edge computing's multi-tier computing networking architecture extends computation burden to a lot more computing devices. Fog computing is sensitive to geographical locations of computing nodes. However, in this architecture all computing nodes are required to follow some standards.

However, there are no discussions about the ranking/grading of participating nodes and the incentives for people to bring their own devices. From publications of OpenFog Consortium, the architecture seems focusing more on smart devices than utilizing existing devices. Everything operates automatically. User has no choice and input on matters that are related to price, cost, service quality, reliability, participation incentives and motivations etc. Advantageously, the present invention provides an effective solution to address these issues.

SUMMARY OF THE INVENTION

One aspect of the present invention provides a first computing device (interchangeable to "primary computing device" throughout this disclosure) in a hierarchical network. The hierarchical network comprises one or more first computing devices and a plurality of functional units each performing a service function Anyone of the functional units comprises at least a (or only one) second computing device (interchangeable to "ancillary computing device" throughout the disclosure) serving as control node. The first computing device comprises one or more processors, a memory for storing programming instructions, and a communication module. The programming instructions when executed cause the one or more processors to perform the following operations: grading a candidate computing device for its service capabilities, and assigning the candidate computing device a role of a control node in the hierarchical network based on the grading. In preferred embodiments, the programming instructions when executed cause the one or more processors to perform the following operations:

receiving an enrollment request from a candidate computing device via the communication module, the enrollment request indicating the candidate computing device's prospective role as control node or process node, the first computing device being a publicly accessible device or a publicly inaccessible device such as a device privately owned by an individual or a company; and grading the candidate computing device for its service capabilities, assigning the candidate computing device a role of a control node in the hierarchical network based on the grading, and sending an enrollment response containing information on the assigned functional unit to the candidate computing device via the communication module, if the enrollment request indicates the candidate computing device's prospective role as control node.

A further aspect of the invention provides a second computing device (interchangeable to "ancillary computing device" throughout this disclosure) in a hierarchical network. The hierarchical network comprises one or more first computing devices and a plurality of functional units each performing a service function Any one of the functional units comprises at least a (or only one) second computing device serving as a control node, wherein the second computing device comprising one or more processors, a memory for storing programming instructions, and a communication module. The programming instructions when executed cause the one or more processors to perform the following operations:

receiving a first enrollment request from a candidate computing device via the communication module, the enrollment request indicating the candidate computing device's prospective role as process node, the candidate computing device being a publicly accessible device or a publicly inaccessible device such as a device privately owned by an individual or a company;

grading the candidate computing device for its service capabilities;

sending a first enrollment response to the candidate computing device based on the grading, the first enrollment response indicating acceptance or disqualification as process node; and reporting to the first computing device about the status of said second computing device.

Another aspect of the invention provides a third computing device (interchangeable to "peripheral computing device" throughout this disclosure) in a hierarchical network. The hierarchical network comprises one or more first computing devices and a plurality of functional units each comprising a second computing device serving as control node and zero or one or more third computing devices serving as process nodes. The third computing device comprising one or more processors, a memory for storing programming instructions, and a communication module, wherein the programming instructions when executed cause the one or more processors to perform the following operations:

sending a report to its parent control node;

receiving a processing command from its parent control node;

sending a complaint message to its parent control node against a process node;

sending a complaint message to its superior root node against its parent control node; and performing application specific functions.

Still another aspect of the invention provides a hierarchical network comprising one or more first computing devices as described above and a plurality of functional units each performing a service function, anyone of the functional units comprising at least a second computing device as described above serving as a control node, at least one of the functional units comprising zero, one, or more third computing, devices as described above as a process node or nodes.

Still another aspect of the invention provides a distributed networking method in a hierarchical network. The hierarchical network includes one or more first computing devices and a plurality of functional units each performing a service function, any one of the functional units comprising at least a (or only one) second computing device serving as a control node. The method comprises receiving an enrollment request from a candidate computing device via the communication module, the enrollment request indicating the candidate computing device's prospective role as control node or process node, the candidate computing device being a publicly accessible device or a publicly inaccessible device such as a device privately owned by an individual or a company; and grading the candidate computing device for its service capabilities, assigning the candidate computing device a role of a control node in one of the functional units in the hierarchical network based on the grading, and sending an enrollment response containing information on the assigned functional unit to the candidate computing device via the communication module, if the first enrollment request indicates the candidate computing device's prospective role as control node.

A further aspect of the invention provides a distributed networking method in a hierarchical network. The hierarchical network comprises one or more first computing devices and a plurality of functional units each performing a service function, any one of the functional units comprising at least a second computing device serving as control node. The method includes receiving an enrollment request from a candidate computing device via the communication module, the enrollment request indicating the candidate computing device's prospective role as process node;

grading the candidate computing device for its service capabilities; and sending an enrollment response to the candidate computing device based on the grading, the enrollment response indicating acceptance or disqualification as process node The above aspects, features, and advantages and other aspects, features, and advantages of the present invention are readily apparent from the following detailed description of the best modes for carrying out the invention when taken in connection with the accompanying, drawings

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

Figure 1A:
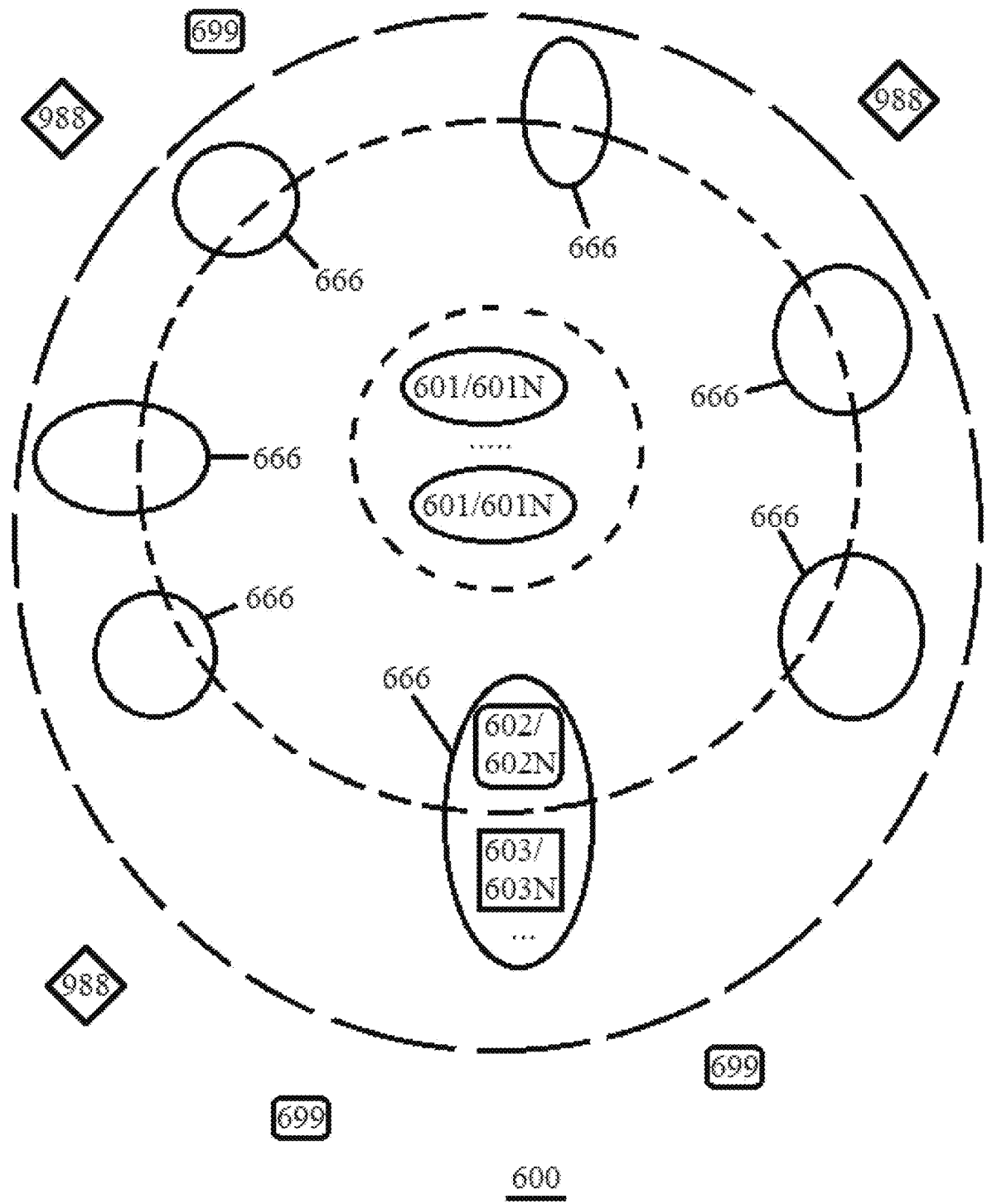
FIG. 1A schematically illustrates an exemplary hierarchical computing network according to an embodiment of the present disclosure.

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to" or "directly coupled to" another element, there are no intervening elements present.

It is estimated that there are 2 billion personal computers currently in use worldwide. This number was reported in year 2015 when the number of smartphones worldwide exceeded the number of personal computers. Most of the personal computers are half empty and idle most of the time. If each computer has 200 GB free disk space and be idle for 16 hours a day, we have total 400 EB of storage space and 3.6 million years of CPU time to spare. This is more than enough to give 5 GB of storage space to each and all 7 billion users in the world. No investment for new computing devices is needed, certainly no investment on high end server machines and data centers are required.

To extend the computation, control, measurement, management, storage burden to majority of, if not all, 2 billion personal computers and the increasing number of other mobile computing devices, distributed computing network architecture must address the following two issues in the first place.

The first issue is related to property sharing model. In the traditional provider/subscriber business model, the line between the provider and the subscribers is very clear. A provider owns the equipment and uses the equipment to provide the services that subscribers subscribe. Cloud computing is such a model where Cloud service providers such as Amazon and Microsoft built, own and operate huge data centers providing computing and data services. End users such as individuals and organizations pay providers for the services they subscribe. Before the hardware and software are put in place for services in data centers, they must be carefully evaluated and tested for grades and reliability ranking. However, to extend the hierarchical computing network to existing personal computing devices that are owned and maintained by a large number of people, the line between the provider and subscribers becomes blurry, considering many providers might as well be subscribers at the same time.

Existing personal computing devices, networking, and communication equipment and their power supply have large numbers in installations and thus huge potential in collective computing power and capacity. Most of them are physically connected to the Internet. If including smart phones, the number is even bigger. The problem is that they are owned, maintained and currently used by large number of people worldwide, and they come in variety of types, brands, makes, sizes, shapes, costs, capacity, capabilities, conditions, quality and age. They are shut down most of the time. Even if they are running, their working condition is no comparison with that of the high end server machines found in data centers. Some of them are running all the time and always connected to the network, since the owner runs many software on the machine, create/download files on the hard drive, the service capability of the machine varies from time to time. Without proper categorization for service capabilities, without evaluation for service reliability, and without an organization, no quality of services can be expected from them. In this model, dedicated computing devices are desirable but cannot be expected. On the other hand, without this model, single ownership of all participating computing devices and equipment will be too costly to build.

Trust is another concern. How can I trust a computing node that is owned by another person to handle and store my data? This was the question that blocked many people from accepting Cloud computing when the concept was introduced 10 year ago Fortunately, with the wide spread of success stories of Cloud computing, not many people are asking that question any more. Even governments start to put data on the public Clouds. People may argue that trusting. Amazon is a different matter than trusting someone I don't know. However, the technology that supports the trust is the same. That is data encryption With modem cryptography, Mark's data placed on Jane's computer will not be read or deciphered by Jane or anybody else without knowing the encryption key. For Jane, Mark's data on her machine is simply a block of data that's unknown to her.

Other concerns are data safety and service reliability. These concerns are especially challenging for a computing network that involves personal computers that are not so reliable compared to high end server machines usually found in data centers The second issue is related to incentives and motivations. Without enough incentives and motivations, people are reluctant to bring their personal computing devices for sharing with other people they don't know. Due to a large variety of age, cost, capacity, computing power, network speed of personal computing devices, proper grading of usability and ranking of reliability of participants' computing nodes are prerequisite for any financial incentive schemes that supposed to give motivations in potential participants. It is common to use customer reviews to judge a service provider nowadays. However, subjective reviews cannot replace objective ranking on the reliability of a computing node.

The present application discloses an alternative means for computation, control, management, measurement and data services of a huge amount of data in the magnitude of Exabyte. The present disclosure discloses 3-tier hierarchical computing network architecture for the distribution of computation, control, communication, storage, configuration, measurement and management. It should be appreciated that the hierarchical computing network architecture may be implemented or defined with (1) hardware such as control circuits alone, (2) software alone; or (3) a combination of (1) and (2).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, processor-executed, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or hard ware such as a control circuit, various elements of the systems described herein are essentially the code segments or executable instructions that, when executed by one or more processor devices, cause the host computing system to perform the various tasks. In certain embodiments, the program or code segments are stored in a tangible processor-readable medium, which may include any medium that can store or transfer information. Examples of suitable forms of non-transitory and processor-readable media include an electronic circuit, a semiconductor memory device, a ROM, a flash memory, an erasable ROM (EROM), a floppy diskette, a CD-ROM, an optical disk, a hard disk, or the like.

Figure 10:
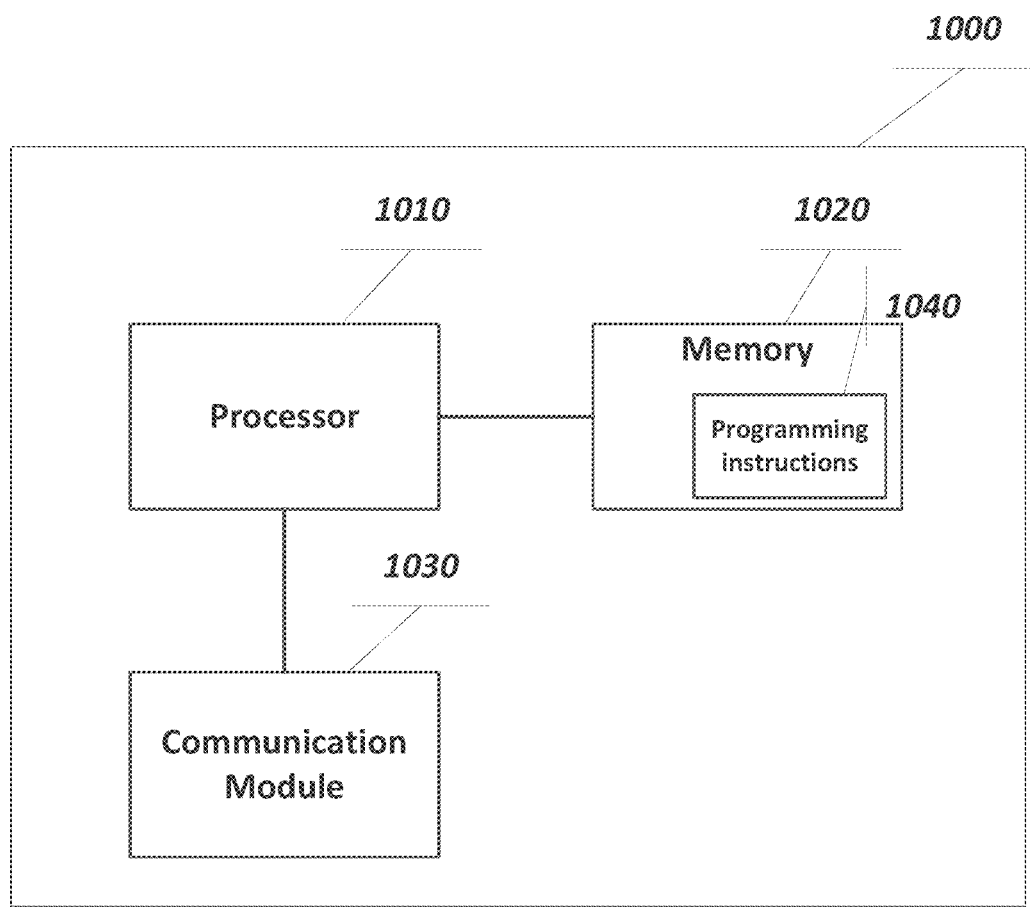
FIG. 10 is a block diagram for a computing device according to an embodiment of the present disclosure

In various embodiments of the invention, each layer of the network structure has clearly defined responsibilities and functionalities. The interactions between different nodes in the same layer and across the layers are clearly defined in order to achieve and maintain the effective functions and organizational power of the entire network Each and all subordinate nodes in the hierarchy are automatically graded and ranked by their superior nodes in order to manage and maintain different needs on service qualifications and service reliability Due to the reduced and more balanced responsibilities among all network nodes in different layers, any node in any layer of the hierarchy can be assumed by a reasonably equipped personal computing device. Service reliability can be achieved via the increase of the redundancy of the computing nodes that perform the exact same task Data safety is guaranteed by encryption of data going between computing nodes as well as stored on every computing node. Geographic position awareness guarantees low latency for data communications. In remote areas where data centers are far away, data services are near-user instead of from thousands of miles away, as long as the physical network infrastructure is available. End users get the opportunity to pick the nodes with different service capabilities and degree of reliabilities that meet their needs The present invention provides at least the following exemplary embodiments, as shown in FIG. 1A:

Embodiment #1: A first computing device 601 in a hierarchical network 600, the hierarchical network comprising one or more first computing devices 601 and a plurality of functional units 666 each performing a service function, anyone of the functional units 666 comprising at least a second computing device 602 serving as control node 602N, wherein the first computing device 601 comprises one or more processors, a memory for storing programming instructions, and a communication module (as shown in FIG. 10). The programming instructions when executed cause the one or more processors to perform the following operations: grading a candidate computing device 699 for its service capabilities, assigning the candidate computing device 699 a role of a control node 602N in the hierarchical network 600 based on the grading.

In many specific but exemplary embodiments, the above programming instructions when executed cause the one or more processors to perform the following operations: receiving an enrollment request from a candidate computing device 699 via the communication module (not shown), the enrollment request indicating the candidate computing device 699's prospective role as control node 602N or process node 603N, the first computing device 601 being a publicly accessible device or a publicly inaccessible device such as a device privately owned by an individual or a company; and grading the candidate computing device 699 for its service capabilities, assigning the candidate computing device a role of a control node 602N in the hierarchical network 600 based on the grading, and sending an enrollment response containing information on the assigned functional unit to the candidate computing device 699 via the communication module, if the enrollment request indicates the candidate computing device 699's prospective role as control node 602N.

Embodiment #2. The first computing device according to Embodiment #1, wherein, an enrollment response indicating disqualification as control node 602N is sent to the candidate computing device 699 via the communication module, if the grading of the candidate computing device 699 is below a first grade level threshold.

Embodiment #3. The first computing device according to anyone of Embodiments #1~#2, wherein, the programming instructions cause the one or more processors to further look up access information of a control node 602N matched with the candidate computing device 699, and to send the access information to the candidate computing device 699 via the communication module, if the enrollment request indicates the candidate computing device 699's prospective role as a process node 603N, and the candidate computing device 699 becomes the third computing device 603 if the enrollment process is successful.

Embodiment #4: The first computing device 601 according to anyone of Embodiments #1~#3, wherein, at least one of the functional units 666 further comprises zero or more (one or more) third computing device 603 as process node 603N.

Embodiment #5: The first computing device 601 according to anyone of Embodiments #1~#4, wherein, the programming instructions cause the one or more processors to further redirect the enrollment request or other request(s) to another first computing device 601, if the candidate computing device 699 is not in the same geographic region as the first computing device 601 is in.

Embodiment #6: The first computing device according to anyone of Embodiments #1~#5, wherein network data is stored in the first computing device 601, the network data comprising at least the following data: a node type, a node ID, IP address of the first computing device 601, a list of subordinate control nodes such as 602N/603N, a list of its peer root nodes 601N, information on functional units, a location index map which maps resources to nodes on which the resources are stored.

Embodiment #7: The first computing device according to anyone of Embodiments #1~#6, wherein the programming instructions cause the one or more processors to further perform data synchronization with its peers.

Embodiment #8: The first computing device 601 according to anyone of Embodiments #1-#7, wherein, the programming instructions cause the one or more processors to further receive a service request via the communication module (as shown in FIG. 10), to select a control node 602N matched with the service request, and to send a service command to the control node 602N corresponding with the service request.

Embodiment #9: The first computing device according to Embodiment #6, wherein, in selecting a control node matched with the service request, the location index map is looked up for control nodes on which data relevant to the service request is stored, and a control node among found control nodes with a reliability ranking above a certain ranking level is selected.

Embodiment #10: The first computing device according to Embodiment #9, wherein, the reliability ranking of the control node is determined based on at least one of the control node's total attendance time and its rate of failure-to-response Embodiment #11: The first computing device according to Embodiment #10, wherein the programming instructions cause the one or more processors to further receive a first complaint message from a second computing device 602 containing information on a peer control node 602N, and to update the reliability ranking of the peer control node based on the first complaint message.

Embodiment #12: The first computing device according to Embodiment #11, wherein the programming instructions cause the one or more processors to further receive a second complaint message from a third computing device containing information on its parent control node, and, to update the reliability ranking of the parent control node based on the second complaint message.

Embodiment #13: A second computing device 602 in hierarchical network 600, the hierarchical network 600 comprising one or more first computing devices 601 and a plurality of functional units 666 each performing a service function, anyone of the functional units comprising at least a second computing device 602 serving as control node 602N, wherein the second computing device 602 comprising one or more processors, a memory for storing programming instructions, and a communication module (as shown in FIG. 10), wherein the programming instructions when executed cause the one or more processors to perform the following operations:

receiving a first enrollment request from a candidate computing device 699 via the communication module, the enrollment request indicating the candidate computing device 699's prospective role as process node (603N), the candidate computing device 699 being a publicly accessible device or a publicly inaccessible device such as a device privately owned by an individual or a company;

grading the candidate computing device 699 for its service capabilities, sending a first enrollment response to the candidate computing device 699 based on the grading, the first enrollment response indicating acceptance or disqualification as process node 603N; and reporting to the first computing device 601 about the status of said second computing device 602.

Embodiment #14. The second computing device 602 according to Embodiment #13, wherein, the programming instructions cause the one or more processors to further, send a second enrollment request to a first computing device 601 via the communication module, the second enrollment request indicating a prospective role as control node 602N in a hierarchical network 600; and receive a second enrollment response containing information on an assigned functional unit performing a service function via the communication module.

Embodiment #15: The second computing device 602 according to Embodiment #13 or #14, wherein network data and application data are stored in the second computing device 602, and the application data comprises index data and data being indexed to.

Embodiment #16: The second computing device 602 according to Embodiment #15, wherein, the programming instructions cause the one or more processors to further receive a service command for a user device 988 from the first computing device 601, to select an enrolled third computing device 603 as process node 603N for processing the service command, and to send a processing command to the selected process node corresponding with the service command.

Embodiment #17: The second computing device according to Embodiment #16, wherein, in selecting a process node 603N for processing the service command, a process node with a reliability ranking above a certain ranking level is selected.

Embodiment #18 The second computing, device according to Embodiment #17, wherein, the reliability ranking of the process node is determined based on at least one of the process node's total attendance time and its rate of failure-to-response Embodiment #19: The second computing device according to anyone of Embodiments #13~18, wherein the network data comprises at least the following data: a node type, a node ID, owner ID, IP address of the second computing device 602, a list of subordinate process nodes 603N, a list of its peer nodes, information on functional unit(s), a location index map which maps resources to nodes on which the resources are stored.

Embodiment #20: The second computing device according to anyone of Embodiments #13~#19, wherein, the programming instructions cause the one or more processors to perform data synchronization with the selected peers.

Embodiment #21: A third computing device 603 in hierarchical network 600, the hierarchical network comprising one or more first computing devices 601 and a plurality of functional units 666 each comprising a second computing device 602 serving as control node 602N and zero or more third computing devices 603 serving as process nodes 603N, wherein the third computing device 603 comprising one or more processors, a memory for storing programming instructions, and a communication module (as shown in FIG. 10), wherein the programming instructions when executed cause the one or more processors to perform one or more the following operations:

sending a report to its parent control node 602N;

receiving a processing command from its parent control node 602N;

sending a complaint message to its parent control node 602N against a process node 603N;

sending a complaint message to its superior root node 601N against its parent control node 602N, and performing application specific functions.

Embodiment #22: The third computing device 603 according to Embodiment #21, wherein, the programming instructions cause the one or more processors to further synchronize application data comprising index data and data being indexed to with its peers.

Embodiment #23: The third computing device 603 according to Embodiment #21 or #22, wherein, network data and application data are store in the third computing device 603 and the networking data comprising at least the following data: a node type, a node ID, owner ID, IP address of the third computing device 603, a list of peer nodes.

Embodiment #24: A hierarchical network comprising one or more first computing devices 601 as described in anyone of Embodiments #1~#12 and a plurality of functional units 666 each performing a service function, anyone of the functional units 666 comprising at least a second computing device 602 as described in anyone of Embodiments #13~#20 serving as control node 602N, at least one of the functional units 666 comprising at least a third computing device 603 as described in any one of Embodiment #21~#23 as process node 603N.

Embodiment #25: A distributed networking method in a hierarchical network, the hierarchical network comprising one or more first computing devices and a plurality of functional units each performing a service function, any one of the functional units comprising at least a second computing device serving as control node, comprising:

receiving an enrollment request from a candidate computing device via the communication module, the enrollment request indicating the candidate computing device's prospective role as control node or process node, the candidate computing, device being a publicly accessible device or a publicly inaccessible device such as a device privately owned by an individual or a company, grading the candidate computing device for its service capabilities, assigning the candidate computing device a role of a control node in one of the functional units in the hierarchical network based on the grading, and sending an enrollment response containing information on the assigned functional unit to the candidate computing device via the communication module, if the first enrollment request indicates the candidate computing device's prospective role as control node.

Embodiment #26: A distributed networking method in a hierarchical network, the hierarchical network comprising one or more first computing devices and a plurality of functional units each performing a service function, any one of the functional units comprising at least a second computing device serving as control node, comprising:

receiving an enrollment request from a candidate computing device via the communication module, the enrollment request indicating the candidate computing device's prospective role as process node;

grading the candidate computing device for its service capabilities; and sending an enrollment response to the candidate computing device based on the grading, the enrollment response indicating acceptance or disqualification as process node.

Figure 1B:
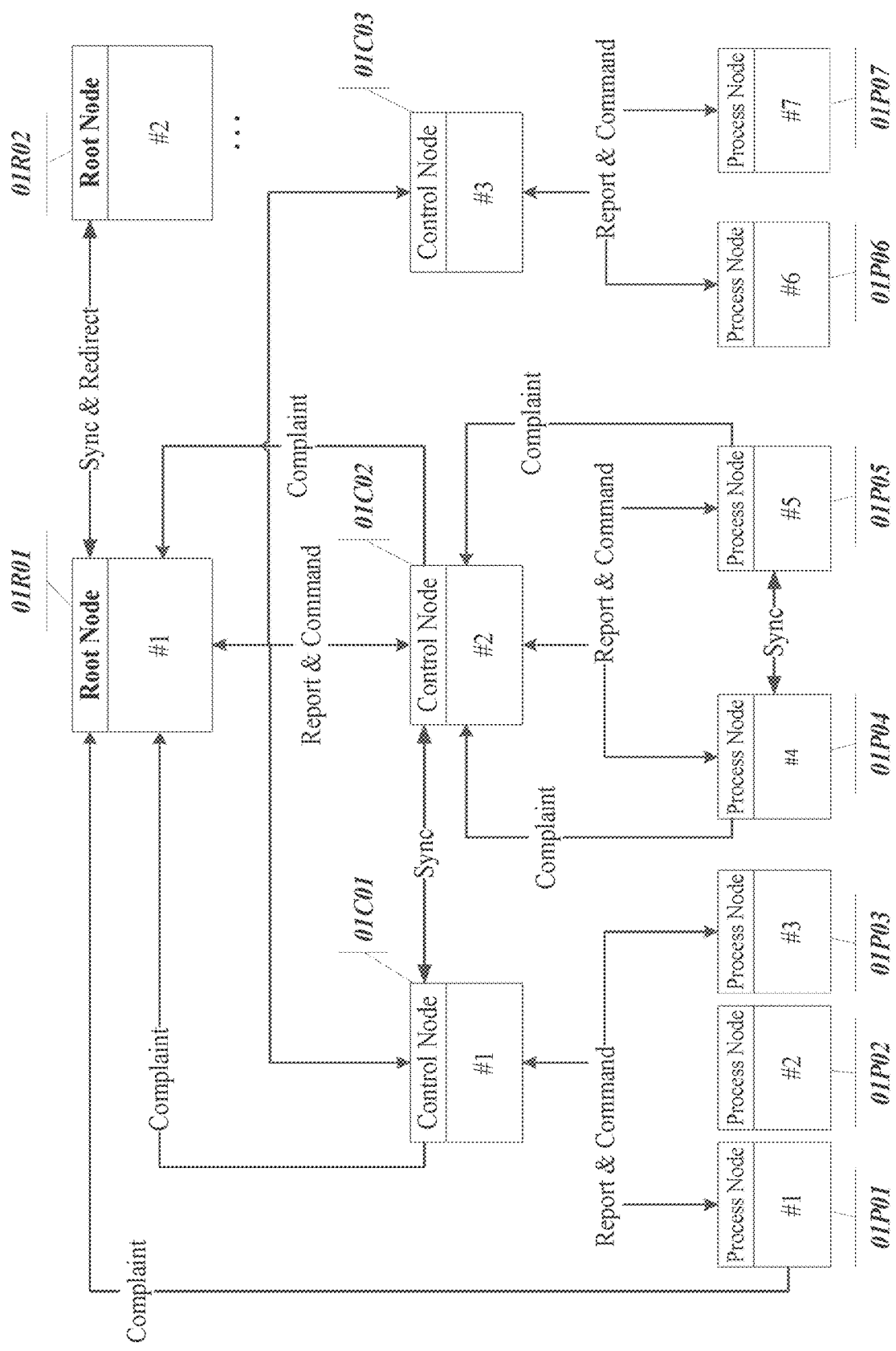
FIG. 1B illustrates an exemplary hierarchical computing network with 3 layers of nodes, and the relationships and interactions among them according to an embodiment of the present disclosure.

FIG. 1B illustrates an exemplary 3-layer hierarchical computing network according to an embodiment of the present disclosure. There are 3 types of network nodes in this computing network, namely from top to bottom, the 3 types of network nodes being root node, control node and process node. Each node may represent a computing device, a control circuit, or a software program of a particular node type running on a computing device. In at least some embodiments, for clarity and convenience, in the case of each node representing a computing device, we respectively name the root node, control node and process node as first computing device, second computing device and third computing device. All nodes in the diagram must be connected to and running on a physical or wireless computer network, thus accessible from other nodes via IP address and pre-defined communication ports. Solid lines between 2 nodes represent the interactions between the nodes. Arrow at the end of each line illustrates the direction of data or command flowing between the 2 connected nodes.

As illustrated in FIG. 1B, a hierarchical network includes one or more first computing devices as root node 01R01 and a plurality of second computing devices as control nodes 01C01, 01C02 and 01C03. In addition, under a control node, there may be one or more third devices serving as process nodes. A control node along with the process nodes under it (if any) forms a functional unit performing a specific service function. For example, control node 01C01 has three process nodes 01P01, 01P02 and 01P03; and control node 01C01 and three process nodes 01P01, 01P02 and 01P03 form a functional unit.

As illustrated in FIG. 10, each computing device 1000 among the first computing device, the second computing device and the third computing device includes one or more processors 1010, a memory 1020 for storing programming instructions, and a communication module 1030. The programming instructions 1040, when executed, may cause the one or more processors 1010 to perform the corresponding operations to its role as root node, control node or process node.

The main purposes of having a multi-layer hierarchical network structure are spreading out the burden of computation, network traffic and data storage to as many network nodes as possible and making the entire network dynamically scalable to ever increasing demands for computing power, data communication speed and data storage, thus overcome the obvious disadvantage of the client-server architecture where all burdens are shifting to and concentrating on the server side. In the case of Cloud computing, data centers take the most of the burden. Client computers, even still very powerful and capable are in the trend to become merely presentation devices. A hierarchical architecture makes it possible to use large amount of personal computers to replace the high end server machines that are normally found in data centers that now become the backbone of today's Cloud computing infrastructure. The key of success of a distributed computing network is to define the role of each computing node; the interactions among, different nodes at different levels; and an incentive mechanism that encourages people join their personal computing devices in the network and keep them running most of the time. Different from high end server machines found in data centers, nodes in the computing network can be ordinary personal computers at home and office or even mobile devices with different computing power, capacity and reliability. Overall computing power, performance, capacity and reliability can be achieved via effective organization of a large number of computing nodes.

A tree structured computing network as shown in FIG. 1B resembles a human organization, e.g. a country or a company. It is hierarchical with fewer nodes at the top of the tree and more nodes down the hierarchy. All computing nodes in the tree are organized in order to effectively perform some given jobs: computation, driving/controlling, data processing, storage, management and delivery etc. Nodes at the top level perform a large amount of light weight jobs while nodes at the bottom level perform a few heavy liftings. Any computing device with any computing power and capacity (CPU speed, memory, HD, network card, network access etc.): server machine, desktop computer, laptop computer, even tablets and smartphones can find a place to serve in the computing network, as long as it is connected physically to the Internet or Intranet and registered to the hierarchical computing network. At the same time, any computing device may consume the services that the computing network provides as long as it is physically connected and granted the permission to use the services.

The objective of the present disclosure is to have a network architecture that can be applied to various applications and systems that store, process, manage, disseminate and deliver large amount of data from/to large amount of networked computing devices. The present disclosure categorizes the data into 2 types: application data and network data. Application data depends on specific applications of the present disclosure. Network data is common to all applications. Network data is about the organization of the network. Network data includes, but is not limited to, a) node type and ID, b) IP address and geographical location of a node; c) superior node; d) a list of subordinate nodes; e) a list of peer nodes; f) working schedule of a subordinate node; g) functional unit; h) location indexes for application data. Both network data and application data are distributed in the present disclosure, meaning each node handles the amount of data that is capable of and efficient at, the higher hierarchy of a node, the more network data and less application data to handle; the lower hierarchy of a node, the more application data and less network data to handle.

For example, the network data stored on a root node includes, but not limited to, one or more of the following: a node type, a node ID, IP address of the first computing device, a list of subordinate control nodes, a list of its peer root nodes, information on functional units, a location index map which maps resources to nodes on which the resources are stored.

As another example, the network data stored on a control node includes, but not limited to, at least the following data: a node type, a node ID, owner ID, IP address of the second computing device, a list of subordinate process nodes, a list of its peer nodes, information on the functional unit it represents, a location index map which maps resources to nodes on which the resources are stored. Optionally, application data is also stored on a control node. Application data includes, but not limited to, index data and the data being indexed to. In an online file management application, the index to a file can be as simple as a unique ID, and the data being indexed to is the content of the file.

As yet another example, the network data and application data are stored on a process node (in the third computing device), and the networking data comprising at least the following data: a node type, a node ID, owner ID, IP address of the third computing device, a list of peer nodes. And the application data includes, but not limited to, index data and the data being indexed to. In an online file management application, the index can be as simple as a unique ID, and the data being indexed to is the content of the file.

To handle a large amount of data by a large number of nodes for a large number of users, an object oriented approach can be considered in some embodiments. A node is an object that has many attributes, such as object ID, node type, IP address, storage capacity, memory capacity and owner information etc. Different types of nodes may have different set of attributes. A user is another type of object that has many attributes such as object ID, first name, last name, Email address, login credentials etc. Different users have different values for the attributes for the type of user object. A document is yet another type of object. Possible attributes include, but not limited to, object ID, name of the document, owner of the document, date & time when the document was injected into the system etc. Obviously, node objects belong to network data while document objects belong to application data. Nevertheless, all objects can be identified by a unique ID string across the system to support large number of objects, UUID (Universally Unique Identifier) is a good candidate for object ID as it is a huge number that is good for identifying $2^{122}$ or $5.3\times10^{36}$ different things. An UUID can be represented as 32 hexadecimal digits displayed in five groups separated by hyphens, in the form 8-4-4-4-12 for a total of 36 characters, for example, "xxxxxxxx-xxxx-Mxxx-Nxxx-xxxxxxxxxxxx".

All digits in an UUID are case insensitive. However, raw UUID is not good enough for an object oriented approach as it's missing the information of object type. The present disclosure proposes a modified UUID string with the object type information prefixed to a raw UUID, "tttt-xxxxxxxx-xxxx-Mxxx-Nxxx-xxxxxxxxxxxx", where tttt is a 16-bit number that identifies an object type in hexadecimal format. This allows the system to handle a large number of objects of $2^{16}$ or 65536 different types. Following is a sample object ID for a user object, "000d-a936552d-e290-48b7-8b6d-fd17ded9f88f".

Combining a type ID with a raw UUID not only increases the number of objects that a system can identify, but also enhances the performance in scenarios where with a given object ID, the object type can be quickly obtained without having to going through a time consuming query. The only downside is 4-byte of extra storage space for each object in the system. Actually, since we know the 8-4-4-4-12 structure of a GUID, we don't really need the 4 hyphen characters in in a GUID string. This means an object ID is only 36 characters long. For potentially as much as 7 billion users, there is only 234 GB of storage space for all user IDs.

FIG. 1B illustrates the structure of the hierarchical computing network and the connections and the interactions between 2 nodes. All diagrams in this document only show the connections and interactions that are common to all applications. Application specific connections and interactions between nodes shall be left to individual applications. At the top of the diagram, there are 2 root nodes 01R01 and 01R02 Two root nodes are connected by a solid line with arrows on both ends. Root nodes are the representatives of the entire computing network. All service requests go through them first. Root nodes resemble executive directors of a company. They make important decisions They listen to various requests from users who send the requests via computing devices or user agents, or from other computing nodes in the network. They are public nodes and their network addresses are well known to users who may want to use the services that they provide. They are strategically located in different regions each serving users in their region respectively. Their name or IP address are not only well known to potential users, but also well known to all the nodes under their command. Resembling to a human organization where employees all know the name of their boss and the name of their boss's boss, control nodes 01C01, 01C02 and 01C03 know the name or IP address of their superior root node 01R01 All process nodes in this diagram know the name or IP address of root node 01R01. Process nodes 01P01, 01P02 and 01P03 know control node 01C01. However, they don't know control node 01C02. On the other hand, a superior node knows all of its direct subordinate nodes. For example, root node 01R01 knows control node 01C01, 01C02 and 01C03. Control node 01C02 knows process node 01P04 and 01P05. Control node 0102 doesn't know process node 01P06 and 01P07. Root node 01R01 doesn't know any of the process nodes in the diagram. At the same hierarchy level, if there is a connection in between, 2 nodes may know each other. For example, root node 01R01 knows root node 01R02 and vice versa. Actually, all root nodes may know each other, unless they are on a separate network. There is a solid line between control node 01C01 and 01C02 so they know each other. However, since there is now connection between 01C02 and 01C03, they don't know each other. Similarly, process node 01P04 knows 01P05. But process node 01P06 doesn't know 01P07 because there is no connection between them.

By saying a superior node knows its subordinate nodes, it means that the superior node keeps a list of objects of node type in its local data store. Each node object represents a subordinate node. A node object has several attributes including an object ID that uniquely identifies a node, the IP address of the node, the port number that the node listens to, the time when the node was enrolled into the network, the time when the root node received a report from the subordinate node, the attendance record for the subordinate node, the node's owner's ID that identifies a registered user in the system, the status of the node object, some attributes the describe the geographic location of the subordinate node, and some attributes that describe the capacity of subordinate node etc.

In exemplary embodiments, when a user asks for service via a computing device or a user agent such as web browser or a client software program designed for the network, the request goes to a root node. If a user sends the request to a root node in another region different from where the user resides, the request will be redirected to the root node located in the same region as the user node from where the request originates. If user is in a region where there is no public root node, the root node serving the region closest to where user resides shall handle the service requests from the user.

Aside from redirecting requests from user agents, root node 01R01 may perform data synchronization with its peer root node 01802 that normally resides in different geographical region. Synchronization and redirect are separate operations. They are a special form of requests. They are shown in a single line simply because of the inventor's intention to make the diagram concise yet carry enough information. Details on the connections and interactions between 2 root nodes shall be discussed in FIG. 2. Arrows on both ends of the line that connects root node 01R01 and 01R02 indicate that redirect & sync can be initiated from both ends. Data that goes with the data synchronization includes, but not limited to, a list of peer nodes and their geographical locations. For example, when a new root node is added into the network, the information about the new node shall be spread out to all peers via the synchronization operation.

From the left hand side of root node 01R01, there are 2 lines pointing toward the root node. One is a complaint from one of the control node below, and another is a complaint from one of the process node below. These 2 lines indicate that nodes at different layers may send complaint messages to root node 01R01. Actually, in order to handle requests from other nodes, either from a peer at the same level, from a control node below or from a process node at the bottom, root node must be listening to various requests and make response to them. Requests may also come from user agents as will be describe in details in FIG. 6. Requests may come from within the network hierarchy or from user nodes that are not part of the network hierarchy. There are 2 categories of requests that come to a root node: application specific requests and network requests. Application specific requests are for example file upload/download, and document search requests. Network requests are for example reports/complaints from subordinate nodes, data synchronization or redirect requests from peers, node registration/resignation requests from user agents etc.

A root node sends commands to subordinate nodes too as indicated by the line connecting root node 01R01 and control node 01C01, 01C02 and 01C03 below. Command is a special form of requests. There are 2 types of commands that a root node may send to its subordinates: application specific command, and network commands Exactly what commands a root node may sends to its subordinate control node depends on what the control node is designed to do.

In addition to listening to various requests from various nodes and sending commands to its subordinate control nodes and peer nodes, a root node performs some light weight functionalities in response to the requests it receives. Again, there are 2 types of functionalities that a root node may perform; application specific functionalities, and network functionalities. Network functionalities that a root node performs include object ID creation, object type registration, node enrollment/resignation, network data synchronization with peers, subordinate control nodes evaluation & ranking, object ID to IP mapping, management of subordinate nodes, deciding and redirecting requests to proper control node(s) etc. For the effectiveness and the overall performance of the network, a root node must evaluate and rank the control nodes under its command so that the network is in healthy condition and every service request can be handled in the most effective manner. Node's evaluation and ranking are necessary in a hierarchical computing network environment where individual nodes are not so reliable in providing services. Think about personal computers at home and office. They might have hardware or software problems, running out of battery, be shut down due to outage of electricity or even be turned off by user intentionally, at the time when it is required to deliver services. Node's evaluation and ranking guarantees that the best performing and the most reliable node get to handle the service request from user nodes.

In the middle layer of the diagram in FIG. 1B, there are 3 control nodes 01C01, 01C02 and 01C03. All 3 control nodes are under the command of root node 01R01 Control node 01C01 sends complaint message to its superior root node 01R01. Control node 01C02 also sends complaint message to root node 01R01. Control node 01C01 performs data synchronization with its peer control node 01C02. However, control node 01C03 doesn't send complaint to root node 01R01. Control node 01C01 has 3 subordinates but control node 01C02 has only two. The difference will be explained in FIG. 3. Control node 01C01 listens to commands from and reports to its superior root node 01R01. Control node 01C01 sends commands to its subordinate process node 01P01, 01P02 and 01P03, and control node 01C01 listens to reports from all 3 subordinate process nodes. Control node 01C02 listens to complaints from its subordinates 01P04 and 01P05.

Resembling to middle management of a human organization, a control node serves as the middle manager of the computing network. A control node may be a computing devices or a software program running on a computing device that performs the functionalities given to the functional unit. A functional unit (FU) in the hierarchical network is a collection of nodes headed by a control node which may or may not have subordinates. What a control node can do defines a functional unit. If a control node is not performing, offline for example, the entire functional unit is considered not performing. The computing power and capacity of a functional unit are the power and capacity of the control node itself plus those of the process nodes under its command. The main job of a control node is to carry out the service requests given from the commanding root node while help maintaining healthy & effective operations of the entire hierarchical network. Like a middle manager, in addition to effectively managing subordinates if there is any, a control node performs application specific duties given from the commanding root node when there is no subordinate to do the same. People always argue why we should have middle management in an organization. Some advocate a flat organization structure with a very strong and capable CEO, and all employees directly report to the CEO. In reality such organization never works when the business grows to some extent. Managers and CEOs are normal human beings. Some are stronger and more capable than others. Some can handle 5 direct reports effectively, some can handle 30. They are all limited in time, energy, power and capacity. Even if there is an exceptionally powerful and capable manager, the organization cannot rely on a single person without a backup or plan B Analogy applies to a structure comprised of many computing nodes. The risk of the client-server network structure resembles to that of a flat organization structure, too much emphasis is placed on the server side. As the business grows, the server side gets busier and busier and thus more computing power and capacity are demanded.

A control node also performs functionalities in response to requests and commands from other nodes in the hierarchy. There are 2 categories of functionalities that a control node performs: application specific and network specific. Control node's duties include, but not limited to, a) serving as a gateway to a collection of subordinate process nodes; b) listening to commands from its commanding root node; c) reporting periodically to its commanding root node; d) listening to requests from peers for data move and optionally data synchronization; e) maintaining and managing a list of process nodes; f) listening to requests from subordinates; g) evaluating and ranking subordinate process nodes; h) filing complaints to its commanding root node against non-preferment peers; i) keeping a list of peers; l) performing duties that a subordinate process node has to perform when none subordinate process nodes are available.

The term "gateway functionality" is worthwhile explaining here as it's one of the most important network functionalities that a control is tasked to perform. There are billions of personal computers in homes, offices, restaurants and shops. Home computers are connected to the ISP (Internet Service Provider) via a modem and possibly a router. With the growing speed of WiFi, WiFi routers are common necessity in many homes, offices, labs, even public places such as libraries, schools, shops and restaurants. Modern cable modems and fiber optic modems are also equipped with the router functionalities providing extra layer of security and protection from intrusions from the Internet. At the heart of a routing device is NAT (Network Address Translation), a method of mapping one IP address space into another by modifying network address information in IP header of packets while they are in transit across a traffic routing device. The main objective of introducing NAT is to conserve global address space in the face of IPv4 address exhaustion. One routable IP address of a NAT gateway can be used for an entire private network. However, the presence of NAT gateway makes communicating with a computer behind the NAT device difficult, if not impossible since the computer is not directly addressable from outside. For example, in a typical home network, computer A has a private IP address of 192.168.1.100 sitting behind a NAT gateway device having a public IP address of 203.0.113.1. From outside the home network, the computer at 192.168.1.100 is not directly reachable. Only the NAT gateway device at 203.113.1 is reachable. If a home computer participates in the hierarchical computing network of the present disclosure and becomes a control node, while the commanding root node is outside the home network, the root node will have difficulties sending commands to the control node due to the presence of the NAT device. Also, another control node outside the home network will have difficulties to perform data synchronizations with the control node too.

The easiest approach to get around NAT is port-forwarding. Many routers and WiFi access points from many manufacturers support port-forwarding. It is a mechanism that redirects a communication request from one address and port number combination to another while the packets are traversing a NAT device. There are other software based NAT traversal techniques, mostly involving a publically addressable third party to get around the issue. The present disclosure proposes a special routing or gateway device that serves as a legitimate control node. In addition to all functionalities that a router or gateway should provide, this special router/gateway behaves as a control node in the hierarchical computer network. The main benefit of combining the network routing+the control node functionalities on a single hardware device is to achieve maximum network performance. Whenever a command from the root node comes to the router, the command can be executed right on the device. More network functionalities of a control node shall be described later.

The bottom layer of the diagram in FIG. 1B has 7 process nodes 01P01 through 01P07. Process nodes 01P01 through 01P03 belong to a functional unit headed by control node 01C01. Process node 01P04 and 01P05 belongs to control node 01C02. And process nodes 01P06 and 01P07 belong to control node 01C03. Process nodes 01P01, 01P02 and 01P03 take commands from control node 01C01. They report to control node 01C01. Process node 01P04 and 01P05 take commands from control node 01C02. They report to control node 01C02. Process node 01P04 and 01P05 complains to control node 01C02, and they synchronize data with each other. But process node 01P01 doesn't complain to its commanding control node. The difference will be explained in FIG. 4. A process node is a computing devices or a software program running on a computing device that performs the functionalities that are designed for the process node working as a leaf in an organizational tree. Process node does most of the heavy lifting that user wants the network to do. A process node does little organizational duties as there are no subordinates to manage and coordinate for a process node. Again, there are 2 categories of functionalities that a process node performs: application specific and network specific. The duties that a process node performs include, but not limited to, a) listening to commands from the commanding control node; b) report periodically to the commanding control node; c) filing complaints to the superior root node against the commanding control node for none performance; d) filing complaints to the commanding control node against a none corporative peer process node in the same functional unit; e) synchronizing data with peer process nodes in the same functional unit; and g) driving a networked computing device.

In an embodiment of the invention, a process node can be used to turn on/off a networked switch. In this application, a user can turn on/off a switch remotely from a browser or a mobile phone. A remote control application running on the hierarchical computing network should enable people controlling many IoT (Internet of Things) devices at home and offices remotely without going through the proprietary network owned and maintained by many different hardware manufacturers. A process node knows how to communicate with a specific type of networked device. If a user has 10 different switches at home, even if from 10 different manufacturers, the user only needs to deploy 10 process nodes on one of the computers at home. Then the user can start control all 10 switches independently from a single user interface on a browser window or from a single App on the smartphone. This user doesn't have to remember 10 different user accounts and passwords to login to 10 different websites from 10 manufacturers.

In another application, process node serves as a content manager that manages folders and files on a personal computer. The hierarchical computing network enables users to manage their personal files of any formats remotely online from any device anywhere. Effectively, this application brings users' personal files and folders that otherwise can only be accessed locally online, and share easily with other users. This application can be very useful in the face of ever growing amount of personal documents, pictures, and audio/video files. Instead of putting them onto the Cloud storage owned and managed by companies such as Microsoft One-Drive, Google Drive, Dropbox and the like, your personal files remain on your personal computer. Additionally, if a user chooses to share extra storage space on his personal computer with friends and family members, this application allows multiple users access and manipulate the folders and files on the user's personal computer remotely. In this application, a process node must be able to perform some content management functionalities including, but not limited to, 1) creating a folder; 2) creating a document in a specified folder, 3) deleting a document; 4) deleting a folder; 5) moving a document from one folder to another; 6) sharing a document or folder with another user; 7) listing the content of a folder and disseminating the list to the specified receiver; 8) disseminating the content of a document to the specified receiver; 9) encrypting the content of the uploaded document before saving it on local file system; 10) decrypting the content of a document before dissemination; 11) checking out a document to prevent other users from modifying; 12) checking in a document to create a new version, 13) managing a small number of users and their individual storage space; 14) authenticating user access; 15) maintaining both structured and unstructured data for multiple users; and 16) disseminating data with encryption. More features and functionalities of the process node will be described later.

Figure 2:
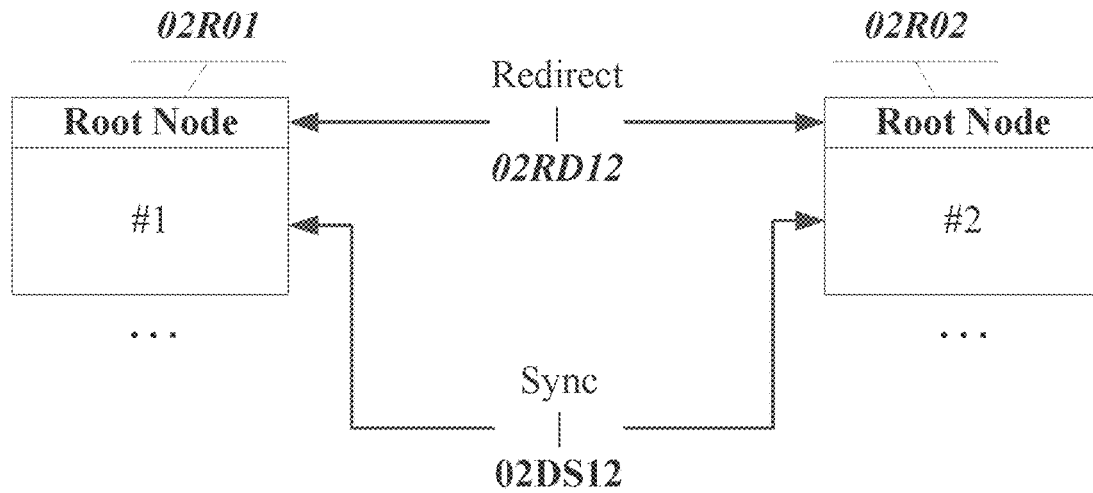
FIG. 2 illustrates relationship and interactions between 2 root nodes according to an embodiment of the present disclosure.

FIG. 2 illustrates the connections and interactions between 2 root nodes 02R01 and 02R02 according to an embodiment of the present disclosure. In preferred embodiments, root nodes are strategically placed by geographical regions in order to balance out the overall traffic of the entire network. Requests from a user shall be redirected to the root node located in the nearest location. Redirect and synchronization are special forms of request. Request is one directional. Both redirect and sync in this diagram go from both directions of the connection. Redirect 02RD12 in FIG. 2 indicates root node 02R01 may redirect user requests to root node 02R02, and root node 02R02 may redirect user requests to root node 02R01. This approach is different from the server side load balancer approach where a load balancer forwards requests from users to one of many "backend" servers which usually reply to the load balancer. Users don't know the existence of those "backend" servers. Actually, to make root node reliable, server side load balancers may be deployed for busy root nodes.

Synchronization is also an operation that can be initiated from both ends of the connection. Sync 02DS12 in FIG. 2 indicates that root node 02R01 synchronizing data with root node 02R02 and vice versa. At the root level, root nodes synchronize a list of peers and their regions so that they know where to redirect a service request from a user. Data synchronization is essential when new root nodes being added to the network and an existing root node being taken out of the network. Synchronization is initiated by each and all root nodes. Synchronization shall be performed periodically and automatically without interference from a human. To start synchronization, root node 02R01 sends requests to each and all of its peers asking for their copy of the list of root nodes. A root node keeps a list of node objects of root node type with each represents a peer root node. Each root node object has a unique node ID, IP address, a timestamp that indicates when this object had being modified lately, and a value indicating the status of the object (Created, Modified, Deleted and Destroyed). If a root node is just being added to the network, the node object of the new root node may have the "Created" status while the timestamp indicating the date/time that the object was created. When the node is modified for some reason(s), the node object of the node may have the "Modified" status while the timestamp indicating, the date/time when the modification happened. If the node is deleted, the node object is never removed from the system rather should have the "Deleted" status while the timestamp indicating exactly when the node deletion happened. Similarly, if the node is destroyed, the node object is never removed from the system rather should have the "Destroyed" status while the timestamp indicating the date/time when the node had been destroyed. The difference between "Deleted" and "Destroyed" is that a deleted object can be restored. A restored object resumes the status of "Modified" while the timestamp indicating the date/time when the object was restored. However, a destroyed object cannot be restored. Destroyed objects are up to the garbage collection operation to remove them completely from the system. A root node never syncs network/application data with a peer that has the status of "Deleted" or "Destroyed". By comparing the node list received from a peer and the list that root node 02R01 keeps, root node 02R01 is able to keep track of the latest status of all of its peers. For example, when a new root is added to the network shown in FIG. 2, the new node knows the existence of root node 02R01 and 02R02. The new node send a broadcast to root node 02R01 and 02R02 notifying them the addition of a new peer. Upon receiving the notification, root node 02R01 adds the new node to its list of peers and the new node have the status of "Created" with a timestamp of when the new node had been created. Root node 02R02 for some reason did not receive the notification so it doesn't know the existence of the new node. Next time when root node 02R02 synchronizes with root node 02R01, root node 02R02 compares the list of peers it maintains with the list of peers from root node 02R01. The new node is an entry that root node 02R02 doesn't have. Since the status of the new node is "Created", new node shall be added to the list of peers of root node 02R02. At the same time, when root node 02R01 synchronizes with root node 02R02, root node 02R01 compares the list of peers it maintains with the list of peers downloaded from root node 02R02. The new node is not among the list of peers from root node 02R02 and the new node's status is "Created", so root node 01R01 keeps the new node.

Another example is when root node 02R01 gets deleted by administrator of the network. Root node 01R01 sends a broadcast to all of its peers 02R02 and 02R03 the one just added in previous example. Upon receiving, the broadcast from root node 02R01, root node 02R02 marks the node object as "Deleted" with a timestamp indicating the time the 02R01 was deleted. Root node 02R03 for some reason didn't receive the broadcast, so it still remembers root node 02R01 as "Modified" with a timestamp when the node was modified last time. Next time when root node 02R02 synchronizes with root node 02R03, root node 02R02 compares the list of peers it maintains with the list of peers from root node 02R03. Both lists have an entry for node 02R01. However, the timestamp for node 02R01 node object from 02R02 is newer than that from root node 02R03, so root node 02R02 keeps its record for root node 02R01. It won't try to perform synchronization with 02R01. However at the same time when node 02R03 synchronizes with root node 02R02, node 02R03 compares the list of peers it maintains with the list of peers from root node 02R02. Both lists have an entry for node 02R01. Since the node object for 02R01 having a timestamp older timestamp than the entry downloaded from 02R02, node 02R03 updates the its record for root node 02R01 so that the node object now has the status of "Deleted" with the timestamp of when root node 02R01 was deleted. From here node 02R03 will not perform synchronization with root node 02R01.

Figure 3A:
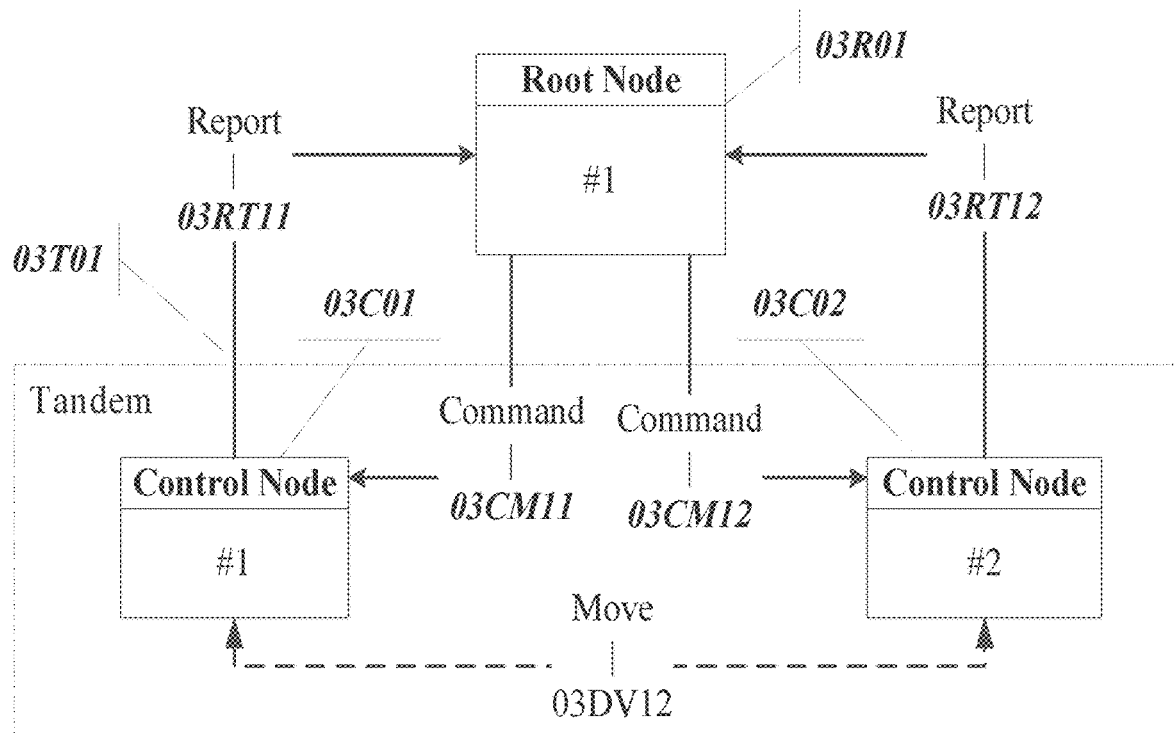
FIG. 3A illustrates a tandem of 2 control nodes under the command of a root node according to an embodiment of the present disclosure. In tandem mode, control nodes run independently from each other. The only interaction between them is initiated by the commanding root node for moving data from one control node to another.

FIG. 3A illustrates 2 control nodes placed in a tandem according to an embodiment of the present disclosure. Two or more control nodes that operate independently from each other under the same root node are referred to as a tandem. In this diagram, root node 03R01 has 2 control nodes 03C01 and 03C02. They function independently from each other. This is the default relationship between 2 control nodes under the command of the same root node. The obvious benefit of a tandem is that as a new control node is added into the network, the computing power and capacity of the root node gets enhanced. If, for example, control node 03C01 has 500 GB of free storage space and control node 03C02 has 250 GB of free storage space, the storage capacity of root node 03R01 becomes 750 GB. The disadvantage of a tandem is when control node 03C02 is offline for some reason, data managed by it becomes not available to root node 03R01 and thus to end users.

There is no solid line connecting control nodes 03C01 and 03C02. They don't know each other. However, there is a dash line connecting the 2 as shown by Move 03DV12. The dash line indicates that even though 2 control nodes don't know each other, but under some circumstances control node 03C01 may request data from control node 03C02 and vice versa, under the command from root node 03R01. In this circumstance, root node 03R01 tells control node 03C01 to get data from control node 03C02.

In FIG. 3A, both control nodes 03C01 and 03C02 report to root node 03R01. Reporting from a subordinate node to its commanding node happens periodically in a predefined time interval. Periodic status report from a subordinate node is important for the commanding node to keep track of the wellbeing and whereabouts of the subordinate nodes. It's also an important part of the evaluation and ranking mechanism of the present disclosure. The higher the ranking a control node gets, the higher the chance of the control node gets work from its commanding root node. By receiving periodic reports from a subordinate, a commanding node is able to know the IP address thus the geographic location of the subordinate. In the scenarios where computing nodes are placed in a physical network environment where IP addresses are dynamically assigned (DHCP), or computing nodes are on the move from one place to another from time to time, reporting mechanism provides a way to track changes of the IP address of the subordinate nodes so that when next time a commanding node wants to send a command it knows the correct IP address of its subordinates.

In FIG. 3A, Command 03CM11 and Command 03CM12 represent the command channels that the root node 03R01 uses to send various commands to control node 03C01 and 03C02 respectively. Command from a root node to a control node is a special form of request. Sending command from a root node is a process that includes steps to: 1) prepare a list of subordinate control nodes that are able to handle the request; 2) sort the list by the ranking of the control nodes; 3) send a what-to-do request to a control node in the list, 4) if a control node in the list doesn't respond or respond with error, pick the next control node in the list and repeat from step 3) until the what-to-do request goes through successfully. During the process, if a control node is found not responding or responding with an error, the control node is considered non-performing thus the ranking of the subordinate shall be lowered by the root node. If going through the list without being able to send the what-to-do request successfully, root node will stop the process and return error to the caller. There are 2 categories of commands that a root node may send to its subordinate control nodes. One category is network specific. For example when a process node candidate asks for joining the network, the request is sent to the root node which in turn uses the command channel to redirect the node registration request to either 03C01 or 03C02. Another category is application specific. For example to apply the present disclosure to a content management system, root node 03R01 may send file download command to control node 03C01 through Command 03CM11. In this particular example, which control node get the work order depends on where the requested document is stored.

Figure 3B:
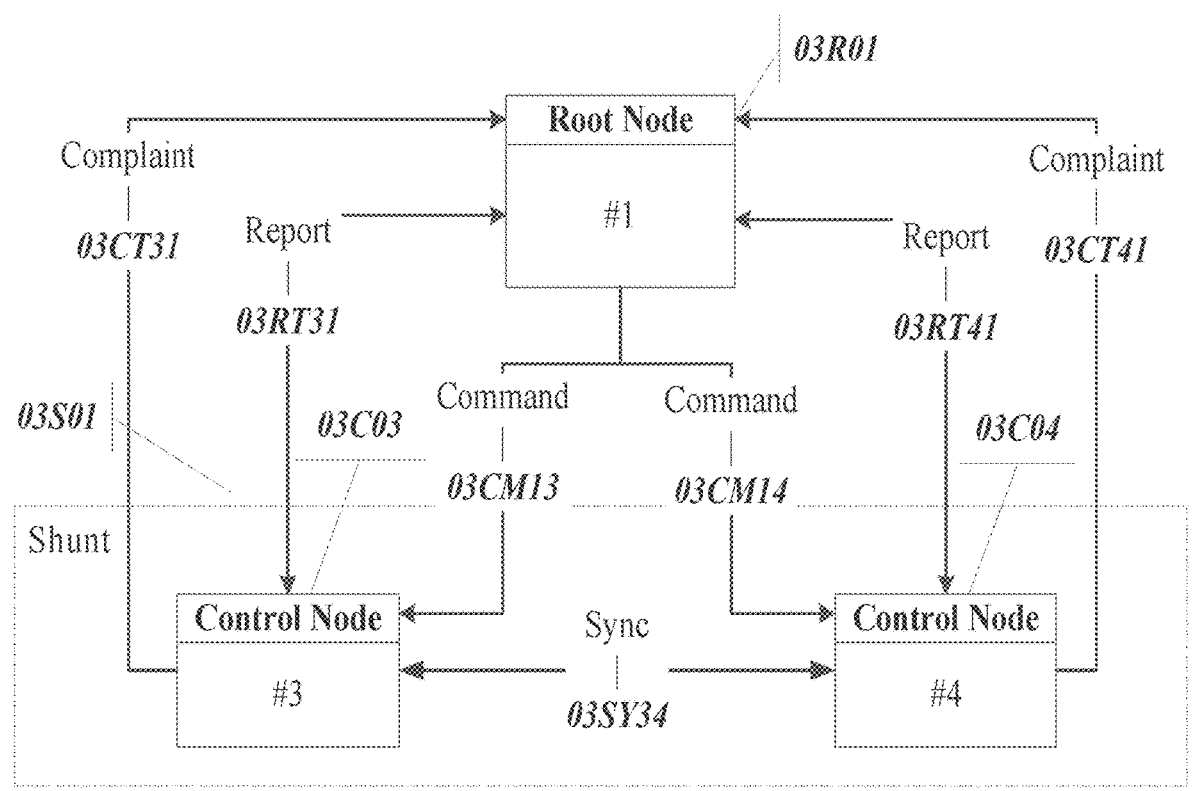
FIG. 3B illustrates Data Redundancy Unit (DFU) with a shunt of 2 control nodes under the command of a root node according to an embodiment of the present disclosure. In shunt mode, control nodes perform data synchronizations regularly and proactively without the intervention from the commanding root node. A controllable degree of redundancy can be achieved by adding more control nodes into a shunt.

FIG. 3B illustrates 2 control nodes placed in a shunt according to an embodiment of the present disclosure. Under the same commanding root node, a collection of subordinate control nodes that synchronizes data among themselves is referred to as a shunt. In this diagram, there are 2 control nodes 03C03 and 03C04 are under the command of root node 03R01. This diagram is very similar to FIG. 3A in that control node 03C03 reports to the root node via Report 03RT31, and control node 03C04 reports to the root node via Report 03RT41. Root node 03R01 sends command to control node 03C03 via the command channel 03CM13, and to control node 03C04 via the command channel 03CM14. The differences are that between control node 03C03 and 03C04 there is a connection Sync 03SY34, and that control node 03C04 sends. Complaint 03CT31 to the root node, and control node 03C04 sends Complaint 03CT41 to the root node. Control nodes in a shunt are not independent. A shunt of control nodes forms a data redundancy unit (DRU) similar to the concept of RAID (Redundant Array of Independent Disks). Control node 03C03 synchronizes data with control node 03C04 periodically at the predefined schedule and vice versa. The synchronization schedule can be changed later on manually or automatically by the commanding node. By synchronization, application data shall be duplicated across all control nodes in a shunt. A shunt guarantees a degree of service reliability. As long as there is at least one control node alive and functioning in a shunt, user is always able to get the application data he wants. To increase the degree of service reliability, simply add more control nodes into the shunt. This redundancy mechanism is different from that of RAID in that instead of relying on a controller to duplicate data among different disks, control node 03C03 and control node 03C04 synchronize the data autonomously without the intervention of the root node 03R01.

Another difference between the connections in FIG. 3A and FIG. 3B is the report. In FIG. 3B, the report connection between the root node and the control node has arrows on both ends, while in FIG. 3A the report connection only points to the root node. This indicates that in a tandem, a control node only reports to its commanding root node without getting data back. While in a shunt, a control node gets some data back from the commanding root node. In FIG. 3B, control node 03C03 gets a list of peers in the same shunt from the root node, every time it sends report 03RT31 to the root node. Information on peers is essential for data synchronizations among peer control nodes.

Data synchronization between 2 control nodes can be initiated from both sides as indicated by Sync 03SY34. Control node 03C03 can initiate the data synchronization on its synchronization schedule. Control node 03C04 can initiate the data synchronization on its synchronization schedule. However, data synchronization may fail due to the other side is not online, not responding, not functioning properly or some other reasons. If control node 03C03 initiates the data synchronization with control node 03C04 and finds that control node 03C04 is not performing, control node 03C03 files a complaint 03CT31 to root node 03R01 against control node 03C04. A complaint against the subordinate node affects the evaluation and ranking of the node negatively. The higher the ranking a control node gets, the higher the chance of the control node gets work from its commanding root node. This will become clear when we discuss the incentive mechanism for the hierarchical computing network of the present disclosure.

Figure 4A:
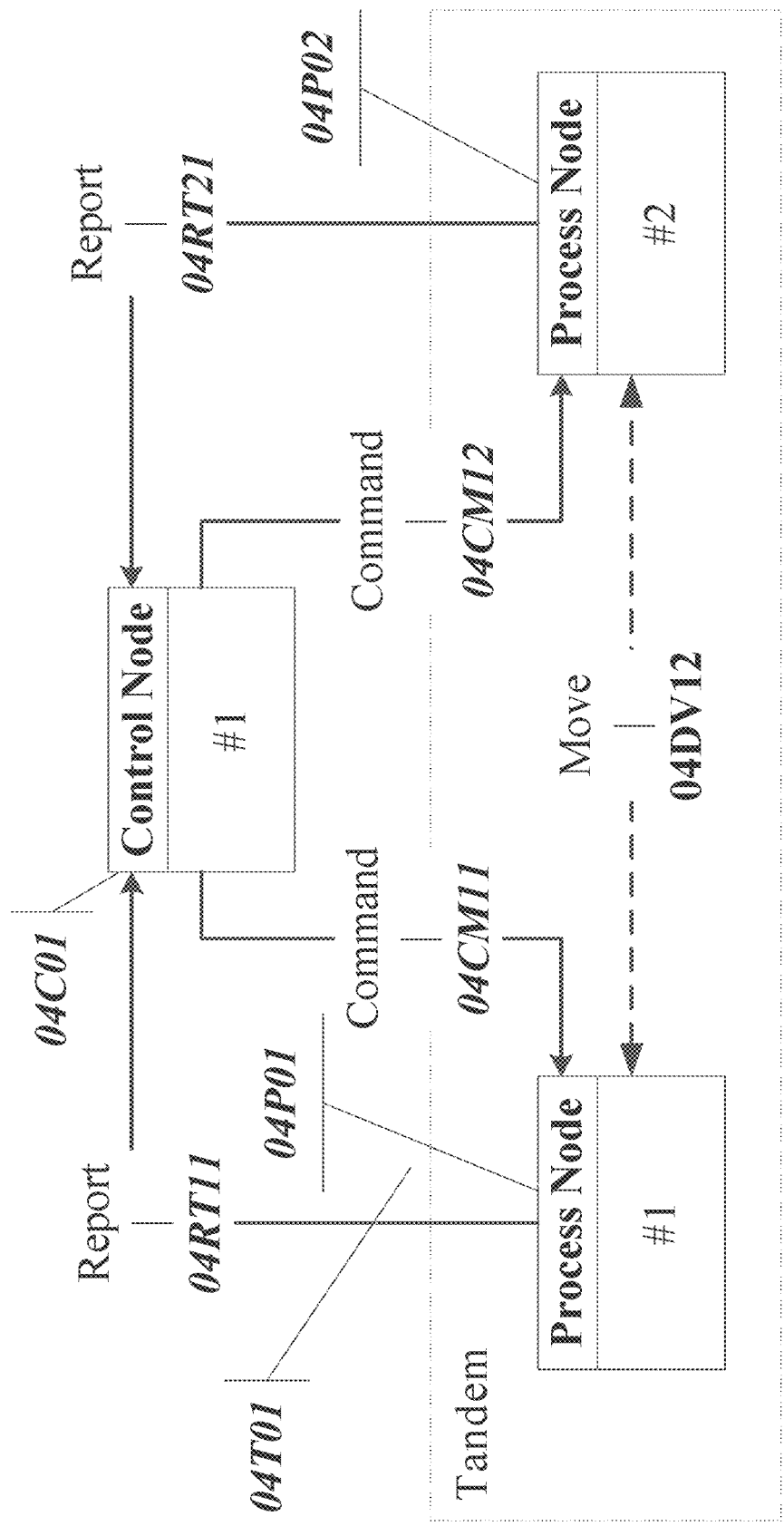
FIG. 4A illustrates Functional Unit (FU) with a tandem of 2 process nodes under the command of a control node according to an embodiment of the present disclosure. In tandem mode, process nodes run independently from each other. The only interaction between them is initiated by the commanding control node for moving data from one process node to another.

FIG. 4A illustrates a functional unit of 2 process nodes in a tandem 04T01 according to an embodiment of the present disclosure. In this diagram, control node 04C01 has 2 process nodes 04P01 and 04P02 under its command. Process nodes 04P01 and 04P02 report to control node 04C01. Control node 04C01 gives commands to process nodes 04P01 and 04P02 respectively. Process node 04P01 and 04P02 are working independently from each other. There is not solid line connecting, the 2 process nodes. Similar to a tandem for control nodes, the benefit of having 2 or more process nodes in a tandem is that the capacity of the functional unit gets enhanced when a new process node is added into the functional unit. For example, if process node 04P01 has 500 GB of free storage space, process node 04P02 has 250 GB of free storage space, and the control node 04C01 has 250 GB of free storage space, the total storage capacity of the functional unit becomes 1 TB. The disadvantage of a tandem is when process node 04P02 is offline for some reason, data managed by it becomes not available to control node 04C01. Practically, to prevent this situation from happening for online data storage applications, it is desirable to form a DRU at the control node level with two or more functional units that have the same or similar desirable grade level.

Even though process node 04P01 and 04P02 are working independently from each other, there is a dash line connecting the two, Move 04DC12 as shown in FIG. 4A. A process node in a tandem doesn't remember any other process nodes in the same functional unit. However, this doesn't mean they won't interact with each other in their life time. In some circumstances, control node 04C01 may ask process node 04P01 to download data from process node 04P02. When this circumstance arises, process node 04P01 will get from control node 04C01 the exact information on which process node to download data from.

One objective of having process nodes in a tandem is that all process nodes function independently. In the previous example of applying the present disclosure to control networked switches at home and office, process node 04P01 is the driver that drives the switch for the stove, process node 04P02 is the driver that drives the switch for the air conditioner. For an online storage application, having process nodes in a tandem provides extensibility to the capacity of the data storage of the functional unit. When the amount of data reaches the limit of the entire functional unit can offer, adding an extra process node to the functional unit increases the total storage capacity. The process of adding an extra process node to the functional unit is dynamic as illustrated in FIG. 7C. This process can be repeated as long as the commanding control node 04C01 is able to handle.

In FIG. 4A, process node 04P01 reports to control node 04C01 via Report 04RT11, and process node 04P02 reports to control node 04C001 via Report 04RT21. Reporting from a process node to its commanding control node is an important part of the evaluation and ranking mechanism of the present disclosure. A process node reports to its commanding control node periodically. By listening to reports from a process node, the control node is able to evaluate and rank the process node. By extracting the IP address from the request, the control node is able to update the IP address thus the geographic location of the process object that it keeps in its local data store. More details on the evaluation and ranking of subordinate nodes will be explained later.

In addition to reporting, control node sends commands to its subordinates too. As shown in FIG. 4A, control node 04C01 sends commands to process node 04P01 via the command channel 04CM11, to process node 04P02 via the command channel 04CM12. Sending commands from a control node to its subordinate process nodes is a process including the steps to: 1) find out the process node that receives the command; and 2) send a what-to-do request asynchronously to the process node. Depending on whether the subordinate process nodes are in a tandem or a shunt, this process may vary. If the process nodes are in a tandem, finding the candidate process node is straightforward since there should be only one candidate in a tandem to handle the command. If the process nodes are in a shunt, the list of subordinate process nodes shall be sorted by their ranking. Process node with the highest ranking gets the command first. There are 2 categories of commands that a control node may send to its subordinate process nodes. One category is network specific. For example when a process node wants to quit the hierarchical computing network, a request is sent to the root node which in turn redirects the node resignation request to the commanding control node which in turn sends a discharge command to the process node. This will become clear when we discuss the node resignation process in FIG. 8B. Another category of commands is application specific. For example, in a content management system, control node 04C01 may redirect a file download request from the commanding root node to process node 04P01 through command channel 04CM11.

Figure 4B:
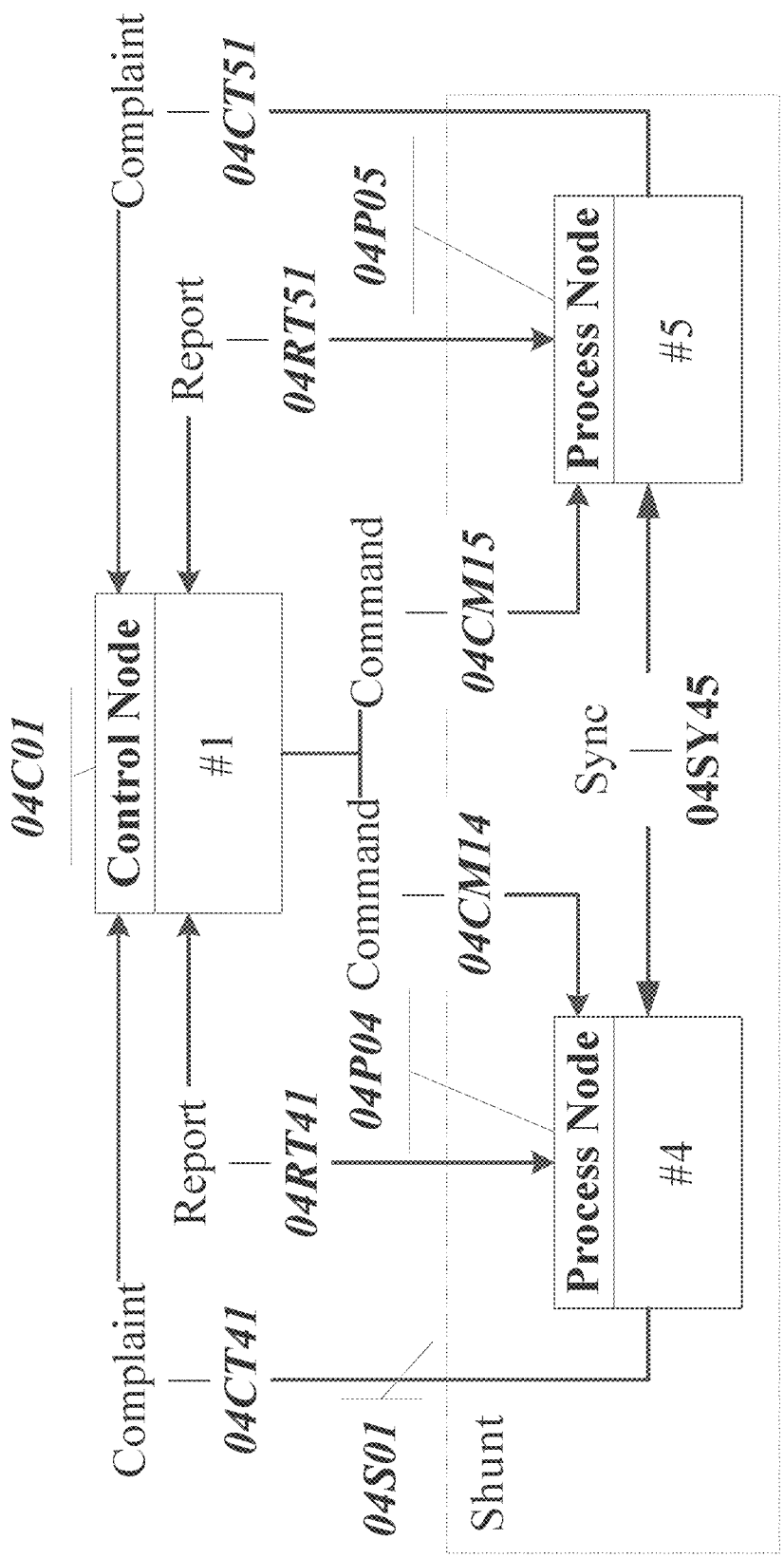
FIG. 4B illustrates Functional Unit (FU) with a shunt of 2 process nodes under the command of a control node according to an embodiment of the present disclosure. In shunt mode, process nodes perform data synchronization periodically and proactively without the intervention from the commanding control node.

FIG. 4B illustrates a functional unit with 2 process nodes in a shunt 04S01 according to an embodiment of the present disclosure. In this diagram, control node 04C01 has 2 process nodes 04P04 and 04P05 under its command. Different from FIG. 4A is first process node 04P04 and 04P05 are connected by via Sync 04SY45; second process node 04P04 files complaint via Complaint 04CT41 to control node 04C01, and third that data flowing both directions for report from process node to the commanding control node. A shunt at the process node level is a collection of process nodes that synchronize data with each other autonomously. For the purpose of data synchronizations, process node gets a list of peers in the same shunt from its commanding control node in return from the report. With the returned list of peers, a process node knows which process nodes to synchronize data with.

A complaint is filed from a process node to its commanding control node when the process node finds one of the peers in the same shunt non responsive to data synchronization request. In FIG. 4B, when process node 04P04 starts to synchronize data with process node 04P05 but finds that process node 04P05 is not responsive to the synchronization request or returned some error, process node 04P04 files Complaint 04CT41 to control node 04C01 against process node 04P05. A complaint from a peer will affect the ranking of a process node negatively.

One objective of having multiple process nodes in a shunt is to maintain the degree of service reliability. Multiple process nodes in a shunt provide data and service redundancy as they perform data synchronization among themselves. As long as there is at least one process node in the shunt is still functioning, the entire functional unit can function reliably. To increase the degree of service reliability, one simply needs to add more process nodes to the shunt.

Figure 5:
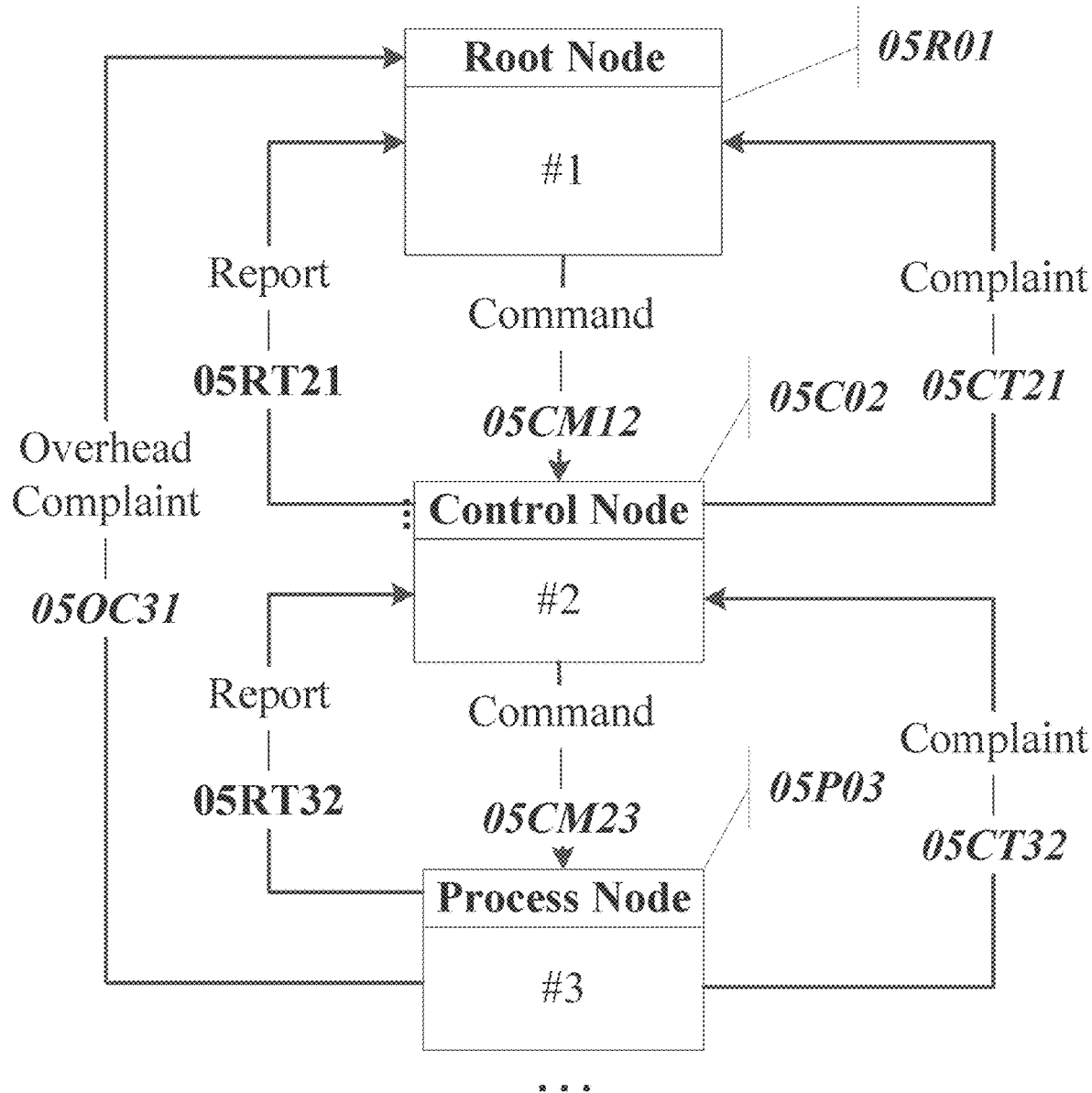
FIG. 5 illustrates how overhead complaint may happen according to an embodiment of the present disclosure. When a commanding control node is not responding to report or other requests from a subordinate process node, the subordinate process node sends an overhead complaint to the superior root node against the non-performing control node.

FIG. 5 illustrates how overhead complaint may happen according to an embodiment of the present disclosure. Overhead complaint is a complaint filed from a process node to its superior root node against the non-performing middle manager—control node. It's called overhead complaint because the complaint bypasses the commanding control node. In this diagram, overhead complaint 05OC31 is filed from process node 05P03 to its superior root node 05R01, bypassing the commanding control node 05C02. Process node 05P03 also files Complaint 05CT32 to control node 05C02. Overhead complaint 05OC31 is filed from process node 05P03 when it finds that control node 05C02 not responding to report 05RT32. After detecting the commanding control node 05C02 is not performing, process node 05P03 files an overhead complaint 05OC31 to its superior root node 05R01. Overhead complaint 05OC31 is different from regular complaint such as 05CT32. Regular complaint 05CT32 is filed against a non-performing peer while overhead complaint is filed against non-performing boss. Regular complaint 05CT32 may trigger ran overhead complaint when the process node 05P03 finds control node 05CM23 not responding to the complaint message 05CT32. Overhead complaint has negative impact on the evaluation and ranking of a control node.

There are many factors that affect the evaluation and ranking of a subordinate node. A commanding node is responsible for the evaluation and ranking of all of its direct report nodes. A root node is responsible for the evaluation and ranking of its direct report control nodes. A control node is responsible for the evaluation and ranking of its direct report process nodes. A complaint, whether overhead or regular, gives negative impact to the evaluation and ranking of a node as described in the previous section. Command from a commanding node to a subordinate node may also result in negative evaluation of a subordinate node. For example, when the root node 05R01 in FIG. 5 tries to send command 05CM12 to control node 05C02, if control node 05C02 is not responding for some reason, root node 05R01 will evaluate and lower the ranking of control node 05C02. Similarly, when control node 05C02 tries to send command 05CM23 to process node 05P03, if process node 05P03 is not responding for some reason, control node 05C02 will evaluate and lower the ranking of process node 05P03.

Evaluation and ranking of subordinate nodes is important for a computing network where computing nodes are not so reliable. Think about personal computers at home and office. They might be having hardware or software problems, running out of battery, be shut down due to outage of electricity, or even be turned off by the owner, at the time when it is required to deliver services. Nodes evaluation and ranking provides infrastructure level support to an incentive mechanism that encourages and motivates participants to remain in the network and perform functionalities that they are given. Regardless of the capacity and capability, any computing device that can be networked should be able to participate in and contribute to the hierarchical computing network by becoming a control node or a process node. An incentive mechanism built into the network helps the proper functioning and overall reliability of the network when majority of the participant computing nodes are owned and maintained by many stakeholders. Resembling to a human organization, the incentive mechanism revealed according to an embodiment of the present disclosure sets the rules for rewards and penalties. At the core of the incentive mechanism is the rank of a subordinate node that is given by its commanding node. For example, there may be at least 7 ranks for every one and all subordinate nodes in the hierarchical computing network:

AAA—node's uptime above 99.9%
AA—node' uptime above 99% but below 99.9%
A—node's uptime above 90% but below 99%
B—node's uptime above 80% but below 90%
C—node's uptime above 70% but below 80%
D—nodes' uptime above 60% but below 70%
F—node's uptime below 60%

The uptime value of a subordinate node can be calculated from the following formula Uptime=Attendance_Time/Total_Time, where Total_Time is the total number of seconds since the subordinate node joined the network via the node registration process, and Attendance_Time is the total number of seconds that the subordinate node remains in the network and is considered functioning properly as a part of the network. To remember the attendance time for a node, an attribute is created for every one and all subordinate nodes. Every time the subordinate node sends status report to its commanding node, the commanding node adds the specified reporting interval worth of seconds to the attribute. If a subordinate node is set to report to its commanding node in 10 minutes interval, the commanding node adds 10×60, i.e. 600 seconds to the attribute for the specific subordinate node. If for some reason the commanding node does not receive status report from this subordinate node, the value of the attribute doesn't get updated. Reporting periodically increases the attendance time thus rewards the subordinate node in terms of its ranking. Complaints and failure to answer to commands from the commanding node penalize the subordinate node on the other hand. When a commanding node receives a complaint about one of its subordinate node, the commanding node subtracts the specified reporting interval worth of seconds from the attendance attribute of the subordinate node. If the subordinate node is set to report to the commanding node in 10 minutes interval, the commanding node subtracts 10×60, i.e. 600 second from the attendance attribute of the subordinate node. When a commanding node tries to send a command to one of its subordinate node, but finds out that the subordinate node is not responding, the commanding node also subtracts the specified reporting interval worth of seconds from the attendance attribute of the subordinate node.

Ranking of a subordinate node (control or process node) not only encourages the function and performance of the network, it may become an important deciding factor for users who want to rent a few nodes among many candidates for their online service needs. A ranking value can be considered a measurement of the reliability of a subordinate node in the network. Ranking value changes as time goes by. For process node, its ranking value is its uptime described above. Ranking a control node is a little bit more than ranking a process node. If a control node doesn't have any subordinate, the process of ranking the control node is the same as that of a process node. The ranking value of a control node without subordinates is referred to as intrinsic ranking. When there are one or more subordinates, intrinsic ranking is not enough to reflect the reliability of the functional unit that a control node represents. A ranking value that represents the reliability of the entire functional unit is desirable. This is referred to as collective ranking or ranking for a functional unit. Depending on the type of a functional unit, the calculation of collective ranking is different. For a functional unit of a tandem of process nodes, the collective ranking is determined as follows:

Collective Rank=Min$\{R^C, R_1^P, R_2^P, \ldots, R_n^P\}$ where $R^C$ is the intrinsic ranking value for the commanding control node, $R_1^P$ is the ranking value for the first subordinate process node, $R_2^P$ is the ranking value for the second subordinate process node, and $R_n^P$ is the ranking value for the nth subordinate process node. The collective rank of the functional unit takes the smallest value among all ranking values since that smallest value represents the weakest point of the tandem.

However, for a functional unit of a shunt of process nodes, the collective ranking is determined as follows.

Collective Rank=Min$\{R^C, 1-(1-R_1^P)(1-R_n^P) \ldots (1-R_n^P)\}$ where $R^C$ is the intrinsic ranking value for the commanding control node, $R_1^P$ is the ranking value for the first subordinate process node, $R_2^P$ is the ranking value for the second subordinate process node, and $R_n^P$ is the ranking value for the nth subordinate process node. The collective rank of the functional unit takes the smallest between $R^C$ and the ranking value for the shunt of subordinate process nodes.

Even though DRU might not be an object in the network (depending on actual implementations), a ranking value for a DRU can be obtained as follows.

DRU RANK=$1-(1-R_1^C)(1-R_2^C) \ldots (1-R_n^C)$ where $R_1^C$ is the collective rank for the first control node in the DRU, $R_2^C$ is the collective rank for the second control node in the DRU, and $R_n^C$ is the collective rank for the nth control node in the DRU. Reliability increases as more control nodes are added to a DRU.

Aside from ranking, a subordinate node in the hierarchical computing network gets graded by its service capabilities. Grade describes the capability and qualification of a subordinate node regarding the type of tasks it's assigned to do. How to grade a subordinate node varies from application to application. Many factors affect the grading of a subordinate node including, but not limited to a) total disk space, b) free disk space; c) type of drive (HD or SSD), d) speed of the hard drive, e) total memory, f) free memory space, g) number of CPUs, h) the speed of each CPU, i) CPU usage, j) the speed of the network connection, download/upload; and k) the type of operating system. For many operating systems, a native application is able to obtain these factors programmatically. An exemplary grading mechanism is for an online storage system where the amount of free disk space in number of bytes on a computer is categorized as follows:

1—above 5 GB less than 15 GB
2—above 15 GB less than 50 GB
3—above 50 GB less than 250 GB
4—above 250 GB less than 1 TB
5—above 1 TB less than 4 TB
6—above 4 TB less than 12 TB
7—above 12 TB less than 50 TB
8—above 50 TB less than 1 PB
9—above 1 PT Grading a process node is normally performed at the node enrollment time. Grading a node happens prior ranking a node as the node's service qualification comes before the reliability. Node's grade value may change over time thus node's grading is a continuous process. If grade value changes significantly, the node may get upgraded or downgraded. Downgraded node may get kicked off from a functional unit or disqualified from a DRU. Using the grading mechanism for an online storage system above, if a process node has 100 GB free disk space on the computer where the process node runs, the process node receives grade value of 3 at the time of enrollment. Grade value may change due to many factors including for example a) owner of the computer installing or uninstalling software from the computer; b) owner of the computer upgrades the entire hard drive or even the machine; c) owner of the computer downloads significant amount of data from the Internet or network. Changes in the amount of free disk space affect the grading. However, it is guaranteed that free disk space changes induced by the use of the process node do not change the grade value because the node always knows how much disk space it has used.

A control node has its own grading value referred to as intrinsic grade. Control node's intrinsic grade is obtained in the same way as that of a process node. However, if a control node has one or more subordinate process nodes, control node's intrinsic grade is not sufficient to reflect the grade of the functional unit that the control node represents. Grade value of a functional unit is referred to as collective grade. Grading a functional unit depends on the type of the functional unit. If a functional unit is a tandem of process nodes, all subordinate process nodes in the functional unit work independently, thus the collective grade shall be determined by the following formula:

Collective Grade=Control Nodes free disk space+ sum of free disk space of all of subordinate process nodes in a tandem If a functional unit is a shunt of process nodes, all subordinate process nodes duplicate the same set of application data. Thus the process node that has the smallest free disk space sets the limit. The collective grade shall be determined by the following formula:

Collective Grade=the smallest free disk space among all subordinate process nodes in a shunt From end user perspective, grade and ranking are 2 important factors for deciding which nodes to select to serve theirs needs since higher grade of equipment is more expensive to obtain, and higher ranking of equipment costs more to maintain. In an online storage system, if a user wants 200 GB of online storage space, the system is able to give the user a list of control nodes with the grade value of 3 and higher to choose from. The user is able to see the collective ranking of each control node. Since ranking reflects the reliability of a node, this list can help user to decide which node meets the user's need on service reliability. Another service reliability related factor that end user can choose is the redundancy rate. By choosing 2 or more control nodes from the list, the user can create a Data Redundancy Unit (DRU) to further enhance the reliability. More control nodes in a DRU, the higher of the service reliability.

Figure 6A:
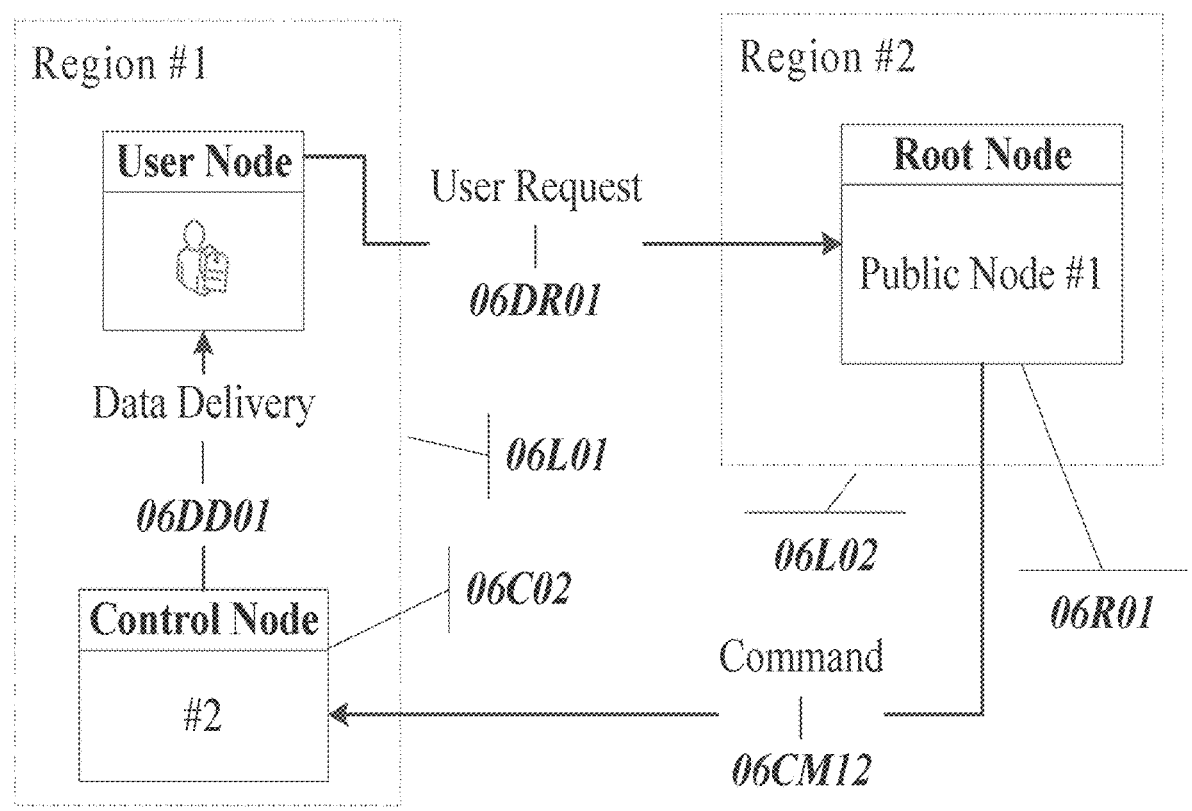
FIG. 6A illustrates a user node requesting data from a public root node, and how the requested data gets delivered by a subordinate control node in the same geographical region as the user node according to an embodiment of the present disclosure.

Computing network architecture is never complete without considerations on how the network shall be used from end user perspective. FIG. 6A illustrates how user may interact with and use the services provided by the hierarchical computing network according to an embodiment of the present disclosure. At the top left corner of the diagram is a user node through which a human user can interact with and request services from the network. A user node is a computing device, an agent such as web browser or a software program running on a computing device. A user node must be physically connected to the hierarchical computing network in order to get services. User credential is required to use the services provided by the network. A user node can be a software program running on a computer where a process node or a control node is also running. From a user perspective, his personal computer can be a user node using the services that the network provides at the same time providing services to the hierarchical computing network, for example acting as a process node. In FIG. 6A, the user node requests data from a root node 06R01. Root node 06R01 is a public node with the address that's easy to remember, for example an URL. User Request 06DR01 is sent from the user node to root node 06R01. Please notice that user node is located in a different region from where the root node is located. This is normally the case where there are only a limited number of root nodes. User node is located in geographic region 06L01 while root node 06R01 is located in region 06L02. User requests can be categories into 2 categories: data retrieval and data insertion. Data retrieval is sent from a user node to retrieve existing data that is stored somewhere on the network. Data insertion is sent from a user node to create a new record on the network. FIG. 6A illustrates the process of data retrieval and the relevance of geographical locations. Upon receiving user request 06DR01, root node 06R01 looks up the location index map for a control node where the specified data is stored. Location index is a resource ID to node mapping. Resource is an object persisted in the local storage of a control node or a process node. Resource is in the domain of application data. A resource object is created in the system from user input or an action thus a resource object is owned by a specific user. A good example of resource is a document store on the network. Location index map is a collection of resource IDs and the IDs of the nodes that handle each resource respectively. Given a resource ID, a node ID can be obtained from the map. A root node maintains a location index map, so that when a data retrieval request comes in, it can looks up the node that is responsible for the requested data. All data retrieval requests must come with a resource ID indicating what to retrieve from the network. For a data injection request, since the data is not in the system yet, it's the root node's responsibility to pick a control node and then redirects the user request to the control node. The first principal of picking a control node to handle a new resource (for example user uploaded a new document) is by geographic proximity to where user is. The closest control node shall get picked, if no other principals apply. This principal guarantees that user can get data service from a local control node. The second principal is to keep user data in a single control node. In a content management application, user may have a few documents and a few folders. This principal guarantees that data operations such as search will be performed on a single machine instead of searching the data repositories on several control nodes. There are other principals that may affect the selection of control nodes, for example grade and ranking. When a user signs up for the service, he gets the opportunity to choose the grade and ranking of the control node that provides the service. If he picks extra control nodes for data redundancy, those control nodes may come with different grades and ranking. When there are more than one control nodes to choose from, the ranking principal guarantees that the control node with the highest ranking gets picked by the root node. The node ID then gets entered into the location index map after the new resource being securely saved.

In FIG. 6A, after picking a control node, root node 06R01 then redirects the data retrieval request to control node 06C02 via command 06CM12. Upon receiving data retrieval command from its commanding root node, control node 06C02 delivers the requested data directly to the user node. Since control node 06C02 is in the same region as the user node, data won't transfer long way before reaching the user node.

Geographic location sensitivity is one of the main features of the present disclosure. Every node on the network is associated with the information of geographic location as defined by longitude, latitude and altitude. Different locations may be defined as two locations having a distance of at least 100 yards, 500 yards, 1000 yards, 1 mile, or 5 miles between them. A commanding node stores and manages the location data of its subordinate nodes. When a user node requests data from a root node, the location of the user node can be obtained via a public or private service that provides the mapping between a given IP address and the location of the IP address. Control node's address gets updated every time when it reports to the commanding, root node, so is its geographic location information. This way, the commanding root node is able to get the near-user control node to deliver answer a request from a user node.

Figure 6B:
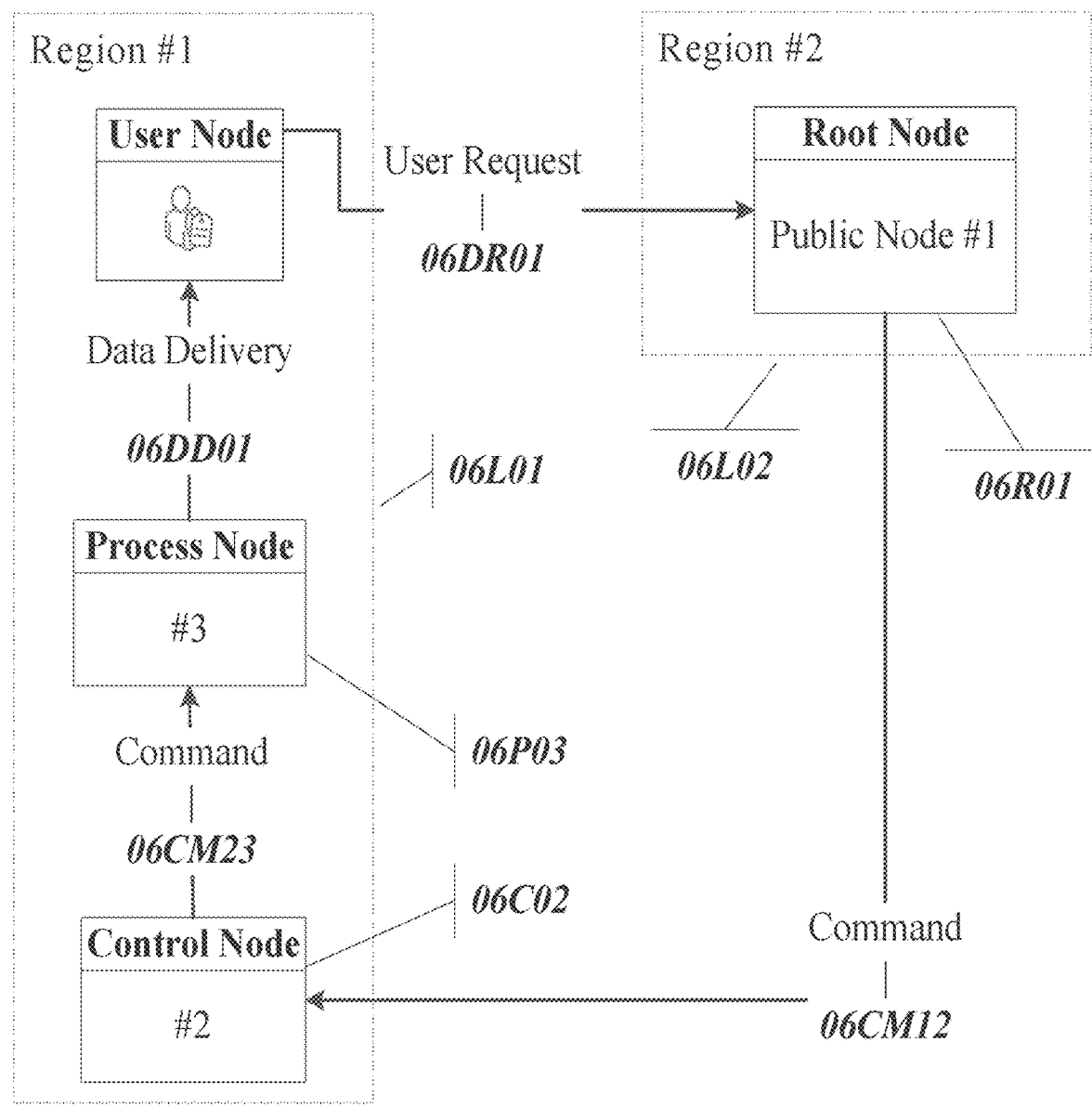
FIG. 6B illustrates a user node requesting data from a public root node, and how the requested data gets delivered by a subordinate process node in the same geographical region as the user node according to an embodiment of the present disclosure

FIG. 6B is very similar to FIG. 6A except that control node 06C02 has a process node 06P03 attached. Process node 06P03 is a subordinate of control node 06C02. When user node sends Data request 06DR01 to root node 06R01, it redirects the request to control node 06C02. Upon receiving Command 06CM12, control node 06C02 looks up a process node from the location index map. If the functional unit is a tandem, finding a process node to handle the request is easy since there is only one process node that has the requested data in its local storage. Control node 06C02 then sends Command 06CM23 to the process node 06P03 that can deliver the requested data. If the functional unit is a shunt, Control node 06C02 must sort its subordinate process nodes by geographic proximity to the user node, and then sends command to each process node until the command is executed successfully. It is worthwhile to note that a subordinate process node is not necessary to be in the exact same location as that of its commanding control node. A control node may have subordinate process nodes in different locations and possibly different regions. Whether a process node ends up in the same location as its commanding control node is determined by applications and how a process node joins the network. This will become clear when we discuss the node registration process.

Figure 6C:
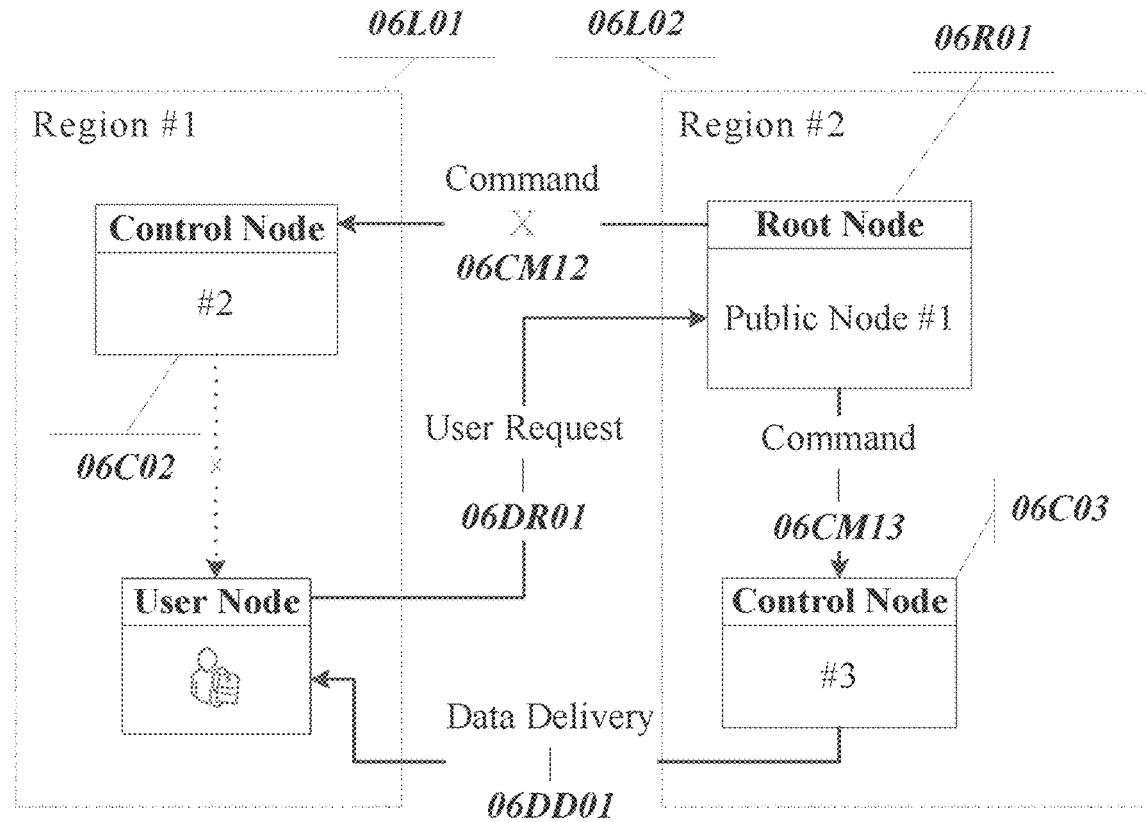
FIG. 6C illustrates a user node requesting data from a public root node when the control node in the same geographical region is not available or not functioning according to an embodiment of the present disclosure. A control node in the nearby geographical region as that of the user node delivers that requested data.

FIG. 6C illustrates a scenario where user data doesn't get delivered by a control node in the same region according to an embodiment of the present disclosure. In this diagram there are 2 control nodes 06C02 and 06C03 that are capable of delivering the requested data. Control node 06C02 is in the same region 06L01 as that of the user node, while control node 06C03 is in different region 06L02. Control node 06C02 doesn't get command 06CM12 from root node 06R01 due to the fact that when the user node sends data request 06DR01, root node 06R01 finds that control node 06C02 is not reachable. The computer that hosts control node 06C02 might be offline or shut down for some reason at the time when root node 06R01 tries to decide which control node to redirect the user request to. In this scenario, root node 06R01 picks control node 06C03 to deliver the requested data to the user node, even though control node 06C03 is in different region. This diagram illustrates the scenario where one or more control nodes serve as the backup nodes for user data. A backup node is normally not in the same region as the control nodes that normally serve the data requests from users. Different regions may be defined as two regions having a distance of at least 100 yards, 500 yards, 1000 yards, 1 mile, 5 miles, or 50 miles between them. A backup node serves a user request when all control nodes in a shunt are not available for service. A backup node is a special member in a shunt. Regular members in a shunt synchronize data with other member. But a backup node doesn't send data in its local storage to other members in a shunt. Backup node only gets data from other regular members in a shunt. Backup operation is different from synchronizations between 2 control nodes in a shunt. Synchronization is a 2-way operation, while backup is one way. A backup node may server as the backup facility for multiple shunts at the control node level.

Figure 7A:
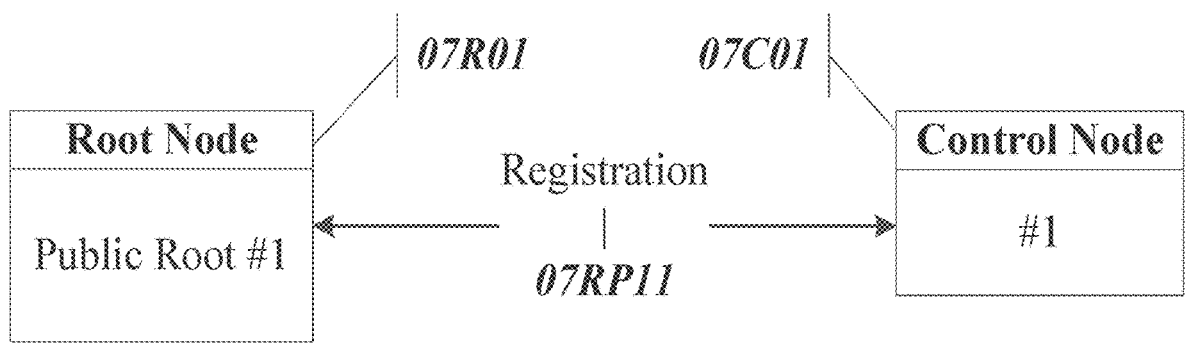
FIG. 7A illustrates the enrollment process for a control node according to an embodiment of the present disclosure.

FIG. 7A illustrates an enrollment process for a control node according to an embodiment of the present disclosure. A hierarchical computing network without control nodes is like an organization without functional departments. Control nodes play the middle management role in an organization composed of computing nodes. Participation of a computing device into the network requires registration, just like a person joining a company is required to go through a hiring process. In this diagram, control node candidate 07C01 (a candidate computing device for a prospective role as control node) submits a first enrollment request to a public root node 07R01. Please note that such request might be redirected by root node 07R01 to another root node which commands the computing nodes in the region where the control node candidate 07C01 resides. Registration 07RP11 represents the communication protocol for control node enrollment. Upon receiving the first enrollment request, root node 07R01 evaluates the candidate and then decides whether placing this node into a shunt. The evaluation criteria includes grading the candidate based on its total disk space, free disk space, total memory, free memory space, number of CPUs, the speed of each CPU, the speed of the network connection and the type of operating system. Only candidates above certain grade level qualify for serving as a control node. Request from a control node candidate below the grade level gets negative response. Grade level becomes the base for placing a control node candidate in a shunt. In preferred embodiments, only control nodes with the same grade level shall be placed in a shunt.

In response to a first enrollment request from a control node candidate, once approved root node creates a unique ID for the control node, and sends back the control node ID, a public key for secure communication, the IP address of the control node candidate as seen from the root node and the working schedules to the candidate. If the control node candidate is placed into a working shunt, a list of peers shall be sent to the candidate also.

To make the enrollment process secure, a valid user ID is required for approval of the first enrollment request. This means, before joining a personal computer to the hierarchical computing network of the present disclosure, a user must register at the network to obtain a user ID. A valid user ID identifies the ownership of the personal computer. A user is allowed to enroll multiple computers to the network. However; only one control node is allowed per IP address as seen from the root node. This is to make sure a control node serve as the single gateway for other computing devices behind a NAT.

Figure 11:
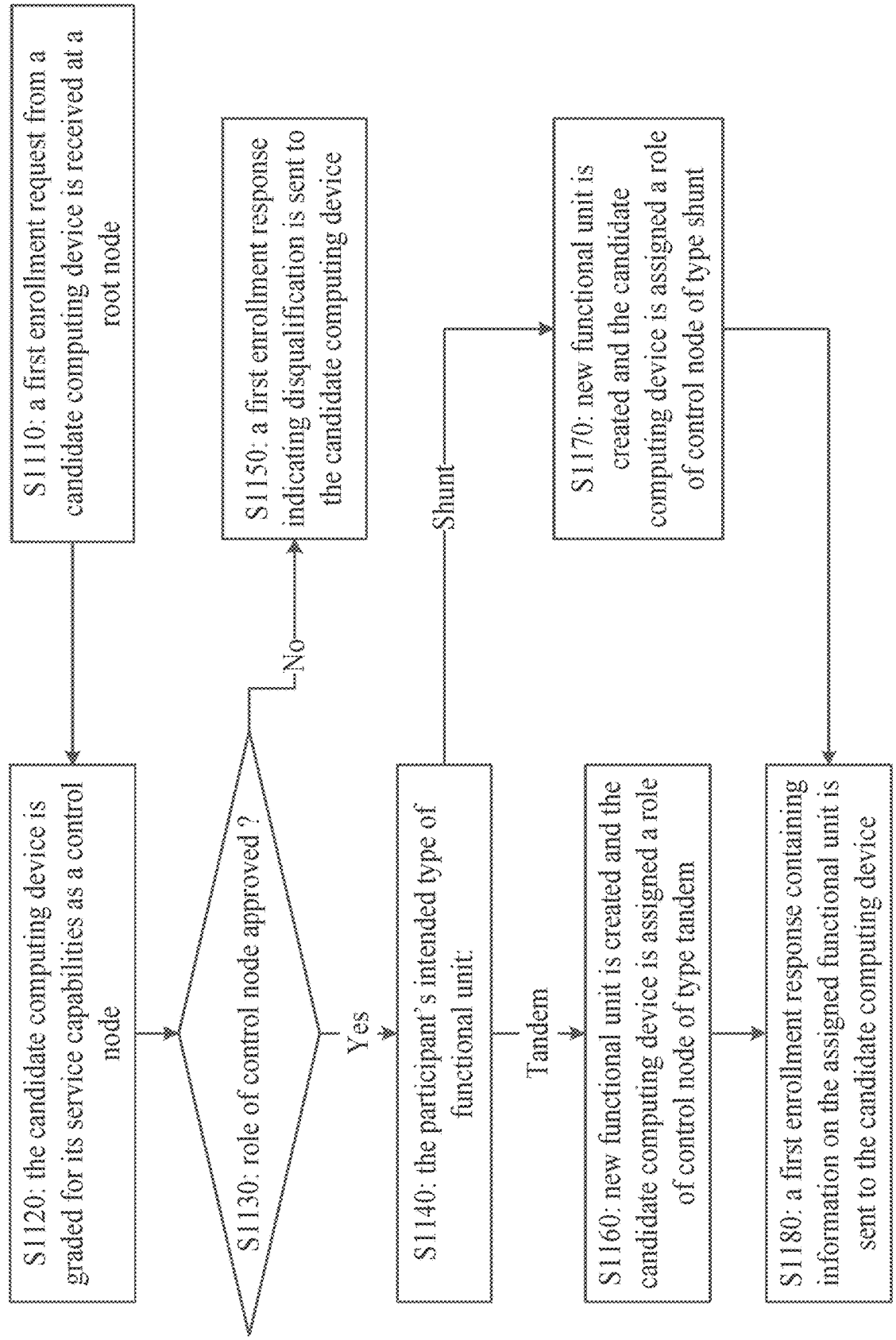
FIG. 11 is a flowchart illustrating control node enrollment processing by a root node according to an exemplary embodiment of the present disclosure. New functional unit is created and the type of the functional unit is determined by participant's intention.

A candidate computing device registers itself to a public root node. The registration process shall be initiated and consent by the owner of the computing device. FIG. 11 is a flowchart illustrating control node enrollment processing by a root node (i.e. a first computing device) according to an exemplary embodiment of the present disclosure.

Referring to FIG. 11, at step S1110, a first enrollment request from a candidate computing device is received as a root node, the first enrollment request indicating the candidate computing device's prospective role as control node and the type of the functional unit.

At step S1120, the candidate computing device is graded for its service capabilities. As mentioned above, factors that affect the grading of a prospective control node includes, but not limited to: a) total disk space; b) free disk space; c) type of drive (HD or SSD); d) speed of the hard drive; e) total memory; f) free memory space; g) number of CPUs; h) speed of each CPU; i) CPU usage; j) speed of the network connection (download/upload); and k) type of the operating system etc. Then at step S1130, the candidate computing device's qualification is determined by checking the grading result. If a grading score is higher than a threshold value, the candidate computing device is favorable for the role of control node. Otherwise, if the grading score is below a threshold value, then a first enrollment response indicating disqualification as control node is sent to the candidate computing device.

If the grading score is favorable, the enrollment process splits at step S1140 where the owner's intention of the candidate computing device for the mode of the functional unit is checked. There are 2 modes of a functional unit: tandem and shunt. By submitting a request for the enrollment of a candidate computing device as a control node, the mode of the functional unit must be specified since once becoming a control node in the hierarchical network, process nodes added into the functional unit shall work accordingly.

If the owner's intention is to have a control node of tandem mode which is the default mode, at step S1160, a new functional unit is created and the candidate computing device is assigned a role of control node in tandem mode. And then at step S1180, a first enrollment response containing information on the new functional unit is sent to the candidate computing device. On the other hand, if the owner's intention is to have a control node of shunt mode, at step S1170, a new functional unit is created and the candidate computing device is assigned a role of control node in shunt mode. And then at step S1180, a first enrollment response containing information on the new functional unit is set to the candidate computing device.

According to an exemplary embodiment of the present disclosure, after an first enrollment request from a candidate computing device is received at a root node at step S1110, the root node further determines whether the candidate computing device is in the same geographic region as the first computing device is in. Different geographic regions may be defined as two regions having a distance of at least 100 yards, 500 yards, 1000 yards, 1 mile, 5 miles, or 50 miles between them. If they are in the same geographic region, then the root node proceeds to step S1120. Otherwise, the root node redirects the first enrollment request to another root node in the same or nearby geographic region.

Figure 7B:
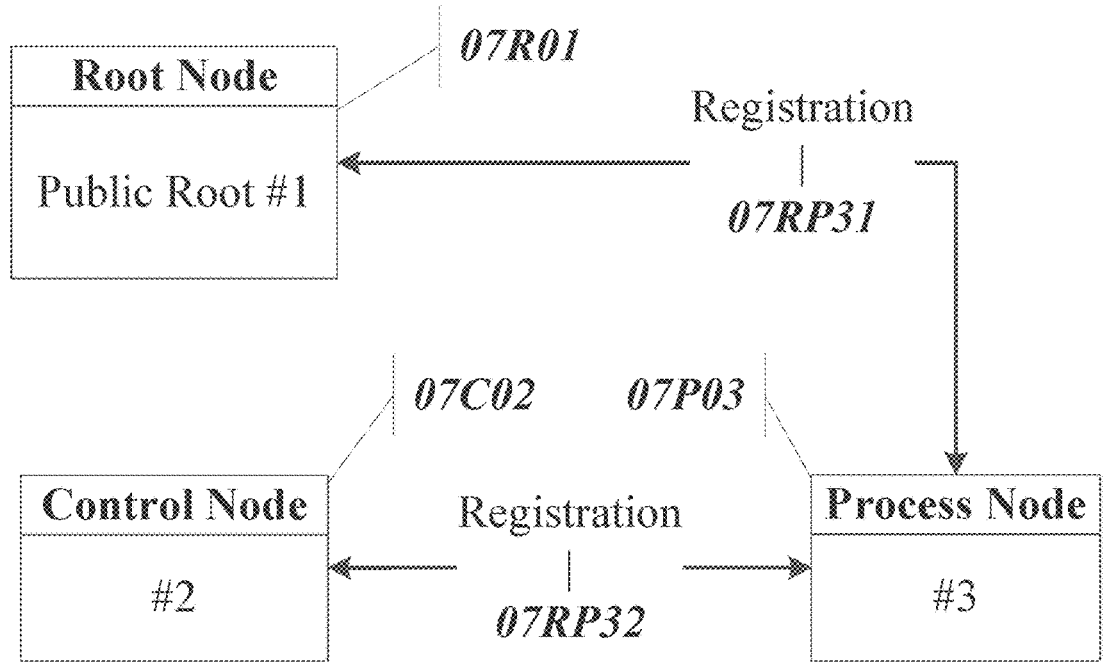
FIG. 7B illustrates the 2-step enrollment process for a process node according to an embodiment of the present disclosure.
Figure 7C:
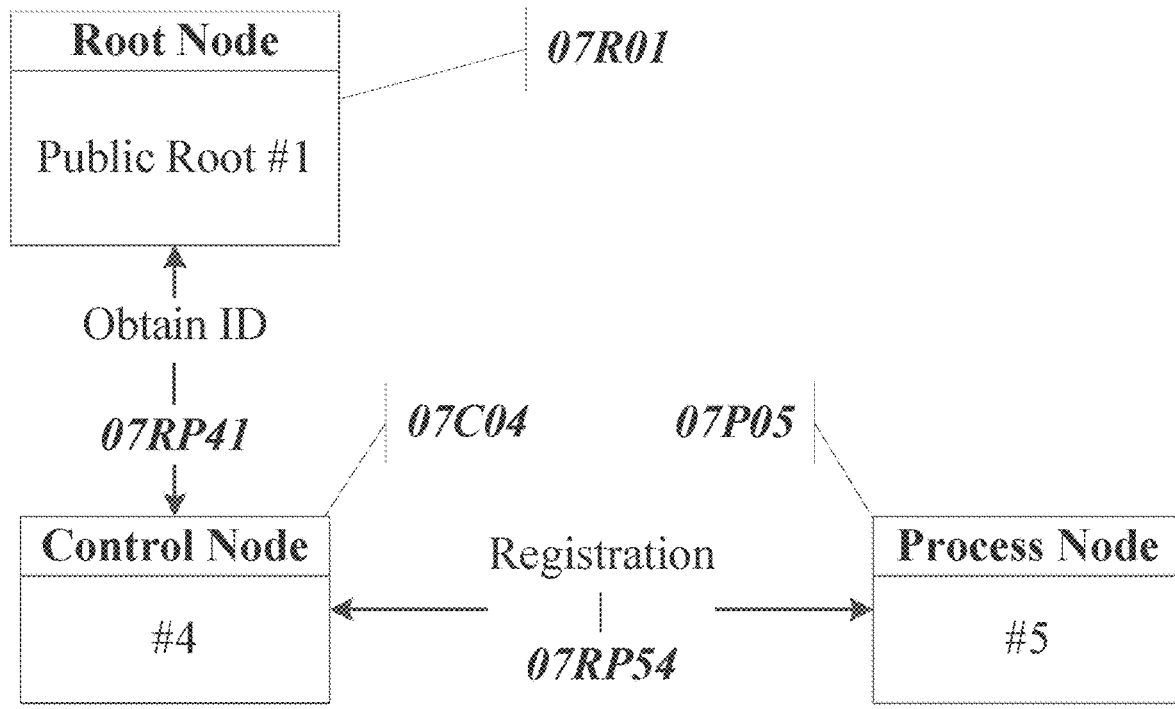
FIG. 7C illustrates the process of a process node registers to a known (local) control node according to an embodiment of the present disclosure.

FIG. 7B illustrates the 2-step enrollment process for a process node according to an embodiment of the present disclosure. The process starts from process node candidate 07P03 sending a second enrollment request to a public root node 07R01. Please note that such request might be redirected by root node 07R01 to another root node which commands the computing nodes in the region where the process node 07P03 resides. Registration 07RP31 represents communications between process node candidate 07P03 and root node 07R01 for the enrollment of a process node. Upon receiving a second enrollment request from a process node candidate, root node 07R01 first authenticates the request making sure the request is sent from a valid user. To enroll a process node, a valid user credential is required. This means a user must register at the network to obtain a user ID before enrolling his/her computer to the network. If the request fails user authentication, root node 07R01 denies the second enrollment request by sending back an error message. After user authentication, root node 07R01 extracts from the request the IP address of the computer from which the request was sent. And then root node 07R01 looks up the list of the control nodes under its command for a match of the user ID. If a match is found, root node 07R01 sends back the access information of the control node to the process node candidate. If no match is found, root node 07R01 picks the control node which is geographically closest to the process candidate and sends back the access information to the process node candidate via Registration 07RP31. With the access information, process node candidate 07P03 sends a third enrollment request to the control node 07C02. Registration 07RP32 represents the communications between process node candidate 07P03 and control node 07C02. This is the second step of a 2-step enrollment process. Comes with the request is the node ID generated by root node 07R01 and returned from root node 07R01 via Registration 07RP31. Upon receiving the third enrollment request, control node 07C02 adds process node candidate 07P03 to the list of subordinates under its command and then confirms the completion of the enrollment process to the process node candidate 07P03. From this point, process node candidate becomes an official process node in the hierarchical computing network. The relationship between 2 process nodes is determined by the mode of the functional unit (or the mode of the commanding control node). With the addition of a new process node, the level of grade of a commanding, control node gets upgraded because 1) if the functional unit is a tandem, data processing capacity gets incremented, or 2) if the functional unit is a shunt, the data redundancy rate gets incremented after a new member joining the functional unit.

A root node may not directly manage a process node. Even though a root node generates the ID for a process node candidate during the process of enrollment, the process node is managed directly by a control node when it starts working as part of the network, 2-step enrollment process guarantees that a process node can work behind a NAT that is different from the NAT of the commanding control node. Such capability is crucial for a usage scenario where a user wants to enroll 2 computers into the network. One computer is at location A, another at location B. Each location has a NAT respectively. The user can enroll a control node from location A and then enroll a process node from location B using the same user account. This way, the control node at location A and the process node at location B becomes functional unit.

Figure 12A:
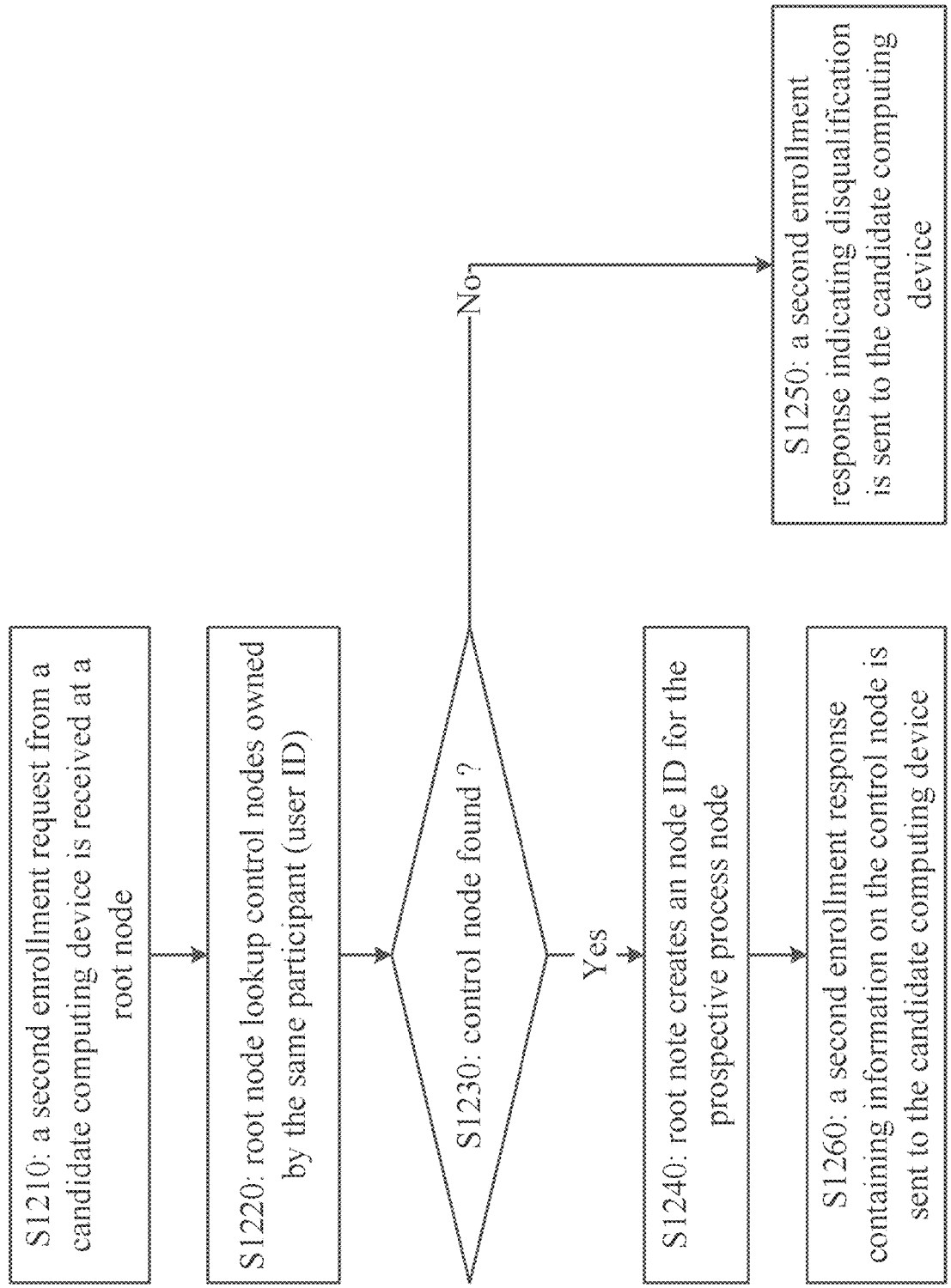
FIG. 12A is a flowchart illustrating process node enrollment processing by a root node according to an exemplary embodiment of the present disclosure.
Figure 12B:
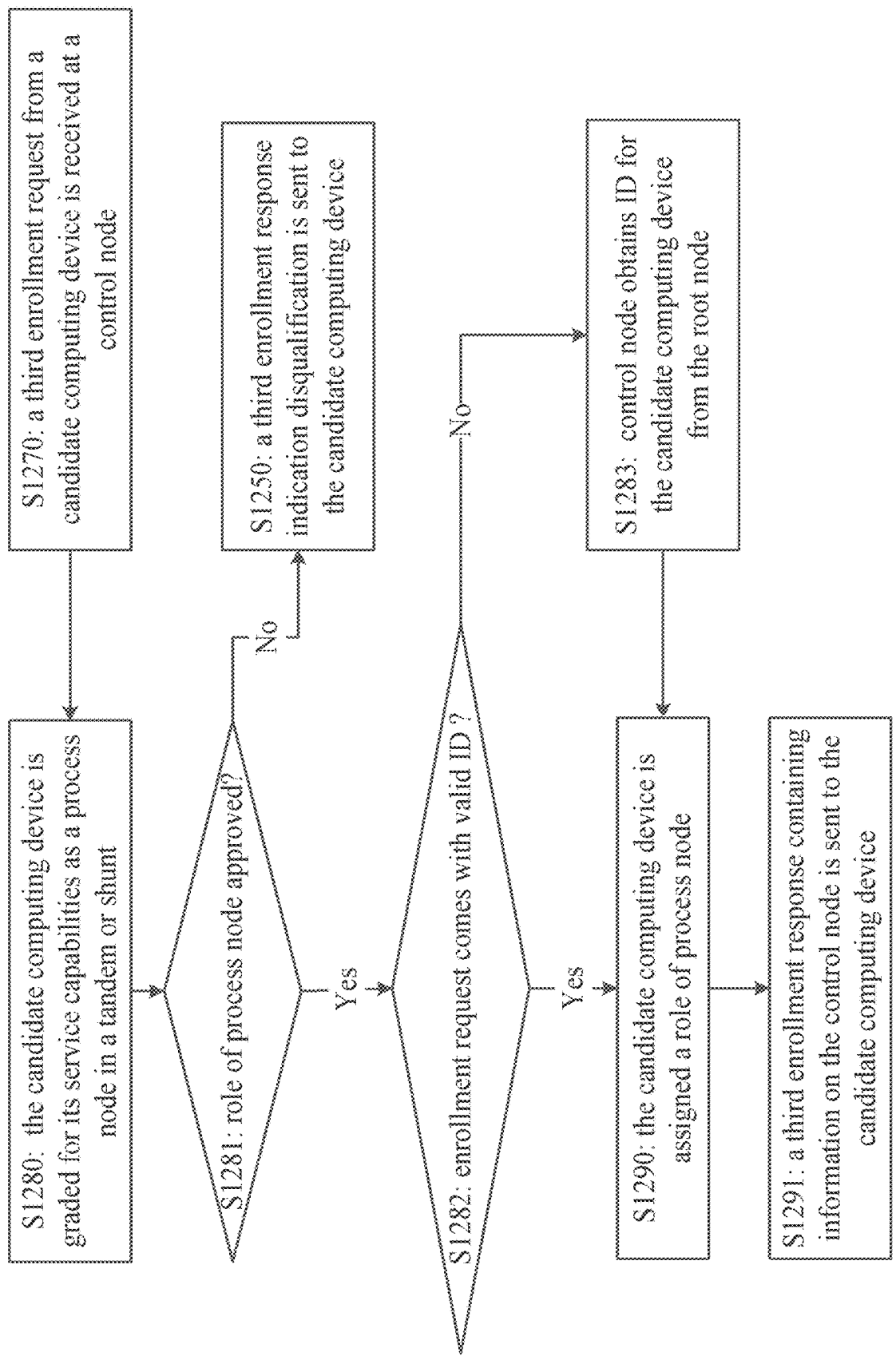
FIG. 12B is a flowchart illustrating process node enrollment processing by a control node according to an exemplary embodiment of the present disclosure.

FIG. 12A and FIG. 12B illustrate the flowcharts for the 2-step enrollment process for a candidate computing device for a role of process node.

FIG. 12A is a flowchart illustrating the first step of the 2-step process for a candidate computing device for a role of process node. At step S1210, a second enrollment request from a candidate computing device is received at a root node. The second enrollment request indicates the candidate computing device's prospective role as process node. At step S1220, root node looks up a list of control nodes under its command for those that match the owner ID (a user ID) that comes with the second enrollment request. At step S1230, it is decided whether there is a match found. If there is not match found, meaning no control node is owned by the same user who initiated the process node enrollment, a second enrollment response indicating disqualification is sent to the candidate computing device (step S1250). It is desirable to enroll a process node under the command of a control node of the same owner.

If there is a control node found, at step S1240 root node creates an object ID for the prospective process node, and a second enrollment response containing information on the found control node and the newly generated object ID to the candidate computing device (step S1260) Candidate computing device uses the returned information to perform the second step of the 2-step enrollment process.

FIG. 12B is a flowchart illustrating the second step of the 2-step process for a candidate computing device for a role of process node. At step S1270, a third enrollment request from a candidate computing device is received at a control node. The request comes with a valid node ID for the prospective process node and factors for the evaluation of qualification of the candidate computing device as process node. At step S1280, the candidate computing device is graded for its service capabilities. Again, factors that affect the grading of a prospective process node includes but not limited to: a) total disk space; b) free disk space; c) type of drive (HD or SSD); d) speed of the hard drive; e) total memory; f) free memory space; g) number of CPUs, h) speed of each CPU; i) CPU usage; j) speed of the network connection (download/upload); and k) the type of operating system. At step S1281, the candidate computing device is checked whether it is qualified to serve as a process node in the functional unit. The mode of the functional unit plays an important role in deciding the qualification of the candidate. If the functional unit is a tandem, all process nodes are working independently, a grading value based on the supplied hardware factors is enough as long as the grading value is above a predefined grade level. However, if the functional unit is a shunt, all process nodes synchronize application data with each other, the candidate computing device must qualify the minimum requirement for the members of the shunt in addition to the predefined grade level. As an example, for an application of online storage, if the functional unit is grade level 3 (250 GB), and the predefined grade level is grade level 1, the candidate computing device's free disk space must be higher than 250 GB for qualification as a member of the functional unit. If the candidate computing device does not qualify for the functional unit, a third enrollment response indicating disqualification is sent to the candidate computing device (step S1250). Otherwise, control node checks whether the third enrollment request comes with a valid node ID for the candidate at step S1282. If the third enrollment request comes with a valid node ID for the candidate computing device, the candidate computing device is assigned a role of process node at step S1290, then at step S1291 a third enrollment response containing information on the commanding control node is sent to the candidate computing device. If the functional unit is a shunt, a list of peer process nodes also is sent to the candidate computing device.

FIG. 7C illustrates the process of a process node register to a known control node according to an embodiment of the present disclosure. If a process node candidate 07P05 as shown in this diagram is at the same location as that of a control node 07C04, and they are all behind the same NAT of a local area network, there is no need to go through the 2-step enrollment process as described above in FIG. 7B. User can enroll process node candidate 07P05 directly through control node 07C04. Control node is a service listening to a well-known communication port. User can use the local IP address of the control node 07C04 and the port number to start the enrollment process for process node candidate 07P05 that is running on the same local area network. How to kick off an enrollment process depends on the actual implementation of applications. For example, the process node can be implemented in such way that simply allows user run the executable of a process node with an enrollment switch providing the IP address where the control node is running and the port number that the control node is actively listening to. After user kicking off the enrollment process, process node candidate 07P05 sends a third enrollment request to a control node 07C04. Registration 07RP54 represents the communications between process node candidate 07P05 and control node 07C04 for enrolling a process node through a control node. Registration 07RP54 is part of the communication protocol that a control node speaks in order to enroll a process node into the network. The third enrollment request from process node 07P05 must contain valid user credentials that can be used to authenticate the request. Upon receiving a third enrollment request from a process node candidate, control node 07C04 grades the process node candidate 07P05 and if the candidate satisfies the required grade level then sends a request to its commanding root node 07P01. Obtain ID 07RP41 represents a request from a control node to its commanding root node for a new node ID for its child process node. Valid user credentials must be present in the request so that root node 07R01 can authenticate the user. As the response, root node 07R01 sends back a new node ID generated for the process node candidate. With a valid node ID returned from root node 07R01, control node 07C04 adds process node 07P05 to list of subordinates under its command, and then sends the ID to process node candidate 07P05, together with the access information of root node 07R01 so that process node knows which root node it's working under The main difference between the 2 approaches for enrollment of a process node is that in the 2-step approach the evaluation and approval is carried out by the root node, while in the second approach the evaluation and approval is carried out by the control node.

FIG. 12B is a flowchart illustrating process node enrollment by a control node according to an exemplary embodiment of the present disclosure. In this case, a third enrollment request does not come with a valid node ID for the candidate since the candidate initiated the enrollment process directly to a control node. The steps are the same as a candidate computing device starting the process node enrollment process from a root node, until step S1282. Since the third enrollment request does not come with a valid node ID for the candidate, at step S1282 control node obtains an ID from its superior root node for the candidate computing device. And then at step S1290, the candidate computing device is assigned a role of process node, and then at step S1291 a third enrollment response containing information on the control node is sent to the candidate computing device. Also sent is a list of peer process node if the functional unit is a shunt.

Figure 8A:
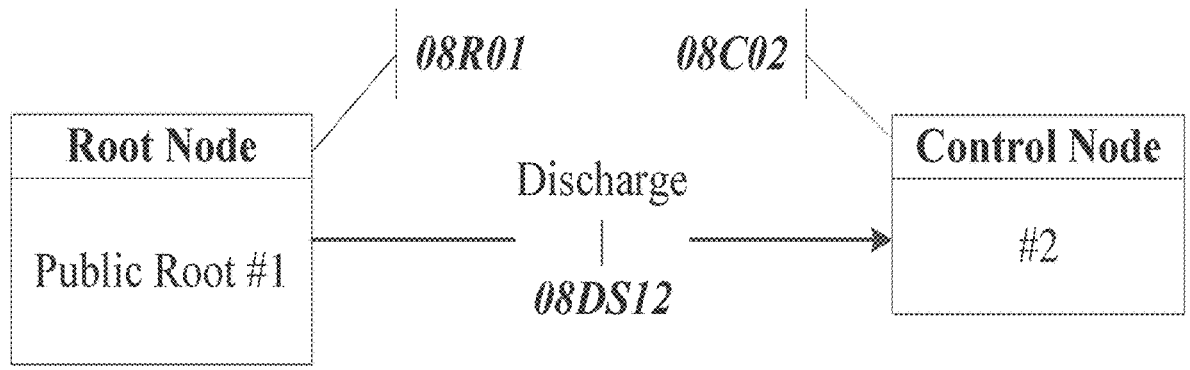
FIG. 8A illustrates a control node being discharged (fired) from the network according to an embodiment of the present disclosure.

FIG. 8A illustrates the process of a control node being discharged from the hierarchical computing network according to an embodiment of the present disclosure. For performance reason or other reasons, a control node may get discharged from the network, like a manager gets fired or layoff from a company. Discharge of a subordinate node comes from a superior node in the hierarchy. In this diagram, root node 08R01 discharges a subordinate control node 08C02. Discharge 08DS12 represents the communication protocol between a root node and a subordinate control node when the root node is discharging the control node. Root node 08R01 sends a first discharge request to control node 08C02 via Discharge 08DS12. The first discharge request can be initiated by human manually through a user agent (such as web browser or an App on a smartphone), or by a superior node automatically based on some criteria. Before submitting the discharge request, the superior node makes sure a) no application data loss after dismissal of the control node; b) location indexes for application data are refreshed; c) no orphaned process node, and d) remove the control node from the list of subordinate nodes. This is done without the acknowledgement from the control node. Discharge occurs forcefully even when the control node is not online at the time when the discharge request is sent from the superior node.

Upon receiving a discharge request, control node 08C02 first authenticates the request making sure the request is from its superior node. Then control node 08C02 sends notifications to all of its subordinate process nodes. And then remove all process nodes from the list of subordinate nodes. And finally, clean up the application data and network data from its local storage.

Figure 8B:
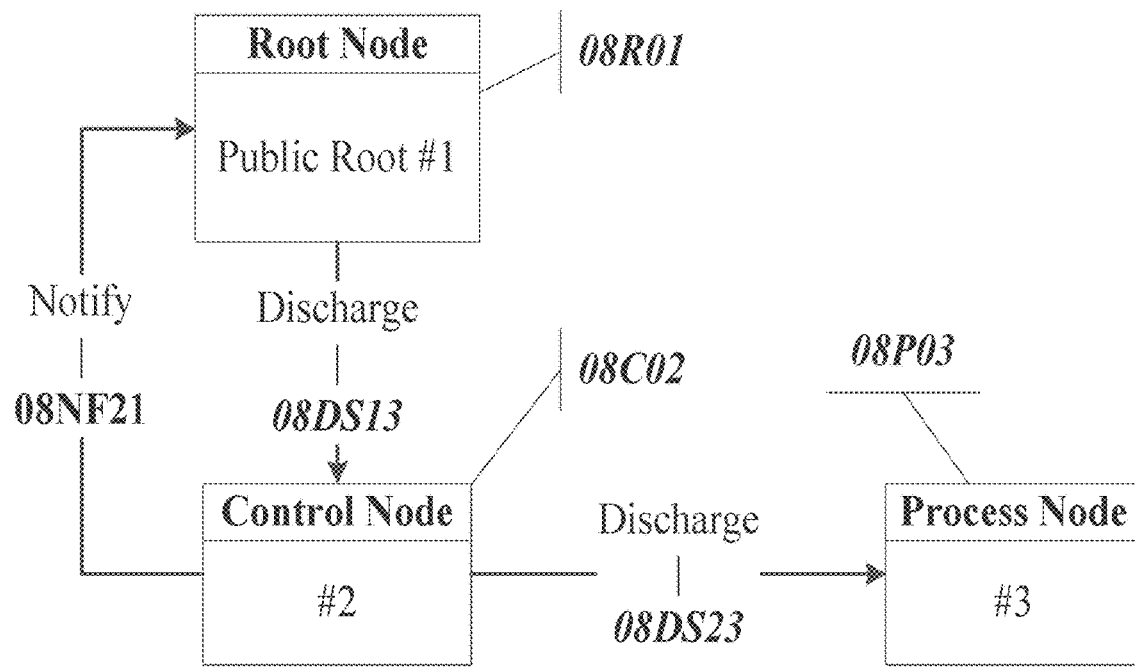
FIG. 8B illustrates a process node being discharged (fired) from the network according to an embodiment of the present disclosure.

FIG. 8B illustrates the process of a process node being discharged from the hierarchical computing network according to an embodiment of the present disclosure. A process node can get discharged due to performance reason or other reasons, like an employee gets fired or layoff from a company. Discharge of a process node comes from a superior node in the hierarchy. In this diagram, root node 08R01 discharges process node 08P03 through control node 08C02. Discharge 08DS13 represents the communication protocol between a root node and a control node for the root node discharging a subordinate process node of the control node. Discharge 08DS23 represents the communication protocol between a control node and the subordinate process node. A discharge action can be initiated by human manually via a user agent or by a superior node automatically based on some criteria. Discharge 08DS13 in FIG. 8B is different from Discharge 08DS12 in FIG. 8A. To discharge process node 08P03, root node 08R01 sends a second discharge request to the superior node of process node 08P03, control node 08C02 which in turn sends a third discharge request to process node 08P03. Upon receiving a second discharge request via Discharge 08DS13, control node 08C02 authenticates the request making sure the request comes from its superior and the specified subordinate process node exists in the list of subordinate nodes. If control node 08P03 is not alive or superior node authentication fails, control node 08C02 denies the request by sending an error message to root node 08R01 via. Discharge 08DD13. Then control node 08C02: 1) moves the application data from process node 08P03 to another subordinate process node, if control node 08C02 is heading a functional unit of tandem; 2) moves the application data from process node 08P03 to the local storage if process node 08P03 is the last member of the tandem; 3) removes process node 08P03 from the list of subordinate nodes, 4) refreshes the location indexes only if application data has been moved, 5) sends a third discharge request to process node 08P03 via Discharge 08DS23.

Upon receiving a third discharge request from its superior via Discharge 08DS23, process node 08P03 authenticates the request by verifying the authenticity of the control node. After successful superior node authentication, process node 08P03 cleans up any application data in its local storage, removes any network data it holds, and then shuts down the service.

Figure 9A:
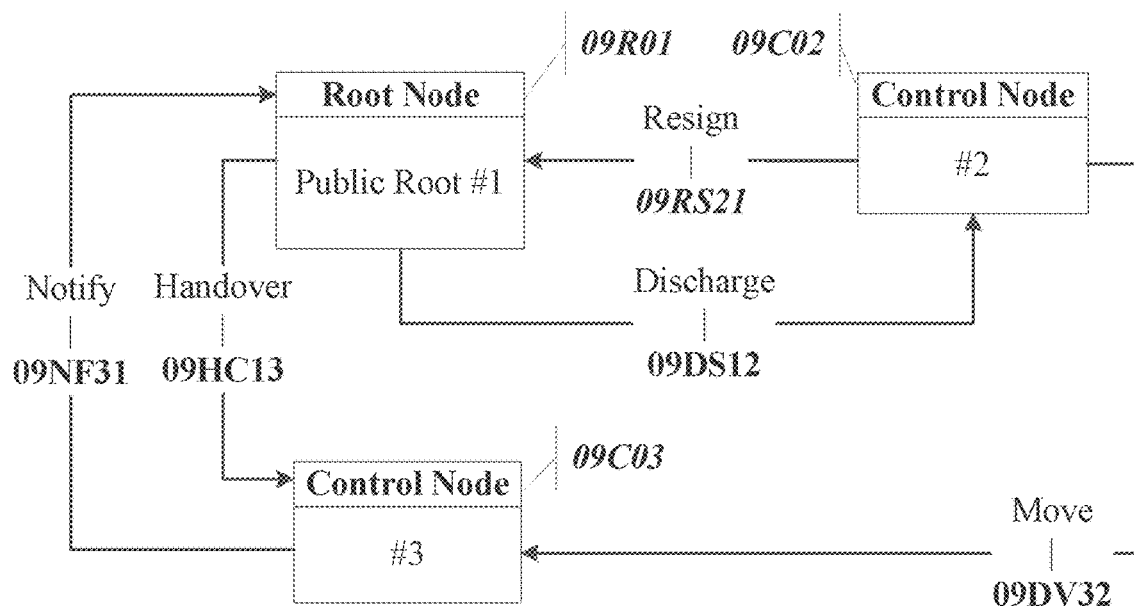
FIG. 9A illustrates a control node resigns from the network according to an embodiment of the present disclosure.

Discharging a subordinate node can be initiated from a superior node automatically if some criteria are met. For example, if a subordinate node fails to report to its superior node for a specified period of time, the subordinate node shall be considered incompetent thus be discharged automatically by its superior node FIG. 9A illustrates the process of a control node resign from the hierarchical computing network according to an embodiment of the present disclosure. The resignation process must be initiated by a user who has the intention of taking his control node out of the network. Depending on implementations, user may trigger the resignation process by running the executable for the control node with a switch that indicates the user's intention of resignation. If the control node has not been enrolled into the network, the executable shall return immediately with a warning message. If the control node has been enrolled into the network, the executable shall send a resignation request to its superior root node and then listens to further directions from the root node.

In FIG. 9A, control node 09C02 sends a first resignation request to its commanding root node 09R01. Resign 09RS21 represents the resignation request from a control node to its commanding root node when the control node intends to resign from the network. Upon receiving a first resignation request, root node 09R01 first authenticates the request by verifying the user credentials that come with the request. Authentication makes sure user's ownership of the control node. Authentication also verifies whether the request is from a control node that is among the list of subordination nodes. After successful authentication, root node 09R01 then checks if this control node is allowed to quit the network. The criteria for approval of a resignation request includes but not limited to a) control node 09C02 is not the last node in a shunt; b) control node 09C02 doesn't have one or more subordinate process nodes that are associated with a user account different from that of the control node. After submitting a first resignation request, control node 09C02 enters into listening mode waiting for further directions from the network.

After authentication and checks, root node 09R01 looks for a control node that can take over the responsibilities from control node 09C02, and found control node 09C03, preferably in the same region as that of 09C02. If no successor control node is found, root node 09R01 shall take over the responsibilities from control node 09C02. After finding successor control node 09C03, root node 09R01 sends a handover command to 09C03 as indicated by Handover 09HC13 in the diagram. This command asks control node 09C03 to take over responsibilities from control node 09C02, especially the download application that control node 09C02 stores locally. Moving application data from 09C02 to 09C03 may take some time, thus should be performed asynchronously. The data move operation is initiated by control node 09C03 as indicated by Move 09DV32 in the diagram. After all application data has been successfully moved over, control node 09C03 sends a notification message to the commanding root node 09R01. Notify 09NF31 represents the notification message from a control node to its superior root node. Upon receiving Notify 09NF31, root node 09R01 removes control node 09C02 from the list of subordinates, refreshes the location indexes so that they point to substitute control node 09C03 and then discharges control node 09C02 by sending a first discharge command. Discharge 09DS12 to the control node 09C02. At this point, control node 09C02 is no longer in the network. Any requests from this control node to its superior shall be disregarded. Control node 09C02 may still be able to communicate with its peers until they receive updates from root node 09R01.

Figure 9B:
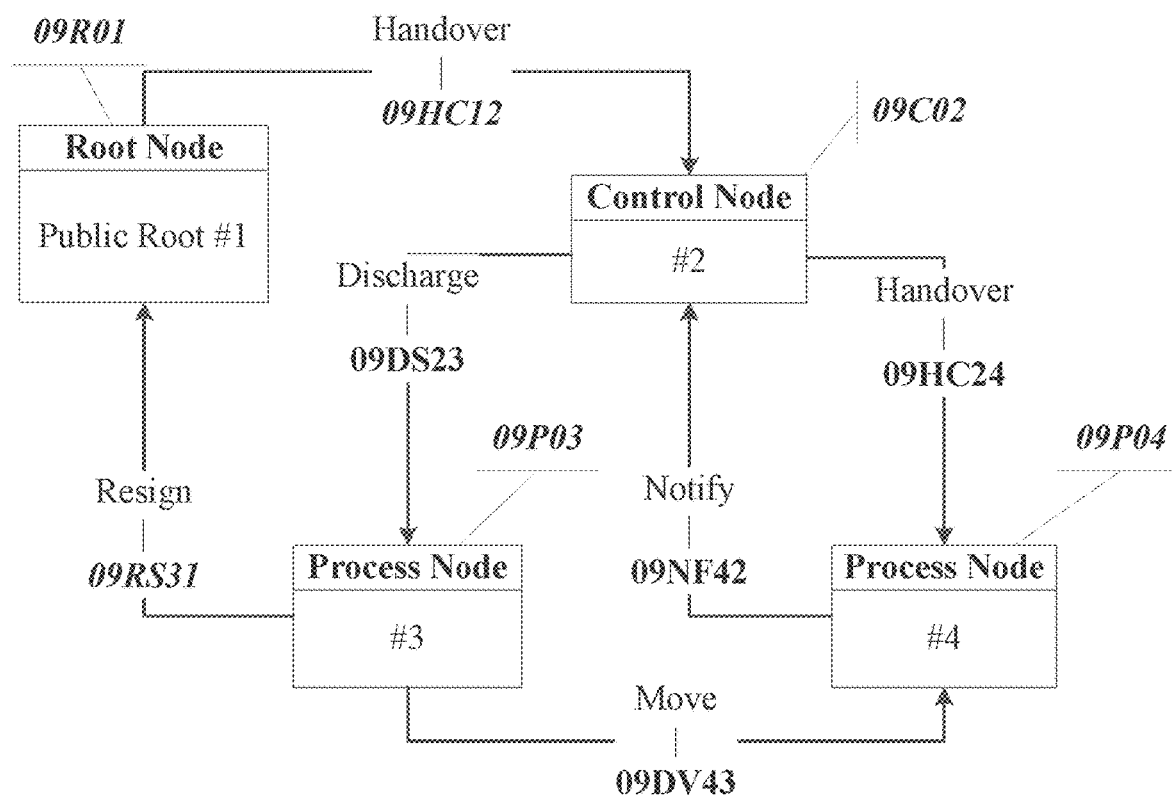
FIG. 9B illustrates a process node resigns from the network by sending a resignation request to its superior root node according to an embodiment of the present disclosure

FIG. 9B illustrates the process of a process node resign from the network by filing a resignation request to the commanding root node according to an embodiment of the present disclosure. Resignation of a process node from the hierarchical computing, network is initiated by a user, most likely the owner of the process node. Depending on implementations, user may trigger the resignation process by running the executable for the process node with a switch that indicates the user's intention of resignation. If the process node has not been enrolled into the network, the executable shall return immediately with a warning message. If the process node has been enrolled into the network, the executable shall send a resignation request to its superior root node and then listens to further directions from the network.

In this diagram, public root node 09R01 has a control node 09C02 under which there are 2 process nodes 09P03 and 09P04. 2 process nodes are working a tandem which means that they hold separate set of application data. Process node 09P03 sends a second resignation request Resign 09RS31 to its superior root node 09R01. The second resignation request is triggered by a user. The resignation request carries the information about process node 09P03, for example the ID of the process node and the ID of its superior control node. After submitting a second resignation request Resign 09RS31, process node 09P03 enters into listening mode waiting for further directions from the network. Upon receiving a second resignation request from a process node, root node 09R01 authenticates the user who initiated the resignation request, and then verifies that the provided control node ID in the request is in fact one of its subordinate control nodes'. Root node 09R01 then send a second handover command to control node 09C02. Handover request 09HC12 from root node 09R01 to control node 09C02 carries extra information in addition to the information provided by the process node 09P03 to root node 09R01. Upon receiving a second handover command from its superior, control node 09C02 authenticates the request making sure it's coming from its superior root node. Control node 09C02 then checks the supplied ID of the process node making sure it's one of its subordinate process nodes'. After successful checking and verifications, control node 09C02 then looks among its subordinates for a substitute that can take over the responsibilities from process node 09P03. Control node 09C02 found successor process node 09P04. If no successor process node is found, control node 09C02 shall take over the responsibilities from process node 09P03. Then control node 09C02 sends a third handover command to the successor process node 09P04 as indicated by Handover 09HC24 in the diagram. Handover 09HC24 asks process node 09P04 to take over the responsibility from process node 09P03. Upon receiving a third handover command, process node 09P04 authenticates the request making sure it's from the commanding control node, and then starts moving data from process node 09P03. Downloading application data from a resigner process node is started by sending a second data move request to the resigner node. Moving application data may take some time thus should be performed asynchronously. Move 09DV43 in the diagram indicates the data move operation. After the data move operation completes successfully, successor process node 09P04 sends notification Notify 09NF42 to its superior control node 09C02. Upon receiving Notify 09DV42, control node 09C02 removes process node 09P03 from the list of subordinates, refreshes the application data indexes so that they point to substitute process node 09P04 and then discharges process node 09P03 by sending a third discharge command Discharge 09DS23 to the process node 09P03. After this point, process node 09P03 is no longer in the network. Any requests from this process node to its superior shall be disregarded. Process node 09P03 may still be able to communicate with its peers until they receive updates from control node 09C02.

In this diagram, Notify 09NF42 triggers Discharge 09DS23. If for some reason Notify 09NF42 is not filed from substitute process node 09P04 to control node 09C02, process node 09P03 shall still remain in the network regardless whether it's alive or not. However, as discussed previously, an incompetent process node shall get discharged from the network automatically by its superior control node if the process node doesn't report to the superior control node over the specified period of time.

If a process node in a shunt sends a second resignation request to its superior root node, and the parent control node 09C02 has more than one child process nodes under its command, parent control node 09C02 doesn't need to find a successor process node since all child process nodes store the same set of application data. The parent control node 09C02 simply sends a third discharge command Discharge 09DS23 to the resigner process node, and then degrades the redundancy rate.

Figure 9C:
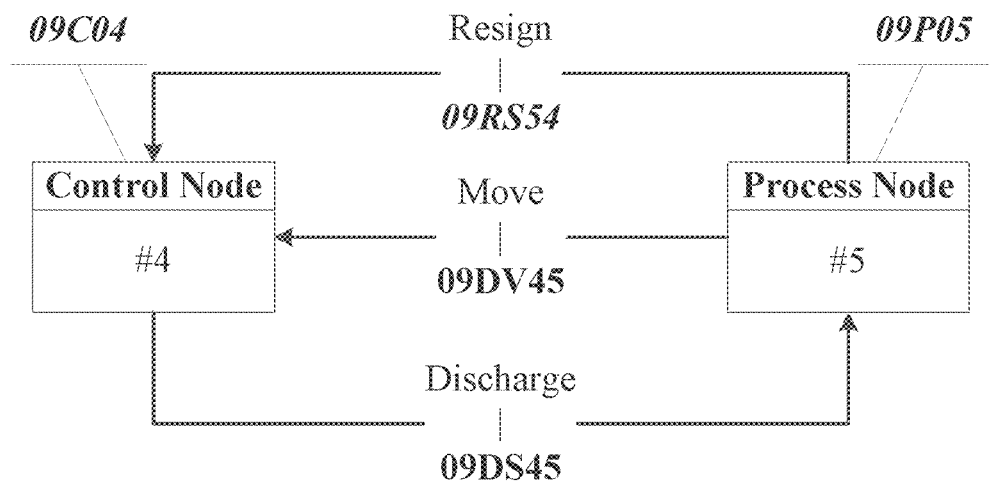
FIG. 9C illustrates a process node resigns from the network by sending a resignation request to its commanding (local) control node according to an embodiment of the present disclosure.

FIG. 9C illustrates the process of a process node resign from the network by filing a resignation request to the commanding control node according to an embodiment of the present disclosure. Resignation of a process node from the hierarchical computing network is initiated by a user, most likely the owner of the process node. Depending on implementations, user may trigger the resignation process by finning the executable for the process node with a switch that indicates the user's intention of resignation. If the process node has not been enrolled into the network, the executable shall return immediately with a warning, message. If the process node has been enrolled into the network, the executable shall send a resignation request to its superior control node and then listens to further directions from the network.

In this diagram there is control node 09C04 and a single subordinate process node 09P05. Upon receiving a third resignation request Resign 09RS54 from process node 09P05, since there is no other successor process node to take over the application data stored on process node 09P05, control node 09C04 moves application data from process node 09P05 to its own local data storage via Move 09DV45. Data move operation shall be performed asynchronously as it may take some time to finish. When the data move operation completes successfully, control node 09C04 removes process node 09P05 from the list of subordinates, refreshes the application data indexes so that they point to control node 09C04 and then discharges process node 09P05 by sending a third discharge command Discharge 09DS45 to the process node. After this point, process node 09P05 is no longer in the network. Any requests from this process node to its superior shall be disregarded.

Exemplary processing of a service request from a user device at a public root node, a control node and a process node is described with reference to FIG. 13~FIG. 15.

Figure 13:
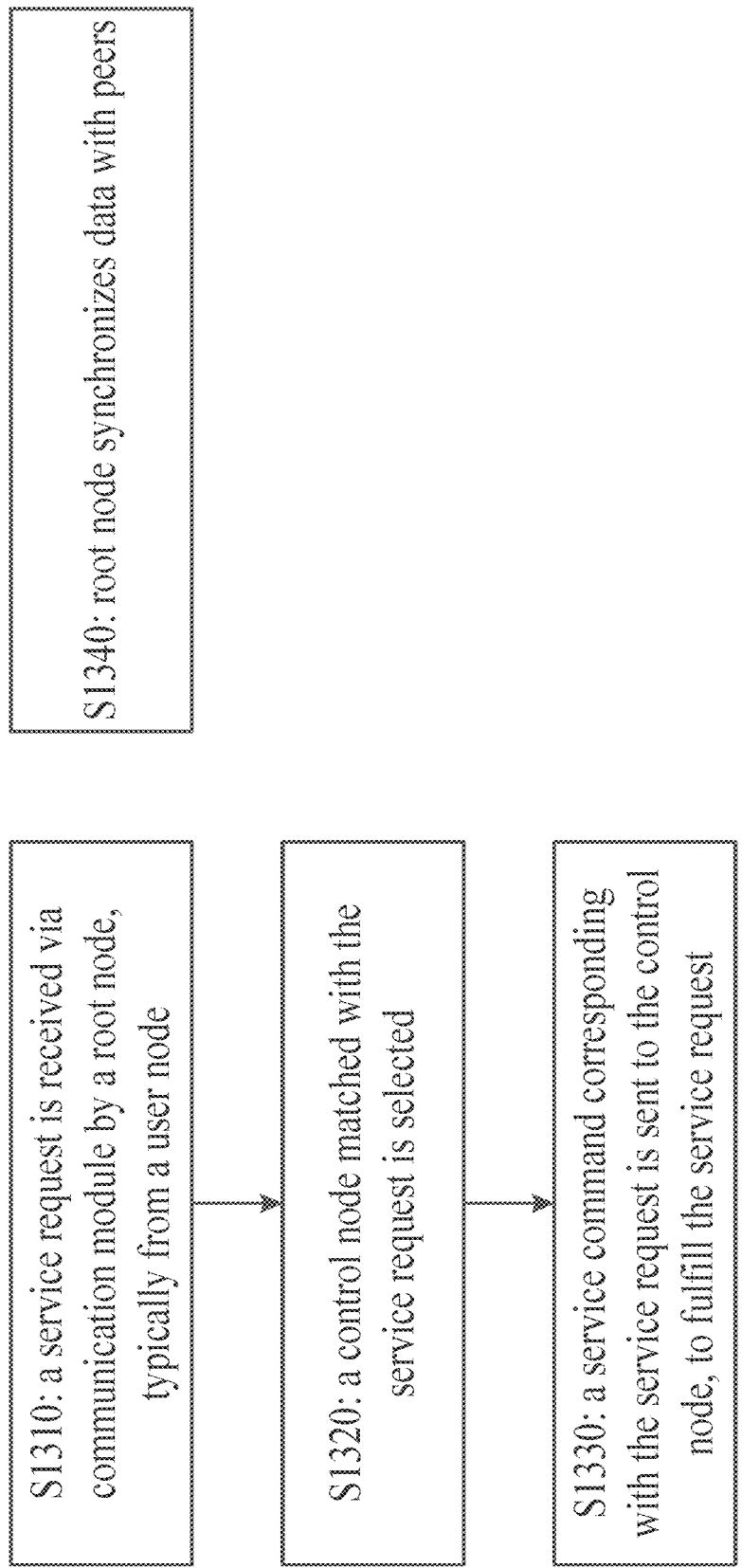
FIG. 13 is a flowchart illustrating processing of a service request from a user device at a public root node according to an embodiment of the present disclosure.

FIG. 13 is a flowchart illustrating processing of a service request from a user device at a public root node according to an embodiment of the present disclosure.

Referring to FIG. 13, at step S1310, a service request is received via the communication module, typically from a user device. A service request may be a user request for application data, network data, data processing, remote control etc., but not limited thereto. For example in an application of remote control of IoT devices such as networked switches at home and office, a service request can be an on/off command sent from a user device such as browser window or a smart phone app that is connected to the root node. The on/off command is targeting a specific networked switch that user wants to turn on/off remotely from the user device of the user's choice. The node ID for the control node and the node ID for the process node that drives the specified switch come with the service request. To get the IDs, user may send a service request to the root node for all control nodes that the user owns. By choosing a control node in a list returned from the root node, user not only obtained the node ID of the control node, but also can drill down to the next level where a list of process nodes shall be displayed. By picking a process node from the list returned from the control node, the node ID of the process node that drives a specific network switch can be obtained.

Another example is an application of online data storage where user has 2 functional units (control nodes) setup for storing user's personal files, and the 2 functional units are in a DRU for data redundancy purpose. When the user wants to display a document on his user device, the user triggers the user device to send a service request to the root node, supplying the object ID of the document he wants to display.

At step S1320, a control node matched with the service request is selected.

According to an embodiment, the location index map in the root node is looked up for control nodes on which data relevant to the service request is stored, and one of the found control nodes is selected.

In another embodiment, if application is stored in multiple functional units for data redundancy reason (DRU) the location index map is looked up for control nodes on which data relevant to the service request is stored, and a control node among found control nodes with a collective reliability ranking of the highest ranking level is selected.

At step S1330, a service command corresponding with the service request is sent to the control node, to fulfill the service request.

Specifically, a service command complying with the commanding protocol between the root node and the selected control node is generated, and sent to the selected control node, for the selected control node itself or its subordinate processing node to execute.

In addition, a first computing device (root node) also performs data synchronization with its peers, as shown by step S1340.

As described above, reliability ranking of the control node may be determined based on at least one of the control node's total attendance time and its rate of failure-to-response.

For example, a root node may receive a first complaint message from a second computing device containing information on a peer control node. It can then update the reliability ranking of the peer control node based on the first complaint message, for example, downgrading the ranking of the peer control node.

As another example, a root node may receive a second complaint message from a third computing device containing information on its parent control node, and to update the reliability ranking of the parent control node based on the second complaint message, for example, downgrading the ranking of the parent control node.

Figure 14:
FIG. 14 is a flowchart illustrating processing of a service command and other functionalities at a control node according to an embodiment of the present disclosure.

FIG. 14 is a flowchart illustrating processing of a service command at a control node according to an embodiment of the present disclosure.

Referring to FIG. 14, at step S1410, a service command for a user device is received from the first computing device. The service command is generated by its parent root node.

At step S1420, an enrolled third computing device as process node is selected for processing the service command.

Selecting a process node depends on the mode of the control mode. If the control node is in tandem mode, all subordinate process nodes work independently and the store unique application respectively. Thus selecting a process node is straight forward by simply looking up the location index map for the process node where the data relevant to the service request is stored. There should be only one process node returned from the lookup. On the other hand, if the control node is in the shunt mode, all subordinate process nodes duplicate data for redundancy reason. Thus a list of subordinate process nodes shall be prioritized by their reliability ranking, with the highest ranking level at the top of the list.

Similarly, the reliability ranking of a process node is determined based on at least one of the process node's total attendance time and its rate of failure-to-response.

At step S1430, a processing command is sent to the selected process node corresponding with the service command, for the process node to execute. Sending a processing command to the selected process node may fail if the selected process node is not responding or responds with an error. When this happens, the reliability ranking of the process node shall be updated, for example downgrading the ranking of the process node.

In addition, a control node also sends report to its parent root node as shown in step S1440, sends complaint message to its parent root node against another control node (step S1450), moves data from another control node specified by its parent root node (step S1460) and performs data synchronization with its peers in the same DRU (step S1470). A report sent from a control node to its parent root node updates the status of the control node with the parent root node. Information sent by a control node to its parent includes but not limited to: a) node ID of the control node; b) hardware data of the computing device that may affect the intrinsic grading of the control node, such as total disk space, free disk space, total memory space, free memory space, type of drive (HD or SSD), speed of the hard drive, number of CPUs, speed of each CPU, CPU usage, speed of the network connection (download/upload), the type of operating system etc. of the computing device; c) the collective grading value of all of its subordinate process nodes; d) the IP address of the computing device in the local area network; e) collective ranking value of all of its subordinate process node. Use the payload that goes with a report, the root node is able to re-evaluate the service capability and reliability of the functional unit that the control node represents, keep track of any local IP address changes and external IP address changes if the node and/or the NAT in front of the node were assigned different IP addresses. As the response to a report from the control node, root node returns the following information: a) external IP address of the control node as seen from the root node; b) a list of peers in case there is any changes to the organization for example a new control node has been added to the DRU, the external IP address of a peer control node has changed, or a peer control node in the DRU has been discharged from the network etc.

As another example, a control node may receive a complaint message from a process node containing information on a peer process node. It can the n update the reliability ranking of the peer process node based on the complaint message, for example downgrading the ranking of the peer process node.

Figure 15:
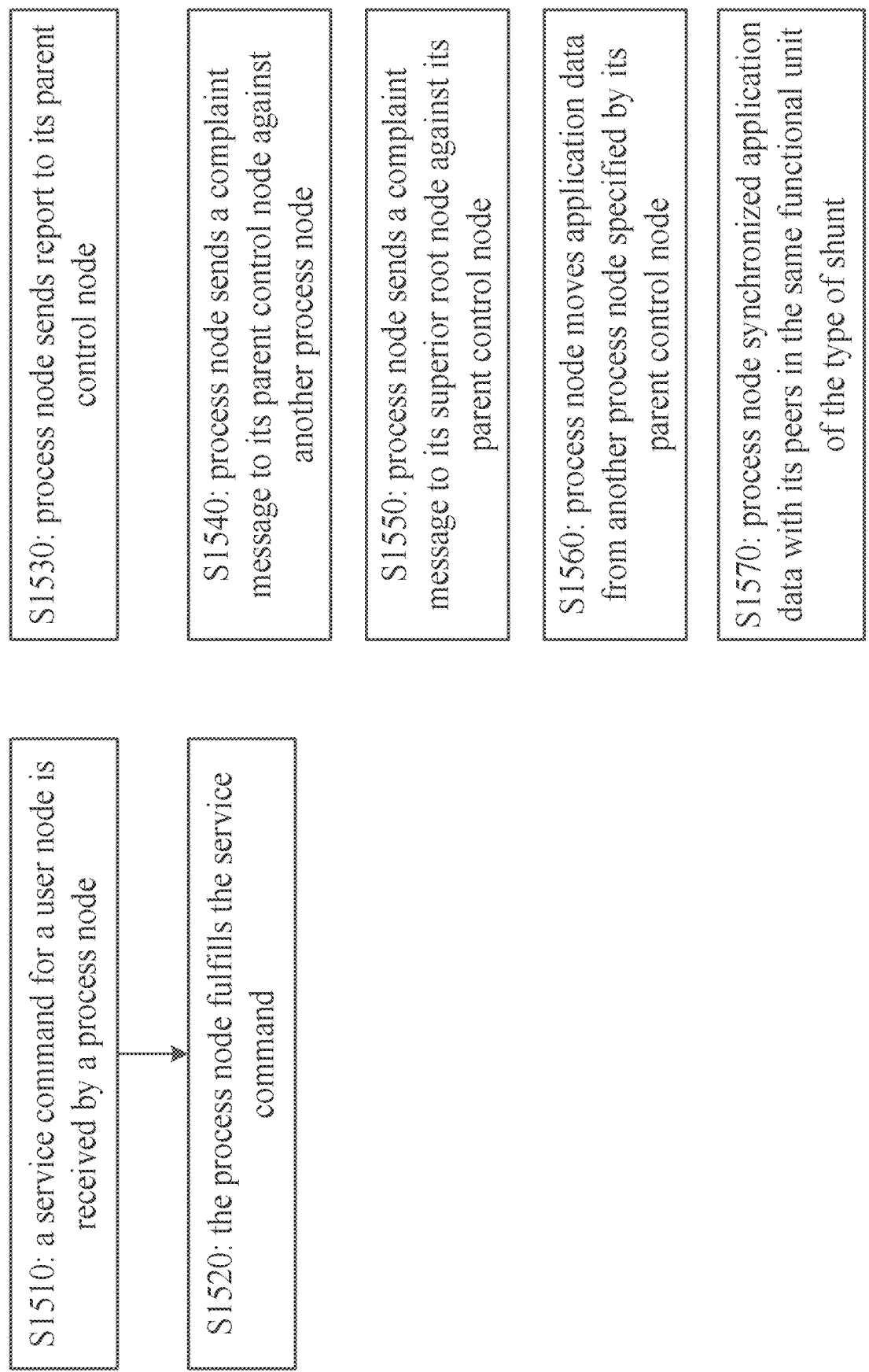
FIG. 15 is a flowchart illustrating processing of a process node according to an embodiment of the present disclosure.

FIG. 15 is a flowchart illustrating processing of a process node according to an embodiment of the present disclosure.

Referring to FIG. 15, at step S1510, a service command for a user device is received from the parent control node by a process node. The service command is generated by its parent control node. At step S1520, the process node executes the service command accordingly.

In addition, a process node also send report to its parent control node (step S1530), sends complaint message to its parent control node against another process node (step S1540), sends complaint message to its superior root node against its parent control node (step S1550), moves data from another process node specified by its parent control node (step S1560), synchronizes application data with its peers in the same functional unit of a shunt (step S1570).

A report sent from a process node to its parent control node updates the status of the process node with the parent control node. Information sent by a process node to its parent includes but not limited, to: a) node ID of the process node; b) hardware data of the computing device that may affect the grading of the process node, such as total disk space, free disk space, total memory space, free memory space, type of drive (HD or SSD), speed of the hard drive, number of CPUs, speed of each CPU, CPU usage, speed of the network connection (download/upload), the type of operating system etc. of the computing device; c) the IP address of the computing device in the local area network. Use the payload that goes with a report, the parent control node is able to re-evaluate the service capability and reliability of the process node, keep track of any local IP address changes and external IP address changes if the node and/or the NAT in front of the node were assigned different IP addresses by a DHCP server. As the response to a report from the process node, the parent control node returns the following information: a) external IP address of the process node as seen from the control node; b) a list of peers in case there is any changes to the organization for example a new process node has been added to the shunt, the external IP address of a peer process node has changed, or a peer process node in the shunt has been discharged from the network etc.

Figure 16:
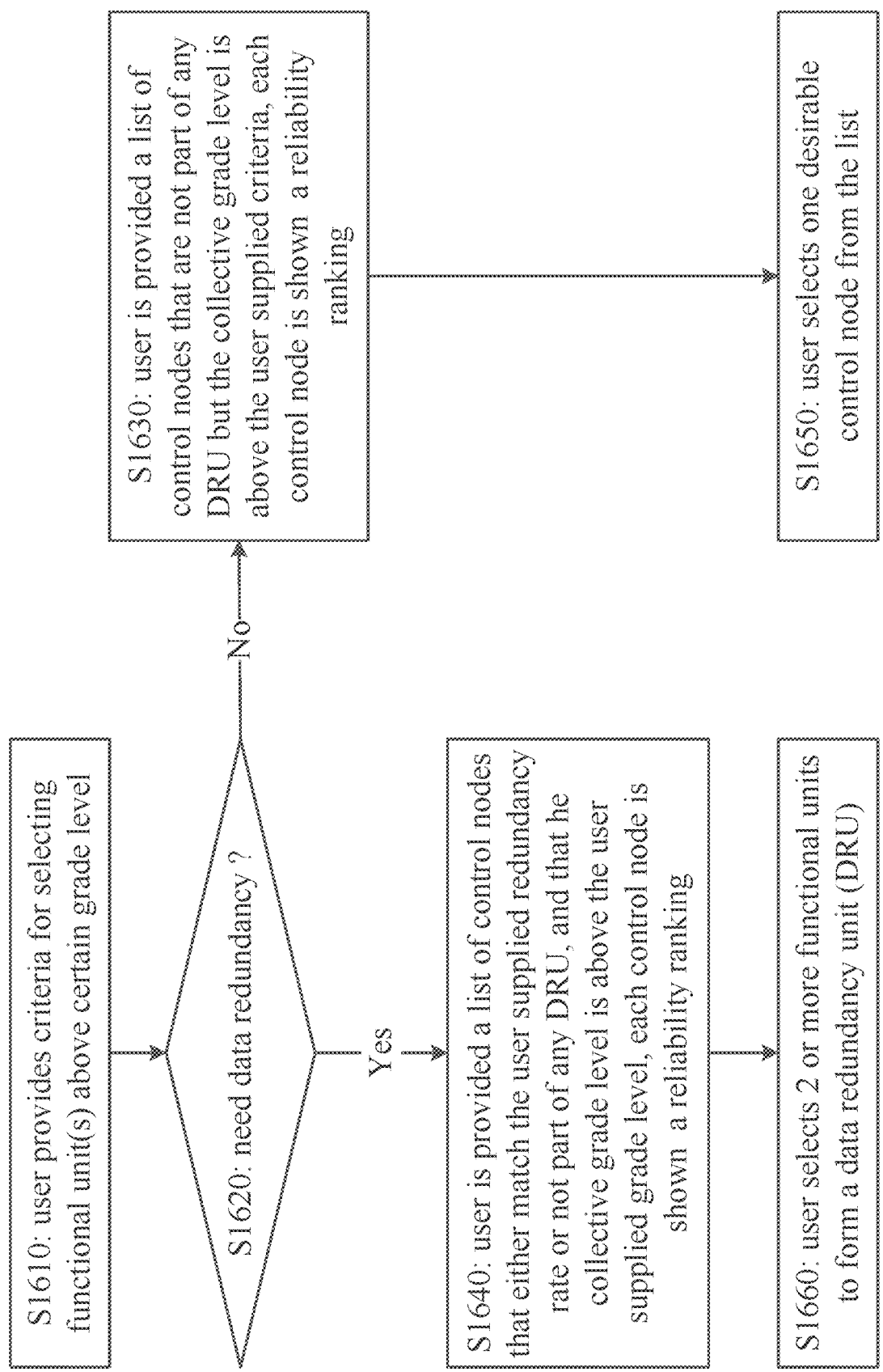
FIG. 16 is a flowchart illustrating user selection of functional unit(s) to meet his computation requirements, and the formation of data redundancy unit (DRU) according to an embodiment of the present disclosure.

FIG. 16 is a flowchart illustrating how user selecting one or more functional units to meet his computation requirements, and the formation of data redundancy unit (DRU) according to an embodiment of the present disclosure. At step S1610, user provides criteria of a grade level from a user interface hosted by a user device that is connected to a root node. Then at step S1620, user is prompted with a choice whether he needs data redundancy and optionally the redundancy rate. The criteria grade level and the requirement for data redundancy are sent to the root node from the user device. The root node receives the criteria grade level and the requirement for data redundancy from the user device, looks for control nodes that match the criteria. If user does not desire data redundancy, the root node looks for control nodes that are not part of any DRU but the collective grade level is equal to or above the user supplied grade level, and returns the list of control nodes to the user device. At step S1630, a list of control nodes is displayed on the user device, with each control node shown a collective reliability ranking. At step S1650, user picks a control node with the desirable reliability ranking value. On the other hand, if user requires data redundancy, the root node looks for control nodes that either match the user supplied redundancy rate, or are not part of any DRU, and that the collective grade level is equal to or above the user supplied grade level, and returns the list of control nodes to the user devices. At step S1640, a list of control nodes is displayed on the user device, with each control node shown a collective reliability ranking. At step S1660, user picks one or more control nodes with the desirable reliability ranking value. If multiple control nodes are selected, and none of which is not any part of DRU, a new DRU shall be formed.

Figure 17:
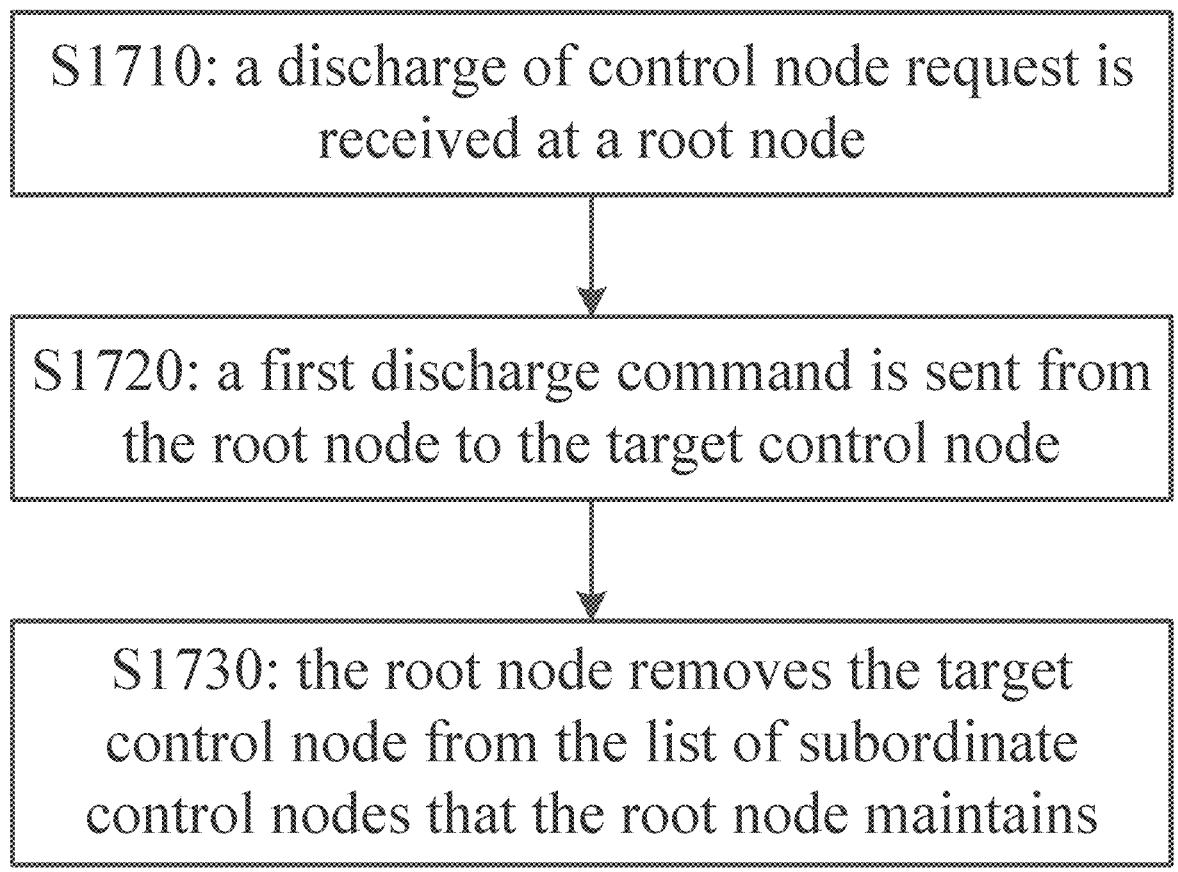
FIG. 17 is a flowchart illustrating the process of a control node being discharged from the network according to an embodiment of the present disclosure

FIG. 17 is a flowchart illustrating the process node a control node being discharged from the network. At step S1710, a request of discharge of a specified control node is received at a root node. At step S1720, the root node sends a first discharge command to the target control node. Discharging a subordinate node is forceful. The superior node disregards the response from the target subordinate node to be discharged. At step S1730, the root node removes the target control node from the list of subordinate control nodes that the root node maintains.

Figure 18:
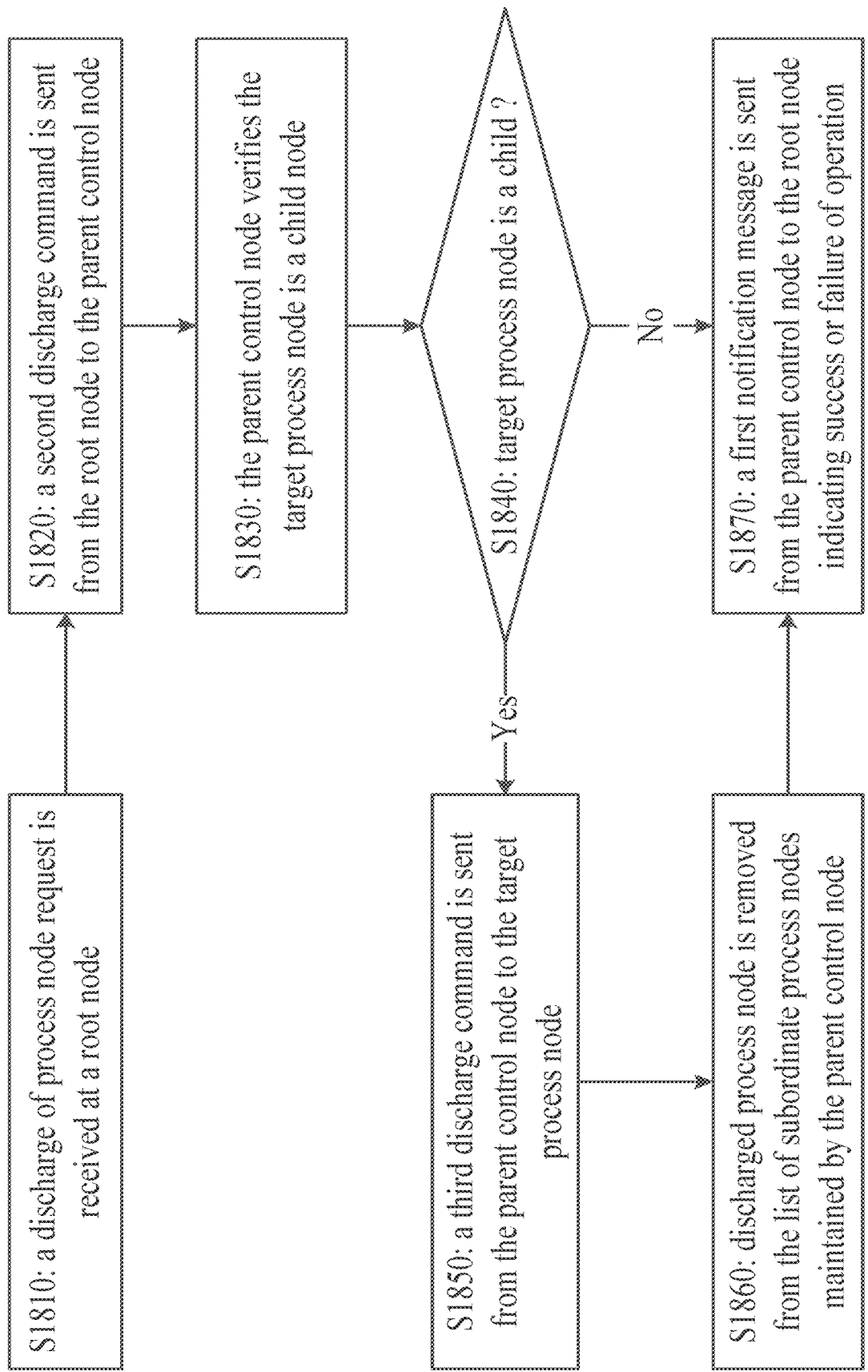
FIG. 18 is a flowchart illustrating the process of a specified process node being discharged by its superior root node according to an embodiment of the present disclosure

FIG. 18 is a flowchart illustrating the process of a specified process node being discharged by its superior root node. At step S1810, a request of discharging a specified process node is received at a root node. The command comes with the node ID of the parent control node of the target process node to be discharged from the network. At step S1820, the root node sends a second discharge command to the parent control node. After receiving the second discharge command, at step S1830 the parent control node verifies whether the target process node is actually a child node. If the target process node is a child node, then at step S1850, the parent control node sends a third discharge command to the target process node. And then the parent control node removes the target process node from the list of subordinate process nodes maintained by the parent control node. Discharging a subordinate node is forceful. The superior node disregards the response from the target subordinate node to be discharged. And then at step S1870, the parent control node sends a first notification message to the root node indicating the success of the operation. However, if the target process node is not a child of the parent control node, the control node sends a first notification message to the root node indicating the failure of the operation.

Figure 19:
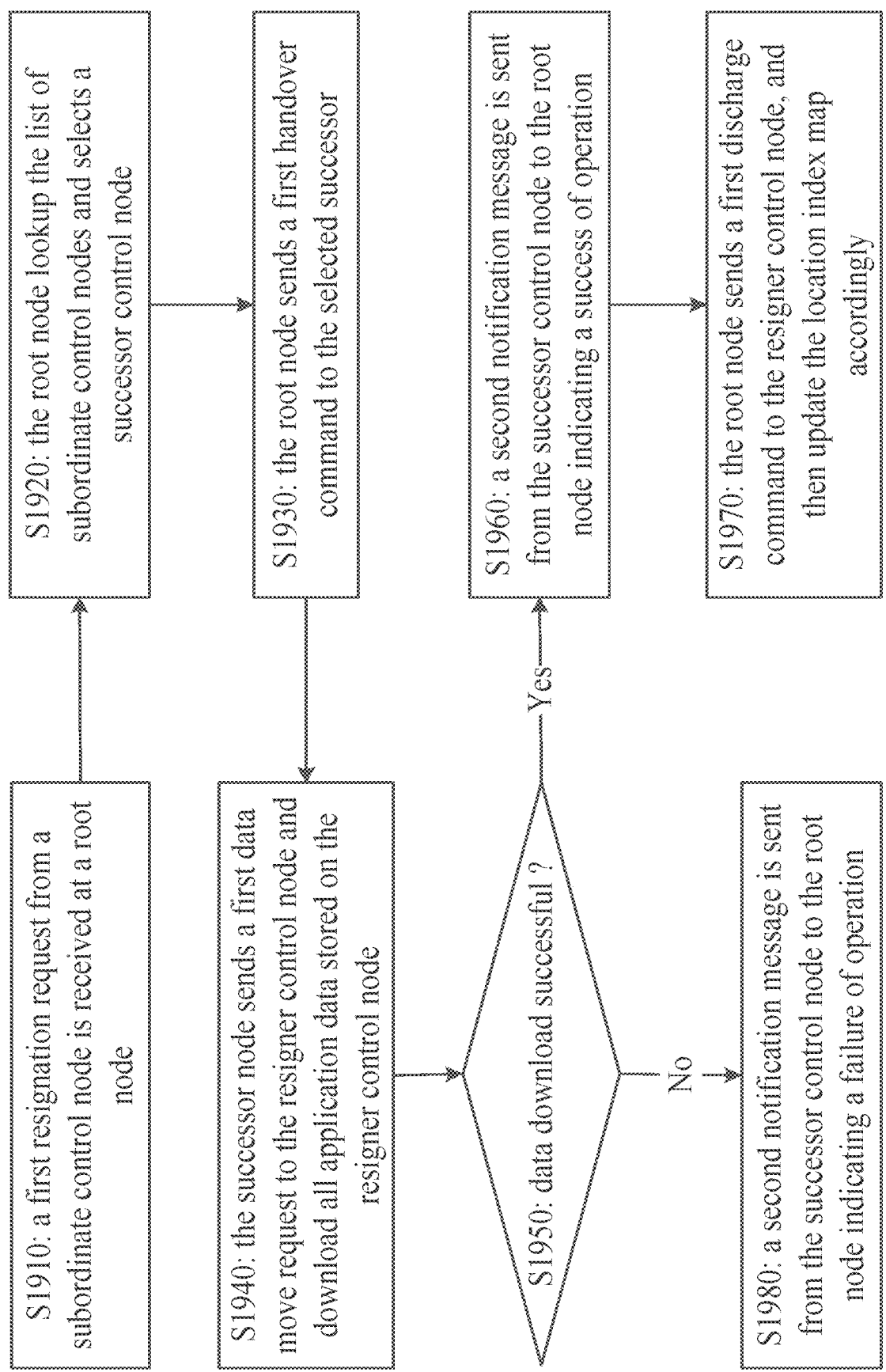
FIG. 19 is a flowchart illustrating the process of a control node resigning from the network according to an embodiment of the present disclosure

FIG. 19 is a flowchart illustrating the process of a control node resigning from the network. At step S1910, a first resignation request is send by the resigner control node to its superior root node. At step S1920, the root node looks into the list of subordinate control nodes and selects a successor control node that qualifies to take over the responsibilities of the resigner's. At step S1930, the root node sends a first handover command to the selected successor control node. At step S1940, the successor control node sends a first data move request to the resigner control node, and downloads the application data stored and managed by the resigner control node. This includes all application data of the entire functional unit. If data download is successful, at step S1960 the successor control node sends a second notification message to the root node indicating the successful completion of the first handover command. Upon receiving the second notification message, at step S1970 the root node sends a first discharge command to the resigner control node and regardless the response from the resigner, the root node updates the location index map accordingly so that the resources that are kept by the resigner control node are now pointing to the successor control node. However, if the data download is not successful, at step S1980, a second notification message is sent from the successor control to the root node indicating the failure of the execution of the first handover command.

Figure 20:
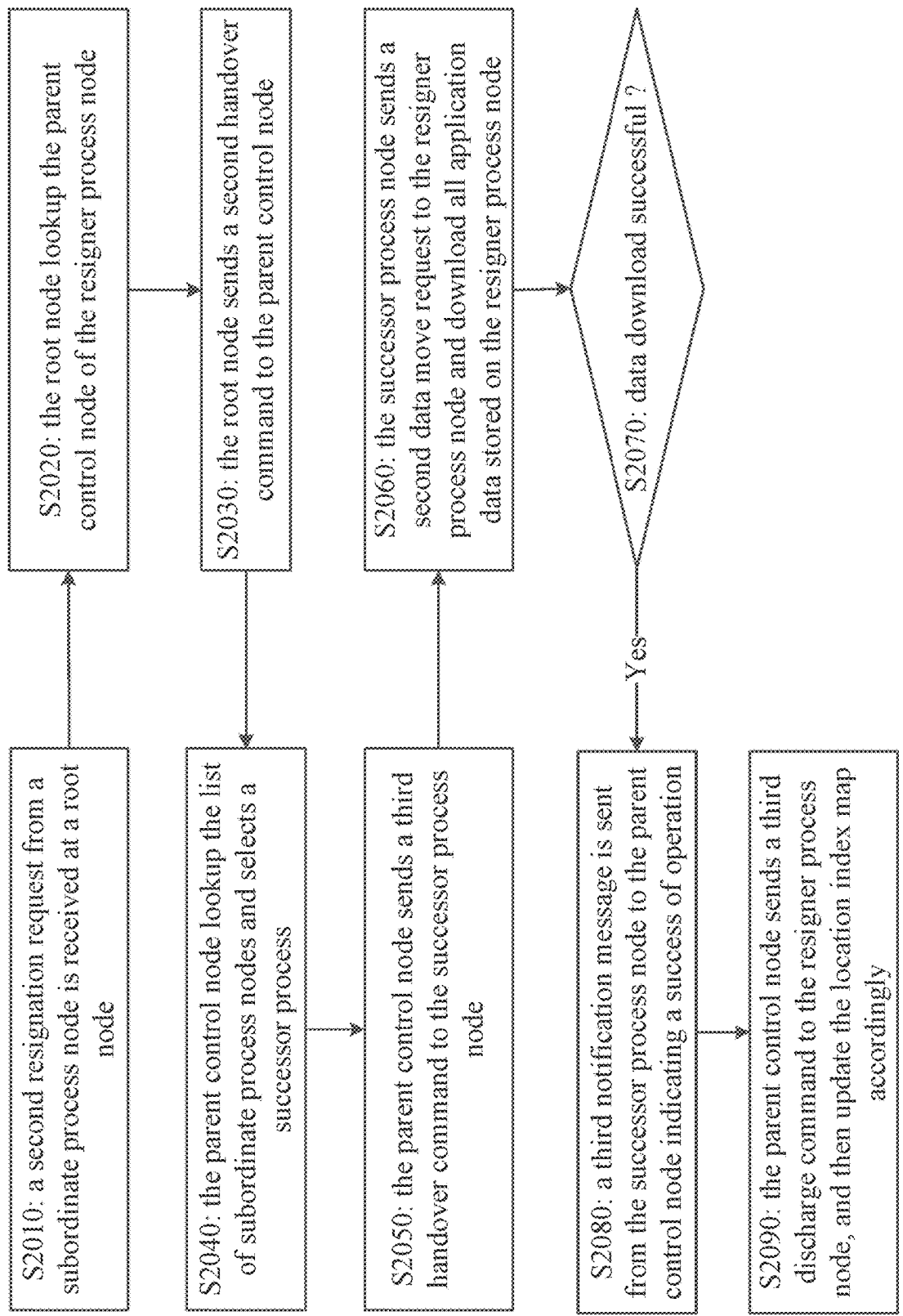
FIG. 20 is a flowchart illustrating the process of a process node resigning from the network according to an embodiment of the present disclosure.

FIG. 20 is a flowchart illustrating the process of a process node resigning from the network by sending a request to its superior root node. At step S2010, a second resignation request is received at a root node. The request comes with the information of the node ID of the parent control node of the resigner process node. At step S2020, the root node looks up the parent control node of the resigner process node. At step S2030, the root node sends a second handover command to the parent control node. Upon receiving a second handover command, at step S2040 the parent control node looks into the list of subordinate process nodes and selects a successor process node that qualifies to take over the responsibility of the resigner's. If the parent control node is not able to find a subordinate process node to take over the responsibility of the resigner, and the parent control node itself qualifies for the responsibility, the resignation process shown in FIG. 21 shall kicks in. At step S2050, the parent control node sends a third handover command to the successor process node. Upon receiving a third handover command, at step S2060, the successor process node sends a second data move request to the resigner process node and downloads the application data, if any from the node. If data downloading is successful, at step S2080 the successor process node sends a third notification message to its parent control node indicating the successful completion of the execution of third handover command. Then at step S2090, the parent control node sends a third discharge command to the resigner process node, and then the parent control node update the location index map accordingly so that resources that are kept by the resigner process node are now pointing to the successor process node.

Figure 21:
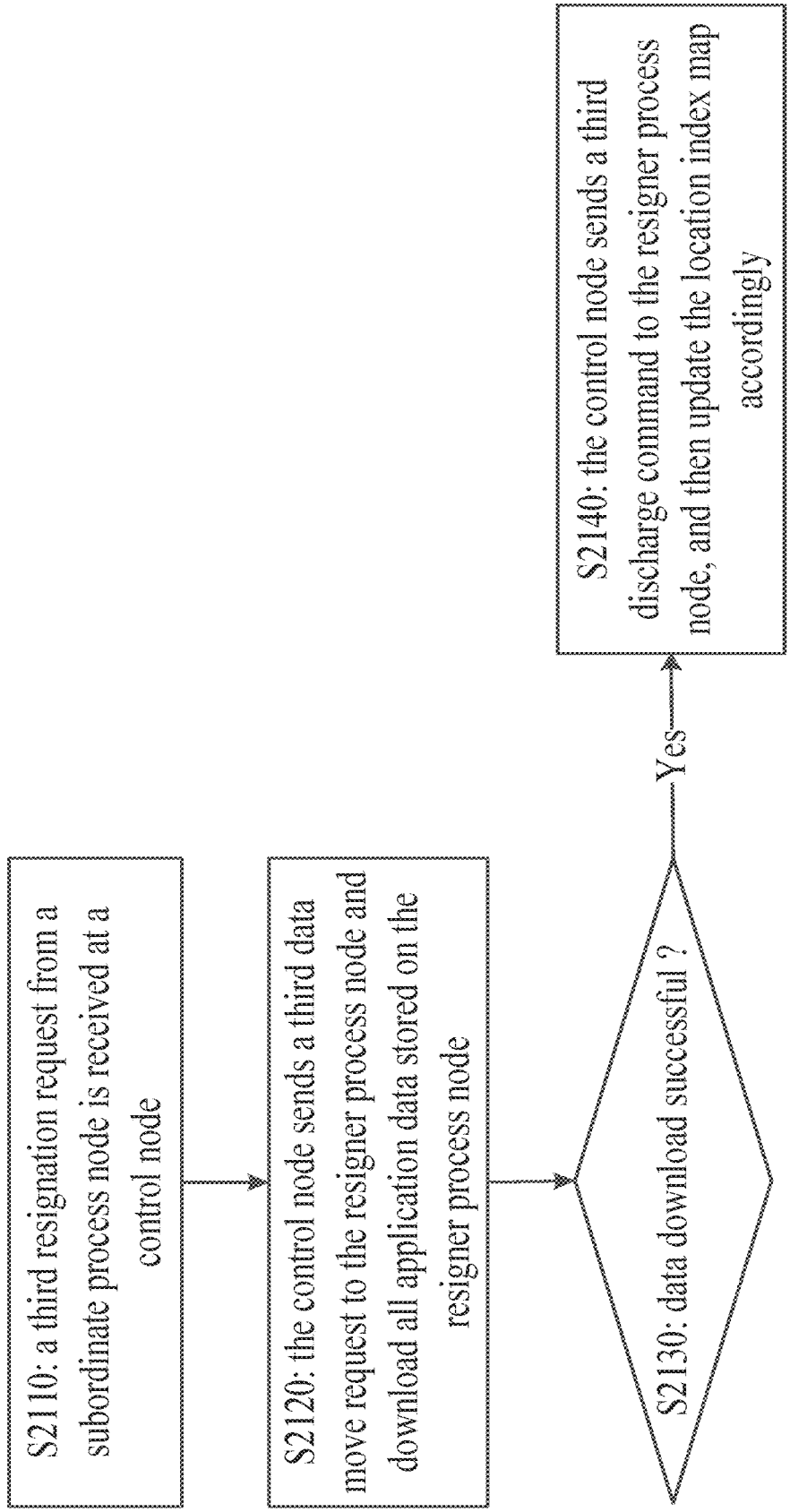
FIG. 21 is a flowchart illustrating the process of a process node resigning from the network by sending a resignation request to its parent control node according to an embodiment of the present disclosure.

FIG. 21 is a flowchart illustrating the process of a process node resigning from the network by sending a request to its parent control node. This process applies the scenario where the parent control node is not able to find a child process node to take over the responsibilities from the resigner and the parent control node itself qualifies for the responsibility. At step S2110, a third resignation request is received at a control node. At step S2120, the control node sends a third data move request to the resigner process node and downloads the application from the resigner process node. If data download is successful, the parent control node sends a third discharge command to the resigner process node, and then updates the location index map accordingly.

Figure 22:
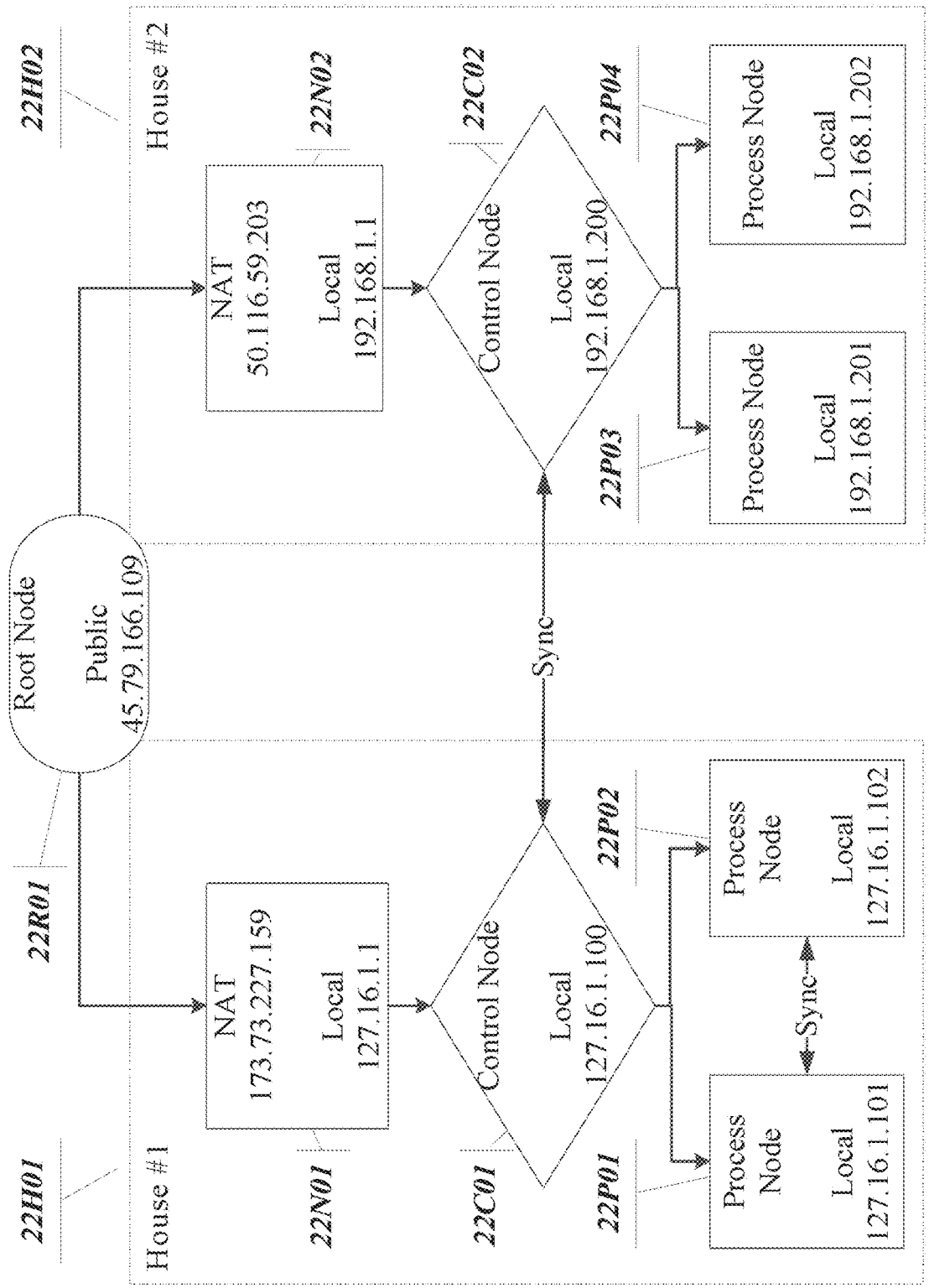
FIG. 22 illustrates an exemplary deployment of the hierarchical computing network according to an embodiment of the present disclosure.

FIG. 22 illustrates an exemplary deployment of the hierarchical computing network according to an embodiment of present disclosure. Root node 22R01 is deployed on the Internet, with a public IP address of 45.79.166.109. This public root node has 2 child control nodes, 22C01 deployed in house #1.22H01 behind a NAT device 22N01, and 22C02 deployed in house #2 22H02 behind another NAT device 22N02. The NAT device 22N01 in house #1 can be a Fios modem, a cable modem or a WiFi router connecting the home network of house #1 to an ISP. The NAT device 22N02 in house #2 can be a Fios modem, a cable modern or a WiFi router connecting the home network of house #2 to an ISP. NAT device 22N01 has a public IP address of 173.73.227.159 on the network of its ISP, and a private IP address of 127.16.1.1 on the home network in house #1. NAT device 22N02 has a public IP address of 50.116.59.203 on the network of its ISP, and private IIP address of 192.168.1.1 on the home network in house #2. In house #1, there are 2 process nodes deployed under the command of control node 22C01. Control node 22C01 is assigned a local IP address of 127.16.1.100 by the NAT device 22N01. Process node 22P01 is assigned a local IP address of 127.16,1.101, and process node 22P02 is assigned a local IP address of 127.16.1.102 by the NAT device 22N01. Process node 22P01 and 22P02 are working in the shunt mode, meaning they synchronize application data periodically for data redundancy reason. In house #2, there are 2 process nodes deployed under the command of control node 22C02. Control node 22C02 is assigned a local IP address of 192.168.1.200, process node 22P03 is assigned a local IP address of 192.168.1.201, and process node 22P04 is assigned a local IP address of 192.168.1.202 by the NAT device 22N02. Process nodes 22P03 and 22P04 are working in the tandem mode, meaning they work independently without knowing each other. Only occasionally, one may download application data from another at the direction from the parent control node. Between control node 22C01 and 22C02, there is a solid line connecting the two, indicating that the two control nodes periodically synchronize application data with each other. This means the two control nodes are put into a data redundancy unit (DRU).

In this deployment scenario, communications between root node 22R01 and control node 22C01 are one-way due to the existence of NAT device 22N01. Control node 22C01 can initiate a communication with root node 22R01, but root node 22R01 cannot initiate a communication with control node 22C01. Control node 22C01's IP address is not reachable to root node 22R01. Similarly, control node 22C02's local IP address is not reachable either to root node 22R01. Root node cannot use services provided by control node 22C01 and 22C02. Control node 22C01 cannot perform data synchronizations with its peer control node 22C02 neither because of the NAT device 22N01 and 22N02.

There are techniques that facilitate root node 22R01 to invoke services on control node 22C01. For example, the most simple one is to setup port forwarding on NAT device 22N01 with the combination of local IP address and the port number of control node 22C01, so that when root node 22R01 sends a communication to NAT device 22N01 with the specified port number, the traffic is automatically routed by the NAT device 22N01 to control node 22C01. Similarly, when control node 22C01 needs to perform data synchronization with control node 22C02, it only sends communication to the NAT device 22N02 which will automatically route the traffic to control node 22C02 if port forwarding is properly setup so on the NAT device 22N02. Most modern NAT devices found in residential houses support port forwarding. In this scenario, the NAT device 22N01 routes all incoming traffic targeting the specified port number to control node 22C01. This is very efficient. However, this approach will have difficulties when control node 22C01 is behind yet another NAT device. Additionally, adding a routing entry to a NAT device at home might not be difficult, but adding a routing entry to a corporate router can be problematic.

There are other NAT traversal techniques, such as TCP hole punching that are normally software solutions involving a publically addressable third party server. The problem is that they put so much network traffic to the publically addressable server machine, it is very hard to scale, and the performance is significantly degraded compared to the port forwarding approach described in the previous section.

Figure 23:
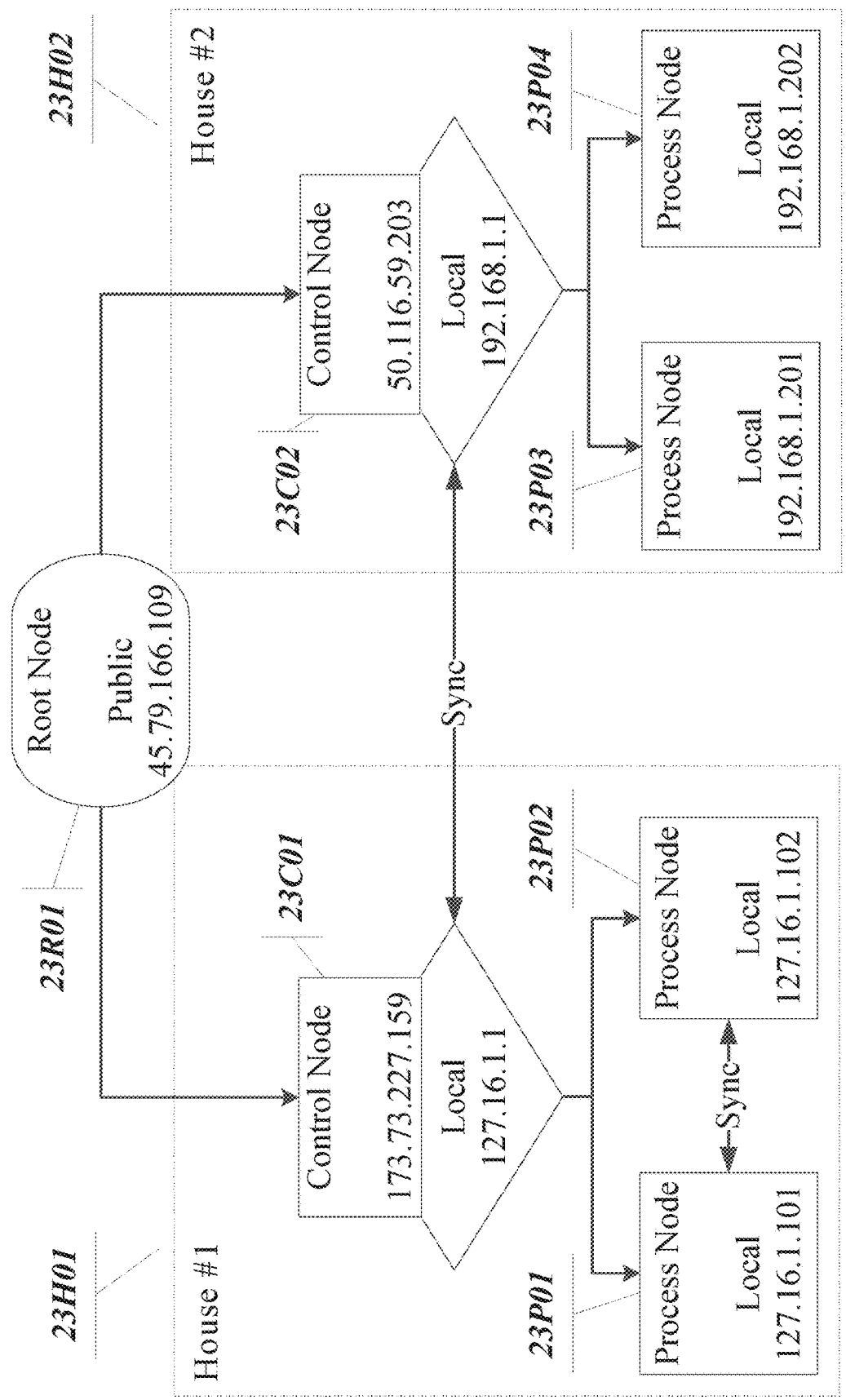
FIG. 23 illustrates a new breed of NAT device working in a hierarchical computing network according to an embodiment of the present disclosure.

FIG. 23 illustrates a new breed of NAT device working in a hierarchical computing network according to an embodiment of present disclosure. Similar to the embodiment shown in FIG. 22, a public root node 23R01 has 2 control nodes 23C01 and 23C02 deployed in 2 different houses respectively. Control node 23C01 in house #1 has 2 process nodes 23P01 and 23P02, and control node 23C02 in house #2 has 2 process nodes 23P03 and 23P04. Control node 23C01, process node 23P01 and 23P02 are running in the home network of house #1. Control node 23C02, process node 23P03 and 23P04 are running in the home network of house #2. The difference is that control node 23C01 combines the functionality of a NAT device and the functionality of a control node. It's a two-in-one device. Control node 23C01 is assigned a public IP address of 173.73.227.159 by the network of TSP that house #1 connects to, and has a local IP address of 127.16.1.1 on the local home network of house #1. Control node 23C02 is assigned a public IP address of 50.116.59.203 by the network of ISP that house #2 connects to, and has a local IP address of 192.168.1.1 on the local home network of house #2. By combining the network traffic routing, capability of a NAT device and the functionality of a control node, the problem of unreachable control node behind firewall is resolved once for all. Control node 23C01, even placed behind another NAT device, is reachable from root node 23R01.

In various embodiments of the present invention, including those described above and as a killed artisan in the field can readily appreciate or summarize therefrom, there are 3 types of complaints: 1) A control node sends complaint message to parent root node, against another control node; 2) A process node sends complaint message to superior root node, against its parent control node (overhead complaint); and 3) A process node sends complaint message to its parent control node, against another process node. There are 2 types of reports: 1) A control node periodically sends report to its parent root node; and 2) A process node periodically sends report to its parent control node. There are 3 types of resignations: 1) A control node sends resignation request to its parent root node; 2) A process node sends resignation request to its superior root node; and 3) A process node sends resignation request to its parent control node. There are 3 types of discharge actions: 1) A root node discharges a child control node; 2) A root node discharges a process node through its parent control node; and 3) A control node discharges a process node. There are 3 types of handover commands 1) A root node sends a handover command to a successor control node; 2) A root node sends a handover command to a parent control node to find a successor process, node to take over data from a resignee process node; and 3) A control node sends a handler command to a successor process node. There are 3 types of notify actions: 1) A control node notifies its parent root node for successfully discharging a process node; 2) A control node notifies its parent root node for successfully downloading application data from a control node; and 3) A process node notifies its parent control node for successfully downloading application data from a process node. There are 3 types of data move requests: 1) A control node sends a data move request to another control node; 2). A process node sends a data move request to another process node; and 3). A control node sends a data move request to a subordinate process node. In preferred embodiments, a root node must have one or more child control nodes, but a control node may have zero or more process nodes On a distributed computing network, search becomes non-trivial compared to centralized counter parts. In a centralized world, whether structured data that is stored in a database or unstructured data that is stored on a file system they are in a centralized location. To search for structured data, execution of single SQL command would bring the results. To perform text search among the unstructured data, a full-text search command would return the results. However, in a distributed environment, since data is dispersed in the storage of many host machines, search command must be sent to each and possibly all nodes and then aggregate the search results from the nodes that returned the results. This process is referred to as orchestration. Data orchestration is especially important for hierarchical computing network of the present disclosure as the subordinate nodes may not be so reliable. Data orchestration is the task of a root node. Search results shall be orchestrated on the root node before returned to the user node.

The hierarchical computing network disclosed in the present disclosure can be applied to Internet environment as well as Intranet environment, for example on a corporate network. In a corporate environment there are little incentive concerns since all computing equipment belongs to the company which has the right to ask even force all personal computers in the office to run 24×7 as many large companies do today. Root nodes do not need to be public nodes as long as they are accessible from all control nodes and process nodes under the command respectively, as well from peer root nodes. By deploying control nodes and/or process nodes on the personal computers (desktop and laptop), a company is able to fully utilize the resources and computing power that otherwise would have been idle and wasted. Free storage space can be used for storing documents, files and folders that many companies pay Cloud services (i Microsoft OneDrive, Google Drive, Dropbox etc.) for.

It is practically feasible using the hierarchical computing network of the present disclosure to build a global virtual file system (GVFS) that handles Exabyte of data as the computation, storage, delivery and management are dispersed to potentially billions of computing devices at homes, offices, labs, shops, schools, libraries, and even data centers in the world.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read. Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed. Certain embodiments can take the form of an entirely hardware embodiment, an entirely software embodiment or an embodiment containing both hardware and software elements. In an embodiment, the present disclosure may be implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For example, in an exemplary embodiment, part or all of processing steps performed in any one or more of FIG. 11, FIG. 12A, FIG. 12B, and FIGS. 13-23 may be implemented as computer program product executable by a computing device.

For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Furthermore, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A first computing device in a hierarchical network, the hierarchical network comprising one or more first computing devices and a plurality of functional units each performing a service function, anyone of the functional units comprising at least a second computing device serving as a control node, wherein the first computing device comprises one or more processors, a memory for storing programming instructions, and a communication module, wherein the programming instructions when executed cause the one or more processors to perform the following operations:

receiving an enrollment request from a candidate computing device via the communication module, the enrollment request indicating the candidate computing device's prospective role as a control node or a process node;

grading the candidate computing device for its service capabilities, assigning the candidate computing device a role of a control node or a process node in the hierarchical network based on the grading;

sending an enrollment response containing information on the assigned functional unit to the candidate computing device via the communication module, if the enrollment request indicates the candidate computing device's prospective role as control node or a process node; and receiving a service request from a user via the communication module, to select a control node matched with the service request, wherein the user's preference on (1) location of the control node, (2) reliability ranking level of the control node, and (3) redundancy rate (i.e. how many nodes in a data redundancy unit (DRU)) are considered;

wherein, in response to a service request, sending a service command to the control node corresponding with the service request.

2. The first computing device according to claim 1, wherein, an enrollment response indicating disqualification as control node is sent to the candidate computing device via the communication module, if the grading of the candidate computing device is below a first grade level threshold.

3. The first computing device according to claim 1, wherein, the programming instructions cause the one or more processors to further look up access information of a control node matched with the candidate computing device, and to send the access information to the candidate computing device via the communication module, if the enrollment request indicates the candidate computing device's prospective role as process node; and the candidate computing device becomes a third computing device if the enrollment process is successful.

4. The first computing device according to claim 1, wherein, at least one of the functional units further comprises one or more third computing devices of claim 3 as process node.

5. The first computing device according to claim 1, wherein, the programming instructions cause the one or more processors to further redirect the enrollment request or other request(s) to another first computing device, if the candidate computing device is not in the same geographic region as the first computing device is in.

6. The first computing device according to claim 1, wherein network data is stored in the first computing device, the network data comprising at least the following data: a node type, a node ID, IP address of the first computing device, a list of subordinate control nodes, a list of its peer root nodes, information on functional units, a location index map which maps resources to nodes on which the resources are stored.

7. The first computing device according to claim 1, wherein the programming instructions cause the one or more processors to further perform data synchronization with its peers.

8. The first computing device according to claim 1, wherein, the reliability ranking of the control node is determined based on at least one of the control node's total attendance time and its rate of failure-to-response.

9. The first computing device according to claim 8, wherein the programming instructions cause the one or more processors to further receive a first complaint message from a second computing device containing information on a peer control node, and to update the reliability ranking of the peer control node based on the first complaint message.

10. The first computing device according to claim 9, wherein the programming instructions cause the one or more processors to further receive a second complaint message from a third computing device containing information on its parent control node, and to update the reliability ranking of the parent control node based on the second complaint message.

11. The second computing device of claim 1 in the hierarchical network of claim 1, wherein the second computing device comprising one or more processors, a memory for storing programming instructions, and a communication module, wherein the programming instructions when executed cause the one or more processors to perform the following operations:
receiving a first enrollment request from a candidate computing device via the communication module, the enrollment request indicating the candidate computing device's prospective role as a process node;
grading the candidate computing device for its service capabilities;
sending a first enrollment response to the candidate computing device based on the grading, the first enrollment response indicating acceptance or disqualification as process node; and
reporting to the first computing device about the status of said second computing device;
wherein, the programming instructions cause the one or more processors to further receive a service command for a user device from the first computing device, to select an enrolled third computing device as process node for processing the service command, and to send a processing command to the selected process node corresponding with the service command;
wherein, in selecting a process node for processing the service command, a process node with a reliability ranking above a certain ranking level is selected;
wherein a node can resign, or be discharged from, the hierarchical network.

12. The second computing device according to claim 11, wherein, the programming instructions cause the one or more processors to further,
send a second enrollment request to a first computing device via the communication module, the second enrollment request indicating a prospective role as control node in a hierarchical network; and
receive a second enrollment response containing information on an assigned functional unit performing a service function via the communication module.

13. The second computing device according to claim 11, wherein network data and application data are stored in the second computing device; and the application data comprises index data and data being indexed to.

14. The second computing device according to claim 11, wherein, the reliability ranking of the process node is determined based on at least one of the process node's total attendance time and its rate of failure-to-response.

15. The second computing device according to claim 11, wherein the network data comprises at least the following data: a node type, a node ID, owner ID, IP address of the second computing device, a list of subordinate process nodes, a list of its peer nodes, information on functional unit(s), a location index map which maps resources to nodes on which the resources are stored.

16. The second computing device according to claim 11, wherein, the programming instructions cause the one or more processors to perform data synchronization with the selected peers.

17. A hierarchical network comprising one or more first computing devices as claimed in claim 1 and a plurality of functional units each performing a service function, any one of the functional units comprising at least a second computing device as claimed in claim 11 serving as control node.

18. The hierarchical network according to claim 17, wherein at least one of the functional units comprises one or more third computing device as a process node;
wherein the third computing device comprises one or more processors, a memory for storing programming instructions, and a communication module, wherein the programming instructions when executed cause the one or more processors to perform one or more of the following operations:
sending a report to its parent control node;
receiving a processing command from its parent control node;
sending a complaint message to its parent control node against a process node;
sending a complaint message to its superior root node against its parent control node; and
performing application specific functions.

19. The hierarchical network according to claim 18, wherein, the programming instructions cause the one or more processors to further synchronize application data comprising index data and data being indexed to with its peers, and wherein a node can resign, or be discharged from, the hierarchical network.

20. The hierarchical network according to claim 18, wherein, network data and application data are store in the third computing device and the networking data comprising at least the following data: a node type, a node ID, owner ID, IP address of the third computing device, a list of peer nodes.

* * * * *